(12) United States Patent
Florencio

(10) Patent No.: US 10,027,982 B2
(45) Date of Patent: Jul. 17, 2018

(54) SEGMENTED-BLOCK CODING

(75) Inventor: Dinei Florencio, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 684 days.

(21) Appl. No.: 13/277,186

(22) Filed: Oct. 19, 2011

(65) Prior Publication Data

US 2013/0101039 A1    Apr. 25, 2013

(51) Int. Cl.
*H04N 7/32* (2006.01)
*H04N 19/60* (2014.01)
*H04N 19/176* (2014.01)
*H04N 19/119* (2014.01)
*H04N 19/14* (2014.01)
*H04N 19/17* (2014.01)
*H04N 19/20* (2014.01)

(52) U.S. Cl.
CPC ......... *H04N 19/649* (2014.11); *H04N 19/119* (2014.11); *H04N 19/14* (2014.11); *H04N 19/17* (2014.11); *H04N 19/176* (2014.11); *H04N 19/20* (2014.11)

(58) Field of Classification Search
CPC .................................................. H04N 19/119
USPC ............................................. 375/240–240.16
See application file for complete search history.

(56) References Cited

U.S. PATENT DOCUMENTS

| 5,177,608 | A | * | 1/1993 | Ohki et al. ................. 348/416.1 |
| 5,815,604 | A | | 9/1998 | Simons et al. |
| 5,987,184 | A | | 11/1999 | Kweon et al. |
| 6,233,278 | B1 | | 5/2001 | Dieterich |
| 6,603,922 | B1 | * | 8/2003 | Shino ................... G11B 27/034 386/268 |
| 6,665,340 | B1 | * | 12/2003 | Kimoto ..................... G06T 9/20 375/240.01 |
| 6,895,048 | B2 | | 5/2005 | Boice et al. |
| 7,426,285 | B2 | * | 9/2008 | Pace ............................ 382/103 |
| 2003/0167306 | A1 | * | 9/2003 | Kaplan ............. H04M 1/72547 709/205 |

(Continued)

OTHER PUBLICATIONS

Srinivasan, et al., "Windows Media Video 9: overview and applications", Retrieved at <<http://www.google.co.in/url?sa=t&source=web&cd=1&ved=0CBcQFjAA&url=http%3A%2F%2Fciteseerx.ist.psu.edu%2Fviewdoc%2Fdownload%3Fdoi%3D10.1.1.101.488%26rep%3Drep1%26type%3Dpdf&ei=B6ImTofEHKLWmAWAqZiQDw&usg=AFQjCNEGaBWGJIFE5VfYBFXI8nVmueokgA>>, Signal Processing: Image Communication vol. 19, No. 9, Oct. 2004, pp. 851-875.

(Continued)

*Primary Examiner* — Jonathan Messmore
(74) *Attorney, Agent, or Firm* — International IP Law Group, PLLC

(57) ABSTRACT

The current application is directed to flexible methods for motion-vector-based encoding of macroblocks within video frames. The flexible methods for encoding video-frame macroblocks provide for segmentation of a video-frame block and encoding the segmented video-frame block by a segmented-block motion vector that includes a reference to a segmentation-defining region of a segmentation map and that also includes references to sources of intensity-and-color data for each segment. Segmented-block motion vectors provide for flexible segmentation-based encoding of video-frame blocks without sacrificing the coding efficiencies attendant with conventional motion-vector-based video encoding.

20 Claims, 45 Drawing Sheets

(56) References Cited

U.S. PATENT DOCUMENTS

| | | | |
|---|---|---|---|
| 2006/0002474 A1* | 1/2006 | Au | H04N 19/57 375/240.16 |
| 2008/0204592 A1* | 8/2008 | Jia | G06T 3/4007 348/402.1 |
| 2009/0034622 A1 | 2/2009 | Huchet et al. | |
| 2009/0324065 A1* | 12/2009 | Ishida et al. | 382/164 |
| 2010/0074332 A1* | 3/2010 | Karczewicz et al. | 375/240.12 |
| 2010/0086031 A1* | 4/2010 | Chen | H04N 19/176 375/240.12 |
| 2010/0231593 A1* | 9/2010 | Zhou et al. | 345/428 |
| 2011/0222787 A1* | 9/2011 | Thiemert et al. | 382/225 |
| 2011/0261264 A1* | 10/2011 | Zafarifar et al. | 348/699 |
| 2011/0293137 A1* | 12/2011 | Gurman et al. | 382/103 |
| 2012/0051438 A1* | 3/2012 | Chong et al. | 375/240.25 |
| 2012/0213450 A1* | 8/2012 | Shirley | G06T 5/002 382/260 |
| 2013/0033612 A1* | 2/2013 | Wu | G06T 5/002 348/208.6 |

OTHER PUBLICATIONS

Sullivan, et al., "Rate-distortion optimized motion compensation for video compression using fixed or variable size blocks", Retrieved at <<http://ieeexplore.ieee.org/stamp/stamp.jsp?tp=&arnumber=188361>>, Global Telecommunications Conference, Countdown to the New Millennium. Featuring a Mini-Theme on: Personal Communications Services, Dec. 2-5, 1991, pp. 85-90.

Orchard, Michael T., "Predictive motion-field segmentation for image sequence coding", Retrieved at <<http://ieeexplore.ieee.org/stamp/stamp.jsp?tp=&arnumber=180690>>, IEEE Transactions on Circuits and Systems for Video Technology, vol. 3, No. 1, Feb. 1993, pp. 54-70.

* cited by examiner

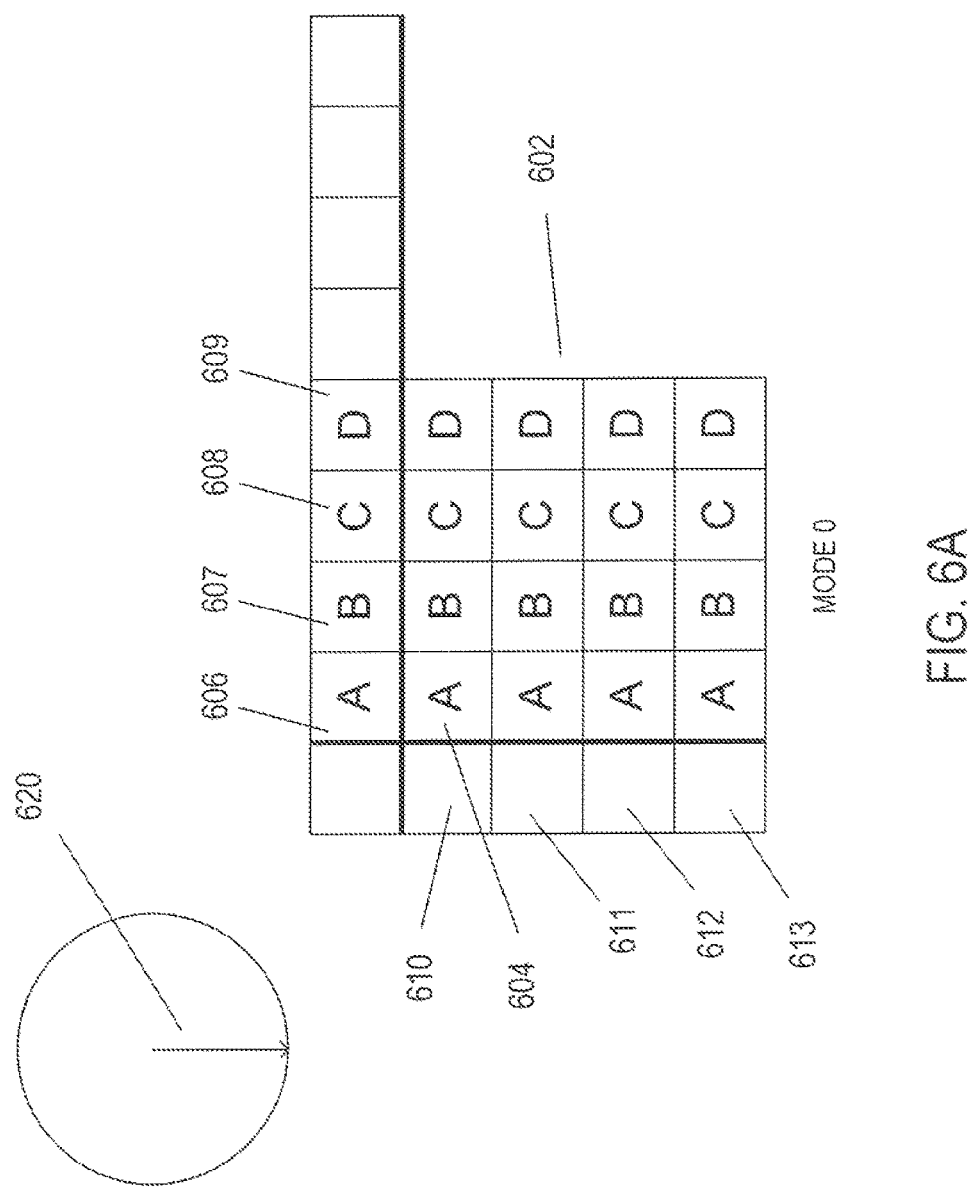

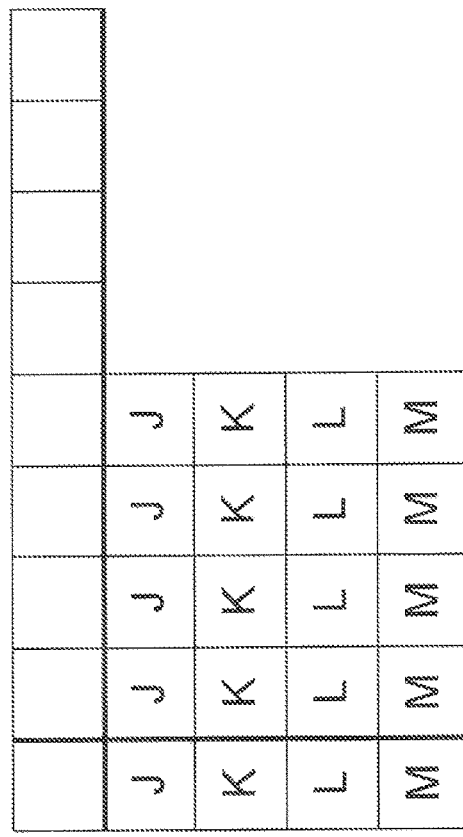
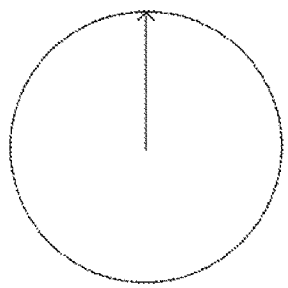
FIG. 6B  MODE 1

FIG. 7B

MODE 1

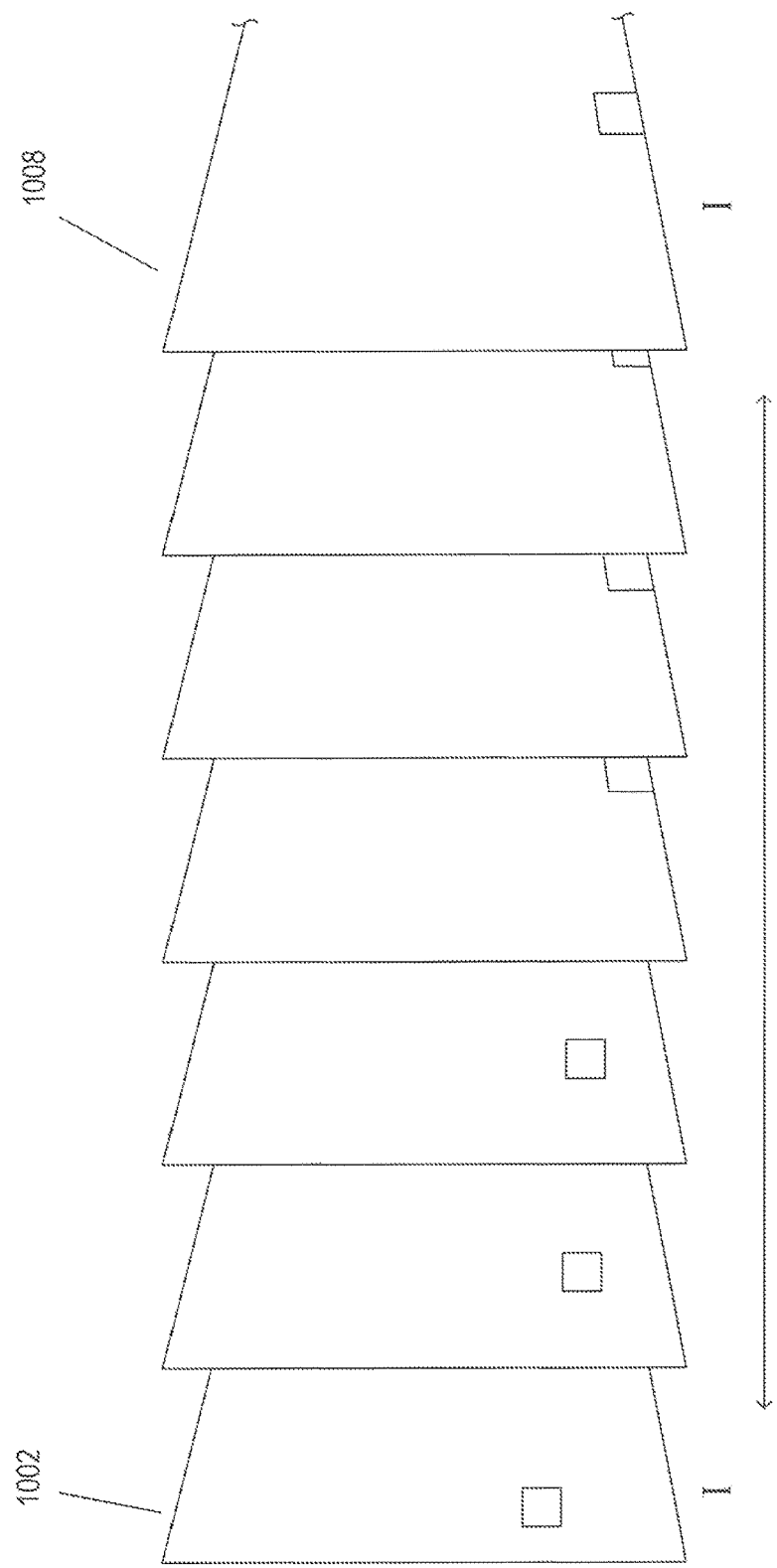

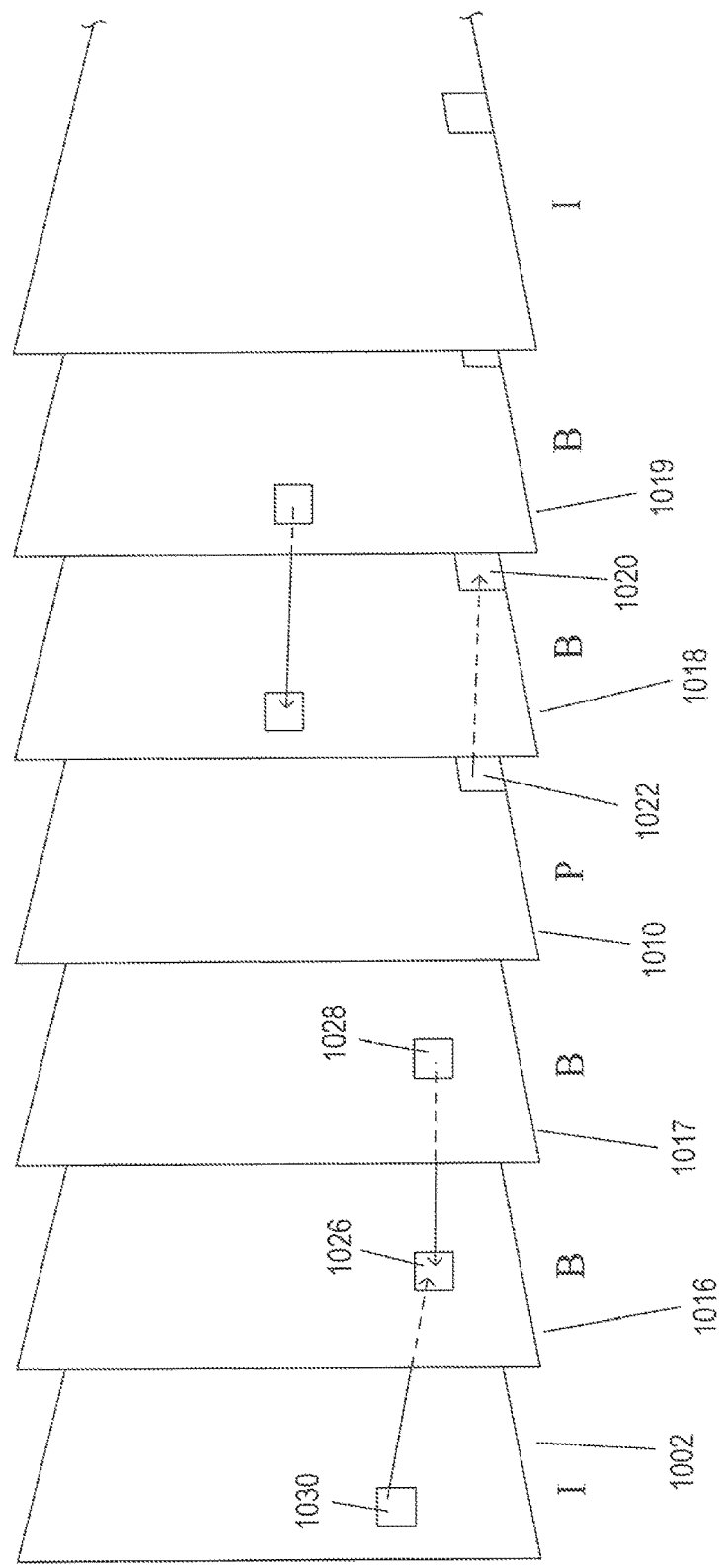

1402

X = 4 x 4 residual block

DCT(X)→Y= transformed 4 x 4 block of coefficients $Y = A \times A^T$ where $A = \begin{bmatrix} a & a & a & a \\ b & c & -c & -b \\ a & -a & -a & a \\ c & -b & b & -c \end{bmatrix}$

1406

$a = \frac{1}{2}$ $b = \left(\sqrt{\frac{1}{2}}\right) \cos \frac{\Pi}{8}$ $c = \left(\sqrt{\frac{1}{2}}\right) \cos\left(\frac{3\Pi}{8}\right)$

1404

$Y = CxC^T \otimes E$ where $C = \begin{bmatrix} 1 & 1 & 1 & 1 \\ 1 & d & -d & -1 \\ 1 & -1 & -1 & 1 \\ d & -1 & 1 & -d \end{bmatrix}$ and $E = \begin{bmatrix} a^2 & ab & a^2 & ab \\ ab & b^2 & ab & b^2 \\ a^2 & ab & a^2 & ab \\ ab & b^2 & ab & b^2 \end{bmatrix}$ 1408

$d = \frac{c}{b} = 0.414$ 1410

1412 approximation: $a = \frac{1}{2}$ $b = \sqrt{\frac{2}{5}}$ $d = \frac{1}{2}$

1414

$Y = C^* X C^{*T} \otimes E^*$ where $C^* = \begin{bmatrix} 1 & 1 & 1 & 1 \\ 2 & 1 & -1 & -2 \\ 1 & -1 & -1 & 1 \\ 1 & -2 & 2 & -1 \end{bmatrix}$ and $E^* = \begin{bmatrix} a^2 & \frac{ab}{2} & a^2 & \frac{ab}{2} \\ \frac{ab}{2} & \frac{b^2}{4} & \frac{ab}{2} & \frac{b^2}{4} \\ a^2 & \frac{ab}{2} & a^2 & \frac{ab}{2} \\ \frac{ab}{2} & \frac{b^2}{4} & \frac{ab}{2} & \frac{b^2}{4} \end{bmatrix}$

1418

$X = C'^T (Y \otimes E') C'$ where $C' = \begin{bmatrix} 1 & 1 & 1 & 1 \\ 1 & \frac{1}{2} & -\frac{1}{2} & -1 \\ 1 & -1 & -1 & 1 \\ \frac{1}{2} & -1 & 1 & -\frac{1}{2} \end{bmatrix}$ and $E' = \begin{bmatrix} a^2 & ab & a^2 & ab \\ ab & b^2 & ab & b^2 \\ a^2 & ab & a^2 & ab \\ ab & b^2 & ab & b^2 \end{bmatrix}$

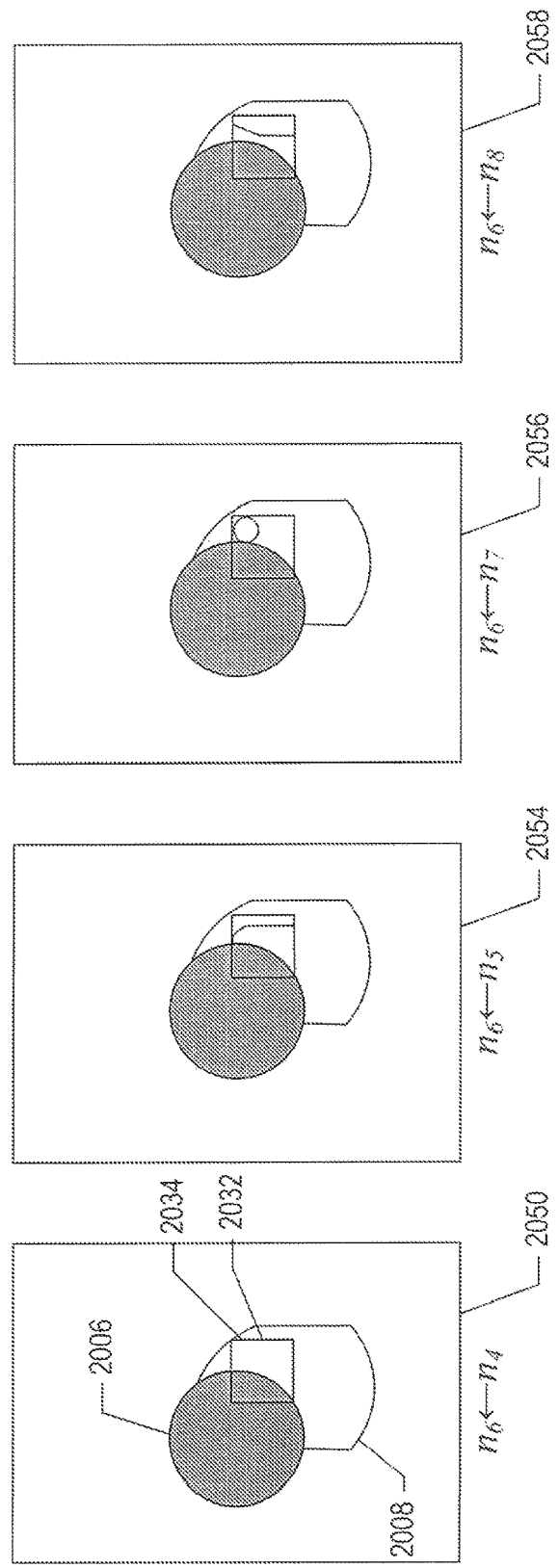

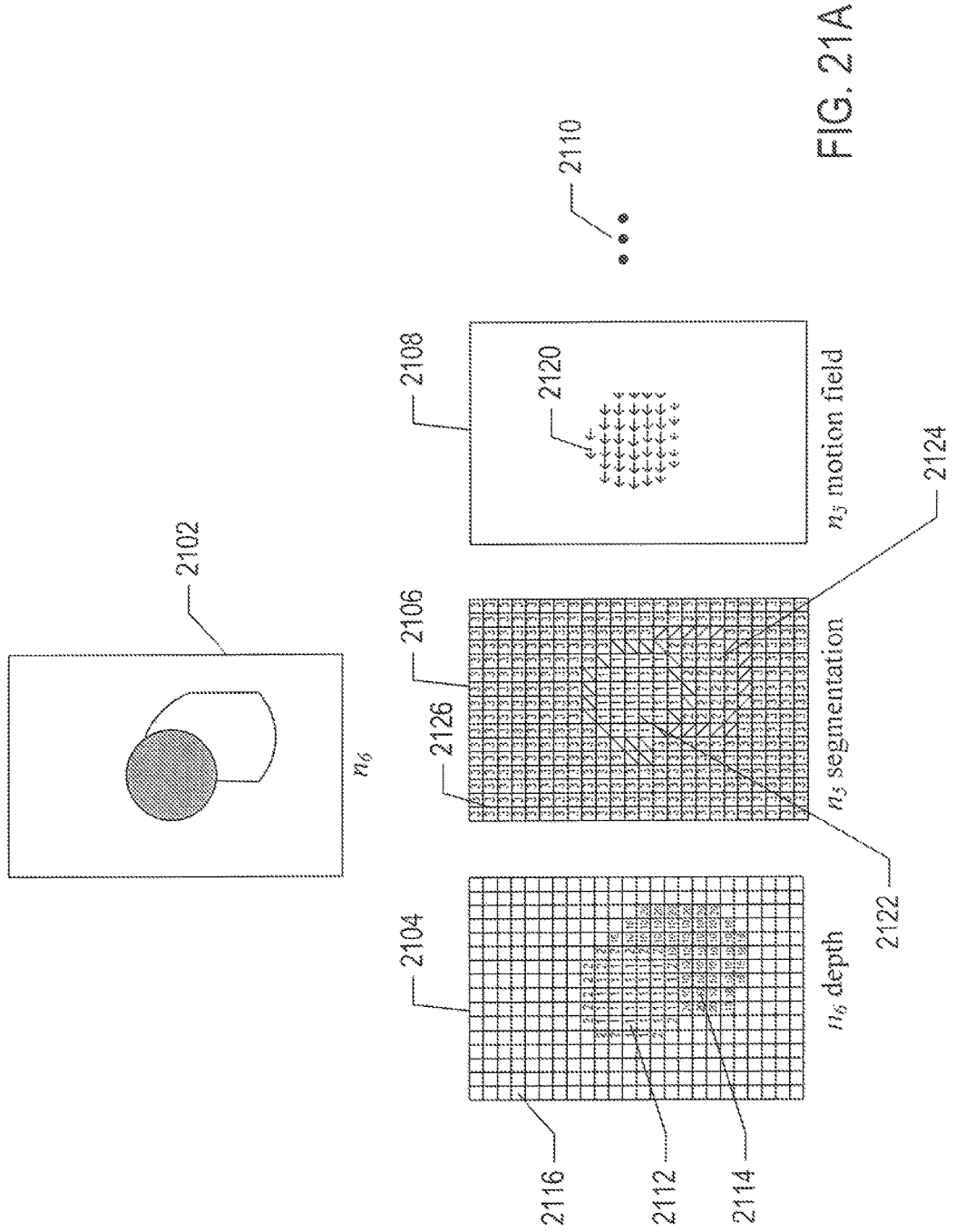

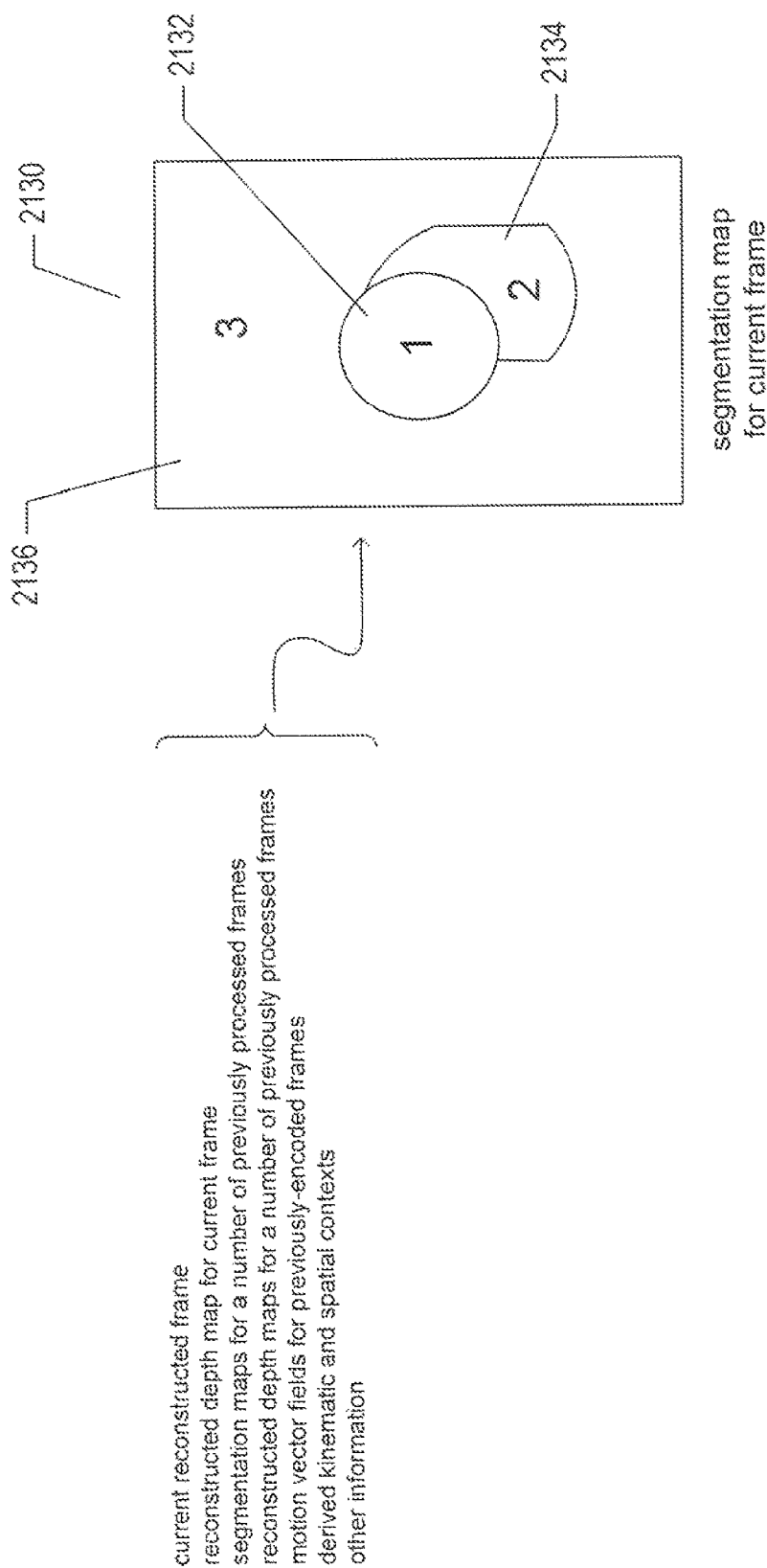

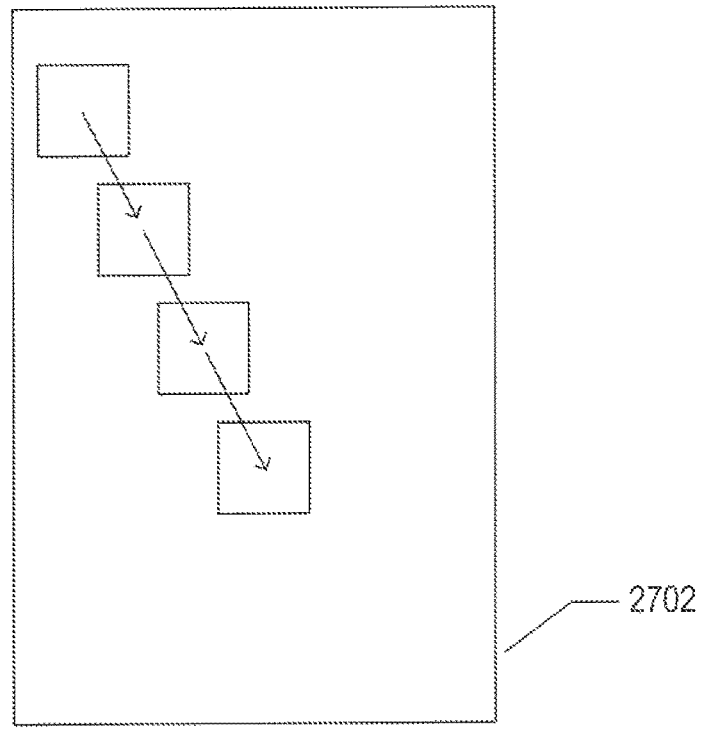
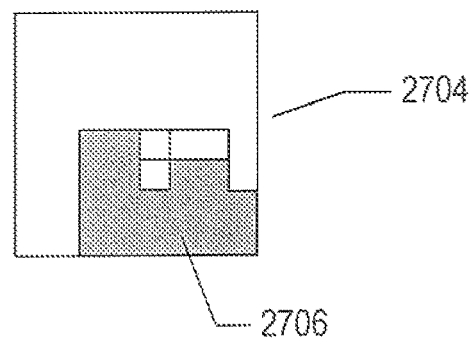
FIG. 27

SEGMENTED-BLOCK CODING

TECHNICAL FIELD

The current patent application is directed to methods and systems for video coding and, in particular, to video-frame block coding that provides for encoding a segmented video-frame block with multiple references to sources for intensity-and-color data for the segments within the segmented video-frame block.

BACKGROUND

During the past several decades, the emergence and wide adoption of digitally encoded video produced by a variety of electronic recording devices and computer systems for electronic transmission and electromechanical and electro-optical-mechanical storage has generated significant ongoing research efforts to develop ever more capable and efficient video-encoding methods. A variety of different video-coding standards have emerged, including various Motion Picture. Experts Group ("MPEG") standards, and Video Coding Experts Group ("VCEG") standards, including MPEG-2, MPEG-4, and H.264.

In addition to specifying a digital format for encoding sequences of digital images, or frames, that, together compose videos, digital video-encoding methods and systems seek to compress digital representations of videos for efficient storage and transmission while preserving, as much as possible, the appearance of the original videos in decompressed and displayed video sequences. In general, there are significant tradeoffs between the degree to which a video sequence can be compressed and the fidelity of decompressed and displayed video with respect to the original video. The greater the compression, in general, the less fidelity obtained from decompressed and displayed video sequences.

Video-sequence compression employs a variety of techniques, described in detail below. One technique involves representing small regions of frames, referred to as "macroblocks," as motion vectors, rather than as intensity-and-color values for pixels in the regions. Motion vectors are references to similar macroblocks in preceding or following frames. Currently available techniques and standards constrain the number of macroblocks, and frames containing macroblocks, that can be referenced for encoding of a given macroblock within a particular frame. When, under these constraints, a suitable motion-vector encoding of a macroblock cannot be obtained, less efficient encoding schemes are employed. Researchers and developers of video-encoding methods and systems continue to seek flexible and efficient video-encoding techniques that provide for increased levels of compression.

SUMMARY

The current application is directed to flexible methods for motion-vector-based encoding of macroblocks within video frames. The flexible methods for encoding video-frame macroblocks provide for segmentation of a video-frame block and encoding the segmented video-frame block by a segmented-block motion vector that includes a reference to a segmentation-defining region of a segmentation map and that also includes references to sources of intensity-and-color data for each segment. Segmented-block motion vectors provide for flexible segmentation-based encoding of video-frame blocks without sacrificing the coding efficiencies attendant with conventional motion-vector-based video encoding. Neither this section nor the sections which follow are intended to either limit the scope of the claims which follow or define the scope of those claims.

BRIEF DESCRIPTION OF THE DRAWINGS

FIGS. 6A-B illustrate two of the nine 4×4 luma-block intra-prediction modes.

FIGS. 7A-B illustrate, using similar illustration conventions as used in FIGS. 10A-I, the four modes for intra prediction of 16×16 luma blocks.

FIGS. 10A-C illustrate the different types of frames and some different types of inter prediction possible with respect to those frames.

FIG. 14 provides derivation of the integer transform and inverse integer transform employed in H.264 video compression and video decompression, respectively.

FIGS. 20A-C illustrate a situation in which conventional motion-vector-based coding and intrablock encoding do not provide satisfactory results.

FIGS. 21A-22 illustrate generation of a segmentation map for small portions of a video frame.

FIGS. 26 and 27 illustrate one type of constrained search for the macroblock-sized region of a segmentation map associated with the previously processed frame to define segmentation of a currently considered macroblock during video encoding.

DETAILED DESCRIPTION

The current application is directed to video coding and, in particular, to methods and systems that provide for segmentation of video-frame blocks and encoding of segmented video-frame blocks. In order to provide an example context within which the methods and systems to which the current application is directed can be appreciated, a description of the H.264 video-coding standard is first provided, below, in a first subsection. Those familiar with video coding can proceed directly to a second subsection, below, entitled "Block Segmentation and Coding," in which the currently claimed block segmentation and segmented-block coding and decoding are described in detail. Please note that, although details of the H.264 standard are provided below, the currently claimed segmented-block motion-vector coding method and systems are compatible with a variety of different video-coding standards and methods. The H.264 standard is provided only to introduce video-coding terms and concepts, common to many video-coding techniques including MPEG-2 and MPEG-4, to those unfamiliar with video coding.

The H.264 Compressed-Video-Signal-Decompression Standard

This first subsection provides an overview of the H.264 compressed-video-signal decompression standard. The H.264 standard is referred to as a "decompression standard" because the H.264, as with many coding standards, specifies only the format of a compressed video and the methods undertaken to decode the compressed-video data. The H.264 therefore provides significant flexibility in implementation of video encoding that produces a compressed video.

Figure 1:
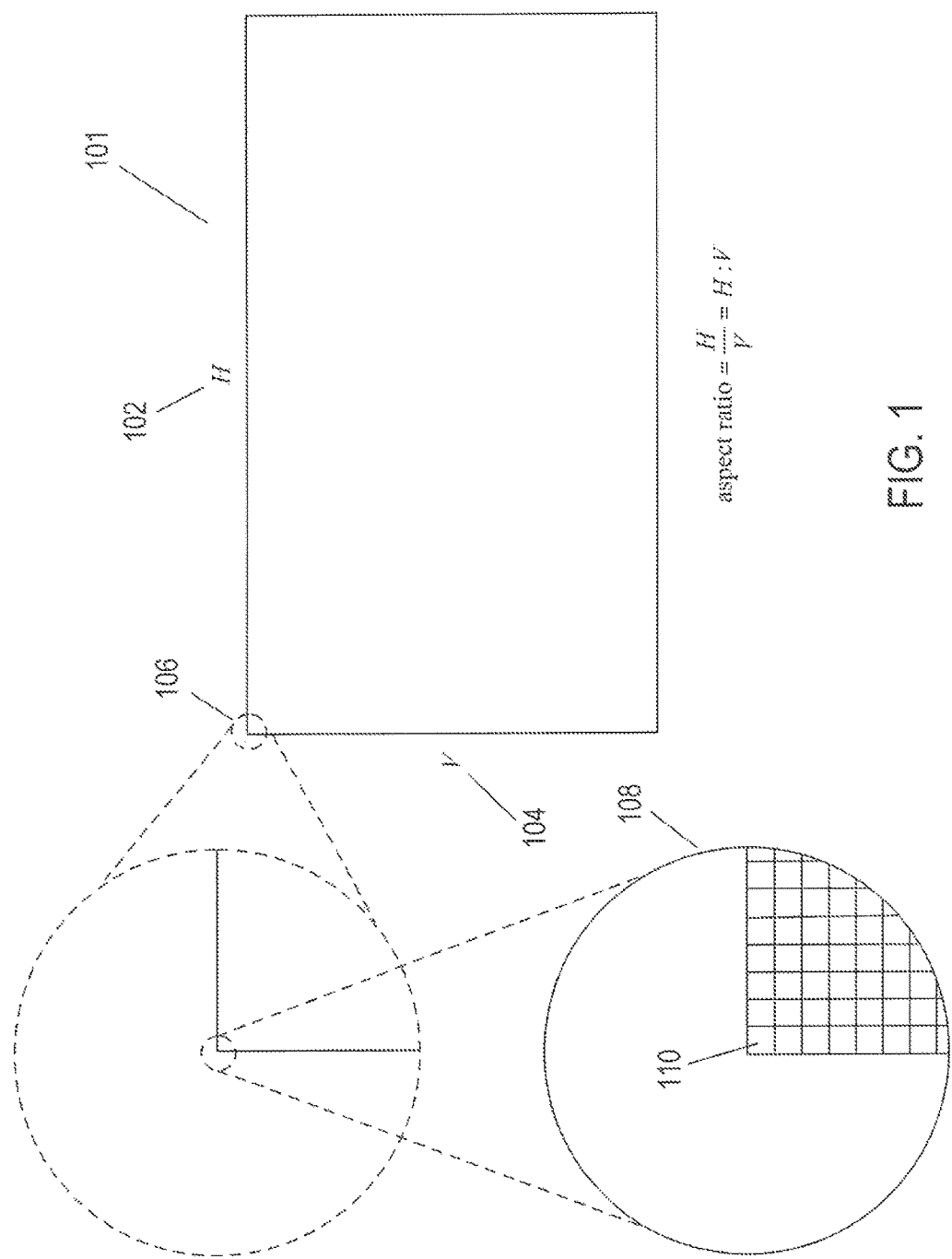
FIG. 1 illustrates a displayed video frame.

FIG. 1 illustrates a displayed video frame. In general, a digitally encoded video frame comprises a sequence of digitally encoded numbers that together describe a rectangular image 101. The rectangular image has a horizontal dimension 102 and a vertical dimension 104, the ratio of which is referred to as the "aspect ratio" of the image. A video generally includes a large number of sequentially ordered video frames that, when displayed rapidly in sequence, provide the illusion of a moving picture. As described below, video frames within a sequence of video frames that together compose a video are classified as reference frames, or I frames, P frames, and B frames, each frame type associated with coding constraints. Reference frames are most constrained, and represent a type of check point from which decoding can proceed anew, despite the occurrence of cumulative errors during decoding of previous frames.

A digitally encoded video frame is composed of numerical encodings of the intensities and colors displayed by tiny display units of a display device, referred to as "pixels," in order to reproduce the video frame for viewing. In FIG. 1, a small portion 106 of the left upper corner of a displayed video frame is shown twice magnified. Each magnification step is a 12-fold magnification, producing a final 144-fold magnification of a tiny portion of the left upper corner of the digitally encoded video frame 108. At 144-fold magnification, the small portion of the displayed video frame is seen to be divided into small squares by a rectilinear coordinate grid, each small square, such as square 110, corresponding to a pixel. A video frame is digitally encoded as a series of data units, each data unit describing the light-emission characteristics of one pixel within the video-frame display. The pixels can be thought of as cells within a two-dimensional matrix, with each pixel location described by a horizontal coordinate and a vertical coordinate. The pixels can alternatively be considered to be one long linear sequence of pixels, produced in raster-scan order, or in some other predefined order. In general, each data unit, or logical pixel, in a digitally encoded video frame is translated into light emission from one or several pixels of a display device. The number that digitally encodes the light emission of a pixel is translated into one or more electronic voltage signals to control the pixel to emit light of a proper hue and intensity from the pixel so that, when all of the pixels are controlled according to the pixel values encoded in a digitally encoded video frame, the display device faithfully reproduces the encoded video frame for viewing by a human viewer. Digitally encoded video frames may be displayed on cathode-ray tubes, LCD-based or plasma-based display devices incorporated within televisions, computer display monitors, and other such light-emitting display devices, may be printed onto paper or synthetic films by computer printers, may be transmitted through digital communications media to remote devices, may be stored on mass-storage devices, including magnetic disks and optical disks and in computer memories, and may be processed by various image-processing application programs.

Figure 2:
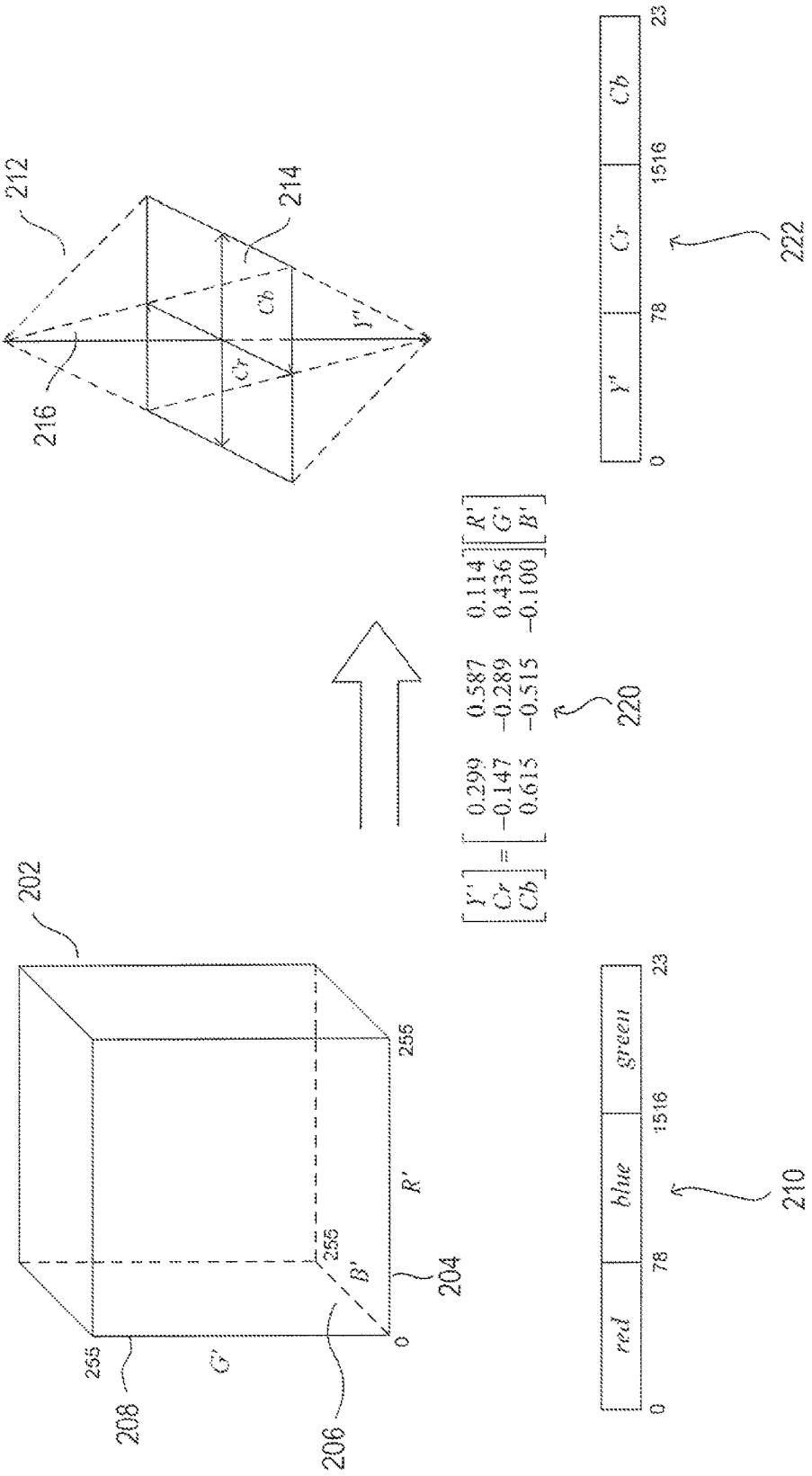
FIG. 2 illustrates two different pixel-value encoding methods according to two different color-and-brightness models.

There are various different methods and standards for encoding color and emission-intensity information into a data unit. FIG. 2 illustrates two different pixel-value encoding methods according to two different color-and-brightness models. A first color model 202 is represented by a cube. The volume within the cube is indexed by three orthogonal axes, the R' axis 204, the B' axis 206, and the G' axis 208. In this example, each axis is incremented in 256 increments, corresponding to all possible numeric values of an eight-bit byte, with alternative R'G'B' models using a smaller or greater number of increments. The volume of the cube represents all possible color-and-brightness combinations that can be displayed by a pixel of a display device. The R', B', and G' axes correspond to red, blue, and green components, of the light emitted by a pixel. The intensity of light emission by a pixel is generally a non-linear function of the voltage supplied to the data unit. In the RGB color model, a G-component value of 127 in a byte-encoded G component would direct one-half of the maximum voltage that can be applied to a pixel to be applied to a particular pixel. However, when one-half of the maximum voltage is applied to a pixel, the brightness of emission may significantly exceed one-half of the maximum brightness emitted at full voltage. For this reason, a non-linear transformation is applied to the increments of the RGB color model to produce increments of the R'G'B' color model, so that the scaling is linear with respect to perceived brightness. The encoding for a particular pixel 210 may include three eight-bit bytes, for a total of 24 bits, when up to 256 brightness levels can be specified for each of the red, blue, and green components of the light emitted by a pixel. When a larger number of brightness levels can be specified, a larger number of bits is used to represent each pixel, and when a smaller number of brightness levels can be specified, a smaller number of bits may be used to encode each pixel.

Although the R'G'B' color model is relatively easy to understand, particularly in view of the red-emitting-phosphor, green-emitting-phosphor, and blue-emitting-phosphor construction of pixels in CRT screens, a variety of related, but different, color models are more useful for video-signal compression and decompression. One such alternative color model is the Y'CrCb color model. The Y'CrCb color model can be abstractly represented as a bi-pyramidal volume 212 with a central, horizontal plane 214 containing orthogonal Cb and Cr axes, with the long, vertical axis of the bi-pyramid 216 corresponding to the Y' axis. In this color model, the Cr and Cb axes are color-specifying axes, with the horizontal plane 214 representing all possible hues that can be displayed, and the Y' axis represents the brightness or intensity at which the hues are displayed. The numeric values that specify the red, blue, and green components in the R'G'B' color model can be directly transformed to equivalent Y'CrCb values by a simple matrix transformation 220. Thus, when eight-bit quantities are used to encode the Y', Cr, and Cb components of display-unit emission according to the Y'CrCb color model, a 24-bit data unit 222 can be used to encode the value for a single pixel.

Figure 3:
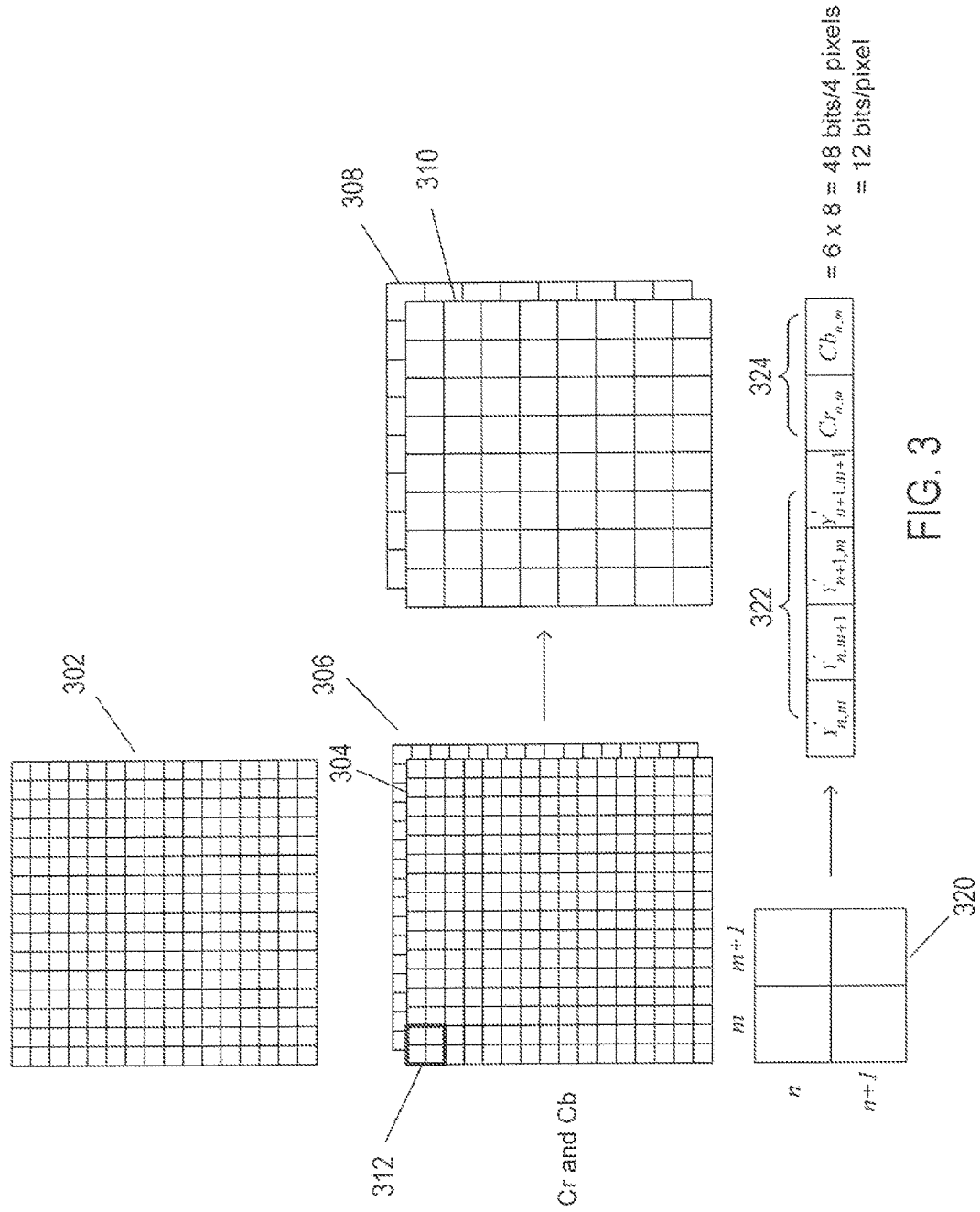
FIG. 3 illustrates digital encoding using the Y'CrCb color model.

For image processing, when the Y'CrCb color model is employed, a digitally encoded video frame can be thought of as three separate pixelated planes, superimposed one over the other. FIG. 3 illustrates digital encoding using the Y'CrCb color model. A digitally encoded video frame, as shown in FIG. 3, can be considered to be a Y' video frame 302 and two chroma video frame 304 and 306. The Y' frame 302 essentially encodes the brightness or intensity values of the video frame, and is equivalent to a monochrome representation of the digitally encoded video frame. The two chroma planes 304 and 306 together represent the hue, or color, at each point in the digitally encoded video frame. For many video-processing and video-storage purposes, it is convenient to decimate the Cr and Cb planes to produce Cr and Cb planes 308 and 310 with one-half resolution. In other words, rather than storing an intensity and two chroma values for each pixel, an intensity value is stored for each pixel, but a pair of chroma values is stored for each 2×2 square containing four pixels. Thus, all four pixels in the left upper corner of the video frame 312 are encoded to have the same Cr value and Cb value. For each 2×2 region of the video frame 320, the region can be digitally encoded by four intensity values 322 and two chroma-values 324, 48 bits in total, or, in other words, by using 12 bits per pixel.

When digitally encoded video frames are produced by a video-recording device and electronically transmitted, the digitally encoded video frames are generally packed into packets that together compose a compressed video stream. According to the H.264 standard, a compressed video stream comprises a sequence of network-abstraction-layer ("NAL") packets. Each NAL packet includes an 8-bit header. A first bit of the header is defined to be zero 526, the next two bits 528 indicate whether or not the data contained in the packet are associated with a reference frame, and the final five bits together compose a type field, which indicates the type of packet and the nature of its data payload. Packet types include packets that contain encoded pixel data, packets that contain encoded metadata that describes how portions of the data have been encoded, and packets that represent various types of delimiters, including end-of-sequence end-of-stream delimiters.

Figure 4:
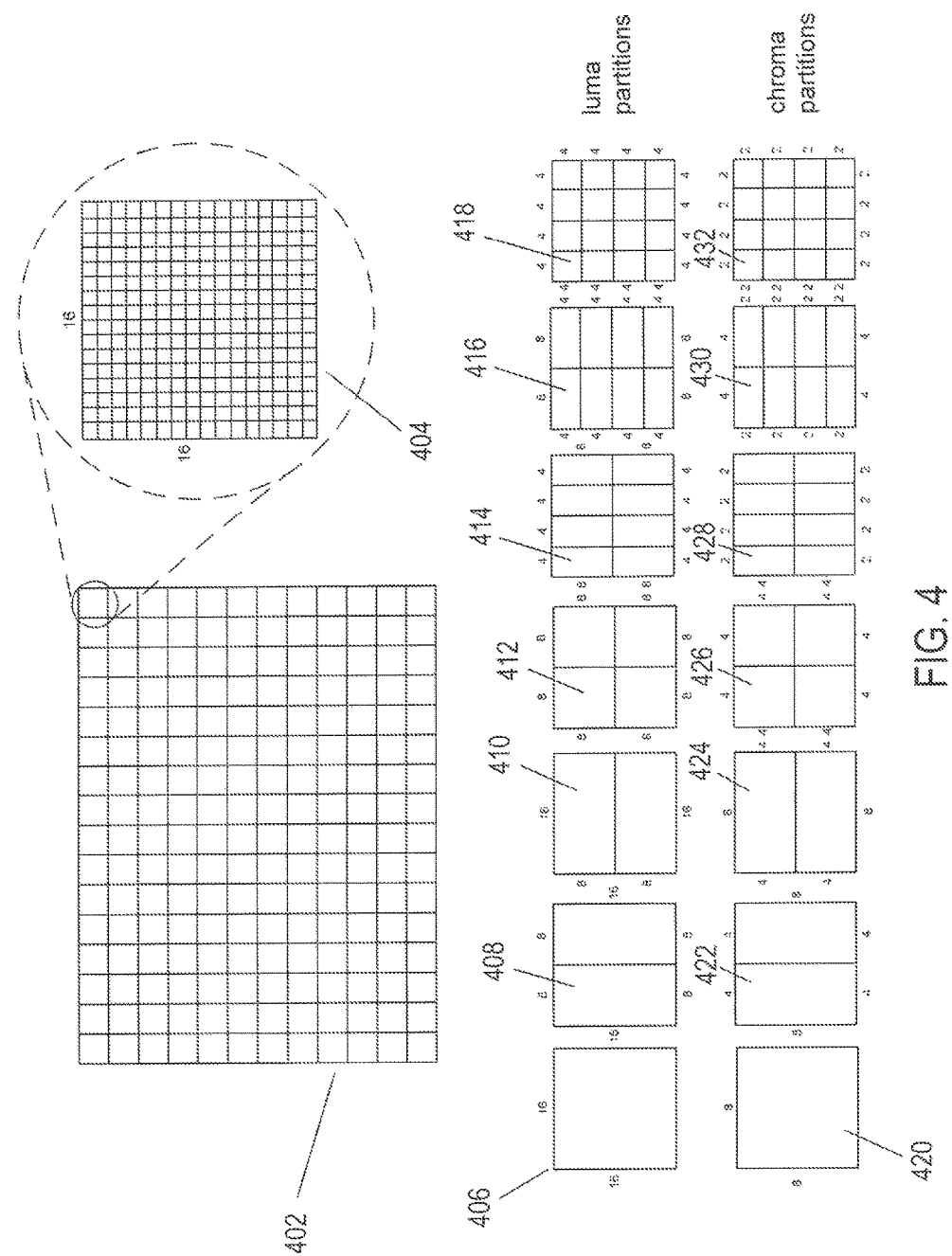
FIG. 4 illustrates various data objects upon which video-encoding operations are carried out during video-data-stream compression and compressed-video-data-stream decompression.

FIG. 4 illustrates various data objects upon which video-encoding operations are carried out during video-data-stream compression and compressed-video-data-stream decompression. From the standpoint of video processing, a video frame 402 is considered to be composed of a two-dimensional array of macroblocks 404, each macroblock comprising a 16×16 array of data values. As discussed above, video compression and decompression generally operate independently on Y' frames containing intensity values and chroma frames containing chroma values. The human eye is generally far more sensitive to variations in brightness than to spatial variation in color. Therefore, a first useful compression is obtained simply by decimating two chroma planes, as discussed above. Prior to decimation, a 2×2 square of pixels can be represented by 12 bytes of encoded data, assuming eight-bit representations of intensity and chroma values. Following decimation, the same 2×2 square of four pixels can be represented by only six bytes of data. Thus, by decreasing the spatial resolution of the color signal, a compression ratio of 2:1 is achieved. While macroblocks are the basic unit on which compression and decompression operations are carried out, macroblocks may be further partitioned for certain compression and decompression operations. The intensity, or luma, macroblocks each contain 256 pixels 406, but can be partitioned to produce 16×8 partitions 408, 8×16 partitions 410, 8×8 partitions 412, 8×4 partitions 414, 4×8 partitions 416, and 4×4 partitions 418. Similarly, chroma macroblocks each contain 64 encoded chroma values 420, but can be further partitioned to produce 8×4 partitions 422, 4×8 partitions 424, 4×4 partitions 426, 4×2 partitions 428, 2×4 partitions 430, and 2×2 partitions 432. In addition, 1×4, 1×8, and 1×16 pixel vectors may be employed in certain operations.

According to the H.264 standard, the macroblocks of a video frame can be logically partitioned into slice groups, with the partitioning specified by a slice-group map. Many different types of slice-group partitioning can be specified by appropriate slice-group maps. Each slice group can be further partitioned into a number of slices. Each slice contains a number of contiguous pixels (contiguous within the slice group, but not necessarily within a frame) in raster-scan order.

To summarize, video compression and decompression techniques are carried out on video frames and various subsets of video frames, including slices, macroblocks, and macroblock partitions. In general, intensity-plane or luma-plane objects are operated on independently from chroma-plane objects. Because chroma planes are decimated by a factor of two in each dimension, with an overall 4:1 compression, the dimensions of chroma macroblocks and macroblock partitions are generally one-half those of the luma macroblocks and luma-macroblock partitions.

An initial step in video compression, as implied by the H.264 standard, is to employ one of two different general prediction techniques in order to predict the pixel values of a currently considered macroblock or macroblock partition from, in one case, neighbouring macroblocks or macroblock partitions in the same frame and, in the other case, spatially neighbouring macroblocks or macroblock partitions that occur in frames that precede or follow the frame of the macroblock or macroblock partition that is being predicted. The first type of prediction is spatial prediction, referred to as "intra prediction." A second type of prediction is temporal prediction, referred to as "inter prediction." Intra prediction is the only type of prediction that can be used for reference frames. Intra prediction is also the default prediction used when encoding macroblocks. For a macroblock of a non-reference frame, inter prediction is generally first attempted. When inter prediction succeeds, then intra prediction is not used for the macroblock. However, when inter prediction fails, intra prediction may be employed as the default prediction method.

Figure 5:
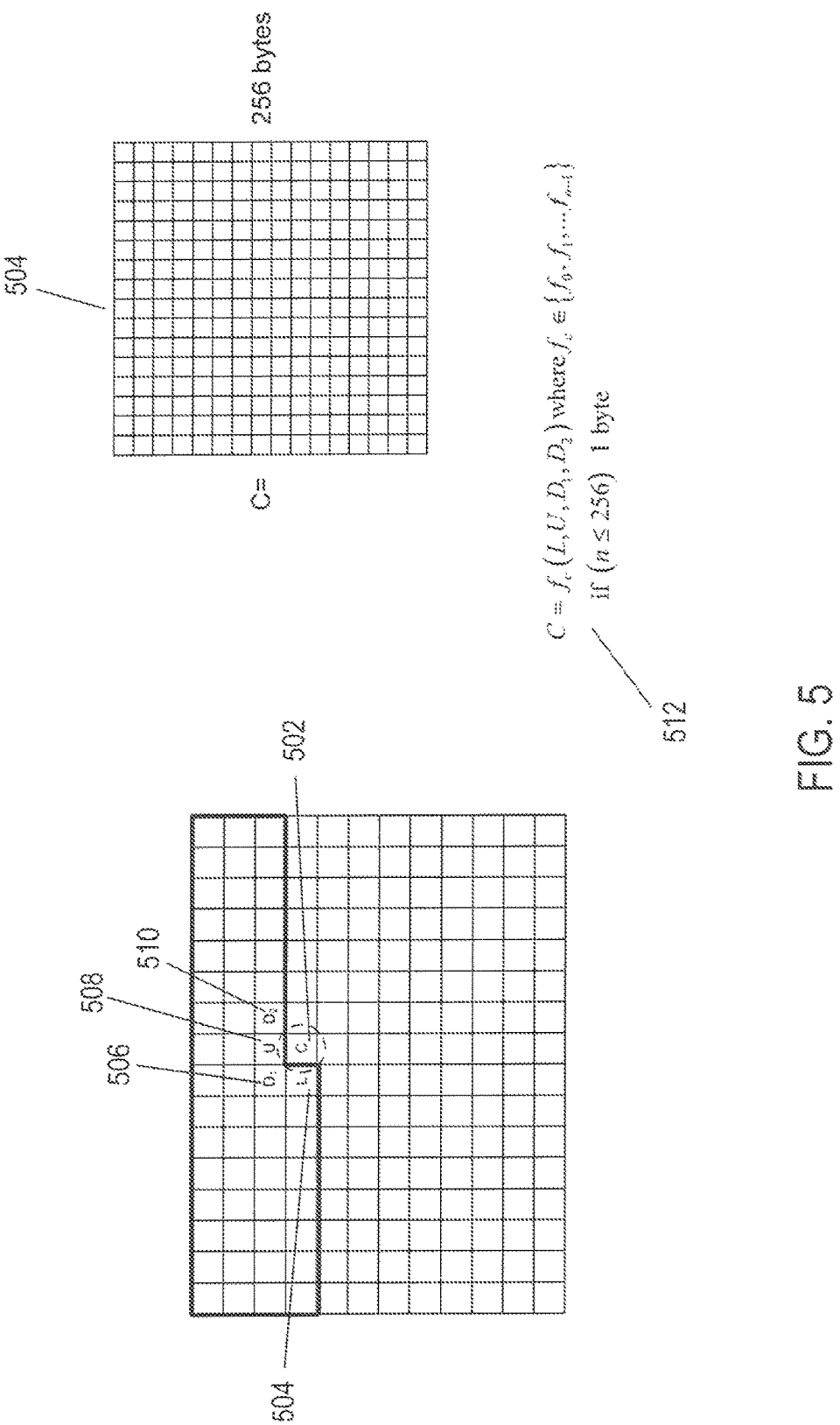
FIG. 5 illustrates intra prediction.

FIG. 5 illustrates intra prediction. Consider a macroblock C 502 encountered during macroblock-by-macroblock compression of a video frame. As discussed above, a 16×16 luma macroblock 504 can be encoded using 256 bytes. However, were it possible to compute the contents of the macroblock from adjacent macroblocks in the image, a rather large amount of compression would be theoretically possible. For example, consider four adjacent macroblocks to a currently considered macroblock C 502. These four macroblocks include a left macroblock 504, an upper left diagonal macroblock 506, an upper macroblock 508, and an upper right diagonal macroblock 510. Were it possible to compute the pixel values in C as a function of one or more of these adjacent macroblocks, using one of some number of different prediction functions $f_c$ 512, then the contents of the macroblock could be encoded simply as a numeric designator or specifier for the prediction function. Were the number of prediction functions less than or equal to 256, for example, then the designator or specifier for the selected prediction function could be encoded in a single byte of information. Thus, were it possible to exactly compute the contents of a macroblock from its neighbors using a selected one of 256 possible prediction functions, the rather spectacular compression ratio of 256:1 could be achieved. Unfortunately, compression ratios of this magnitude are not generally achieved by the spatial-prediction methods employed for H.264 compression, because there are far too many different possible macroblocks to allow for accurate prediction by only 256 prediction functions. For example, when each pixel is encoded by 12 bits, there are 212=4096 different possible pixel values and 4096256 different possible macroblocks. However, intra prediction can significantly contribute to the overall compression ratio for H.264 video compression, particularly for relatively static video signals with large image regions that do not quickly change and that are relatively homogeneous in intensity and color.

H.264 intra prediction can be carried out according to nine different modes for 4×4 luma macroblocks or according to four different modes for 16×16 luma macroblocks. FIGS. 6A-B illustrate two of the nine 4×4 luma-block intra-prediction modes. The 4×4 luma macroblock that is being predicted is represented, in FIG. 6A, by the 4×4 matrix 602 to the lower right of the diagram. Thus, the uppermost left-hand pixel value 604 in the 4×4 matrix being predicted, in FIG. 6A, contains the value "A." The cells adjacent to the 4×4 luma block represent pixel values in neighbouring 4×4 luma blocks within the image. For example, in FIG. 6A, the values "A" 606, "B" 607, "C" 608, and "D" 609 are data values contained in the 4×4 luma block directly above the 4×4 luma block 602 being predicted. Similarly, the cells 610-613 represent pixel values within a last vertical column of the 4×4 luma block to the left of the 4×4 luma block being predicted. In the case of mode-0 prediction, illustrated in FIG. 6A, the values in the last row of the upper, adjacent 4×4 luma block are copied vertically downward into the columns of the currently considered 4×4 luma block 602. Thus, in FIG. 6A, mode-0 prediction constitutes a downward, vertical prediction represented by the downward directional arrow 620 shown in FIG. 6A. FIG. 6B, using the same illustration, conventions as used in FIG. 6A, illustrates mode-1 prediction, in which pixel values in the last column of an adjacent, 4×4 luma block (504 in FIG. 5) are copied horizontally into the rows of the currently considered 4×4 luma block 602. Additional 4×4 luma-block intra-prediction modes include computed values from combinations of pixels in two or more adjacent 4×4 luma blocks, some of which represent movement of values from adjacent blocks in diagonal directions.

Figure 7A:
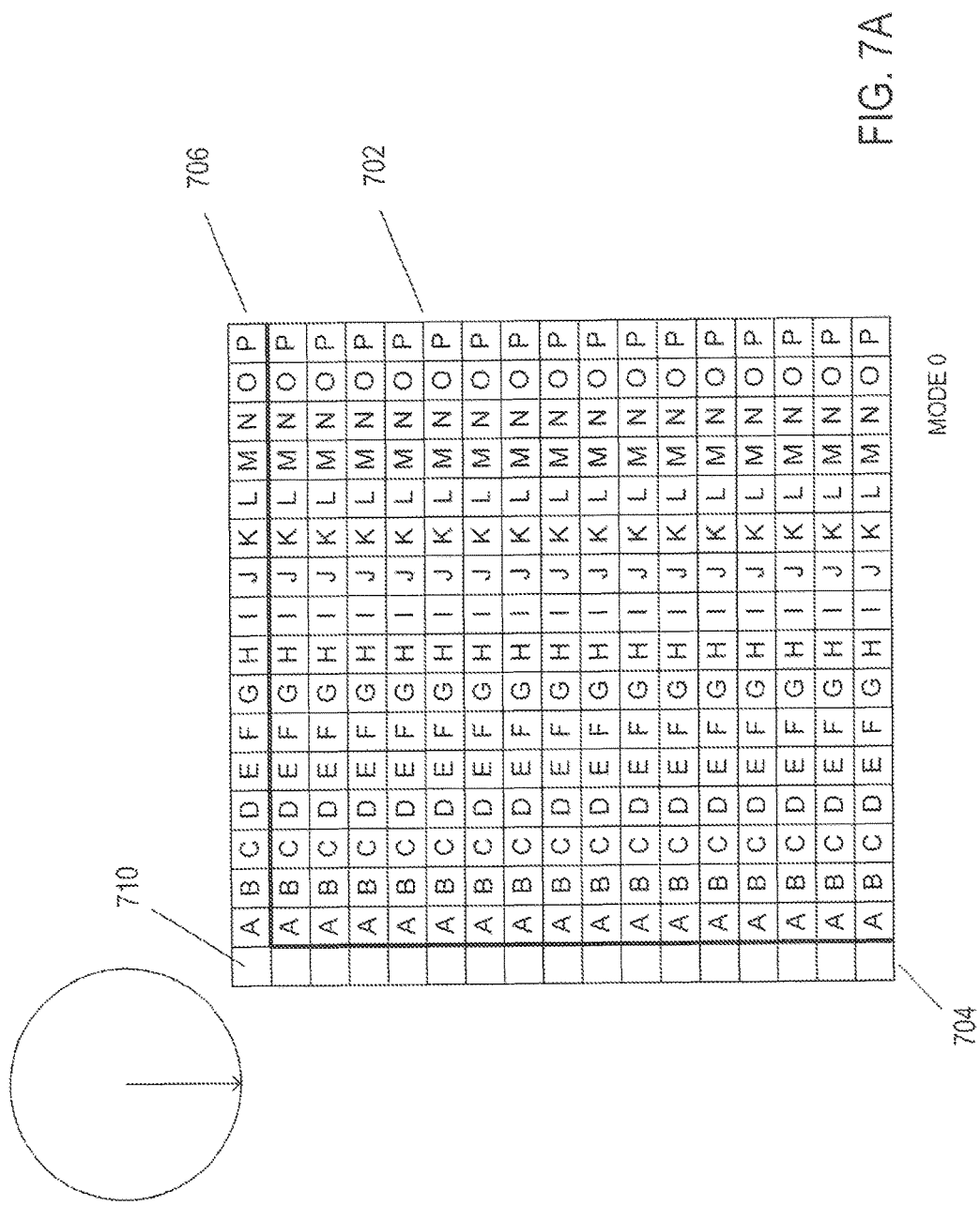
Figure 7B:
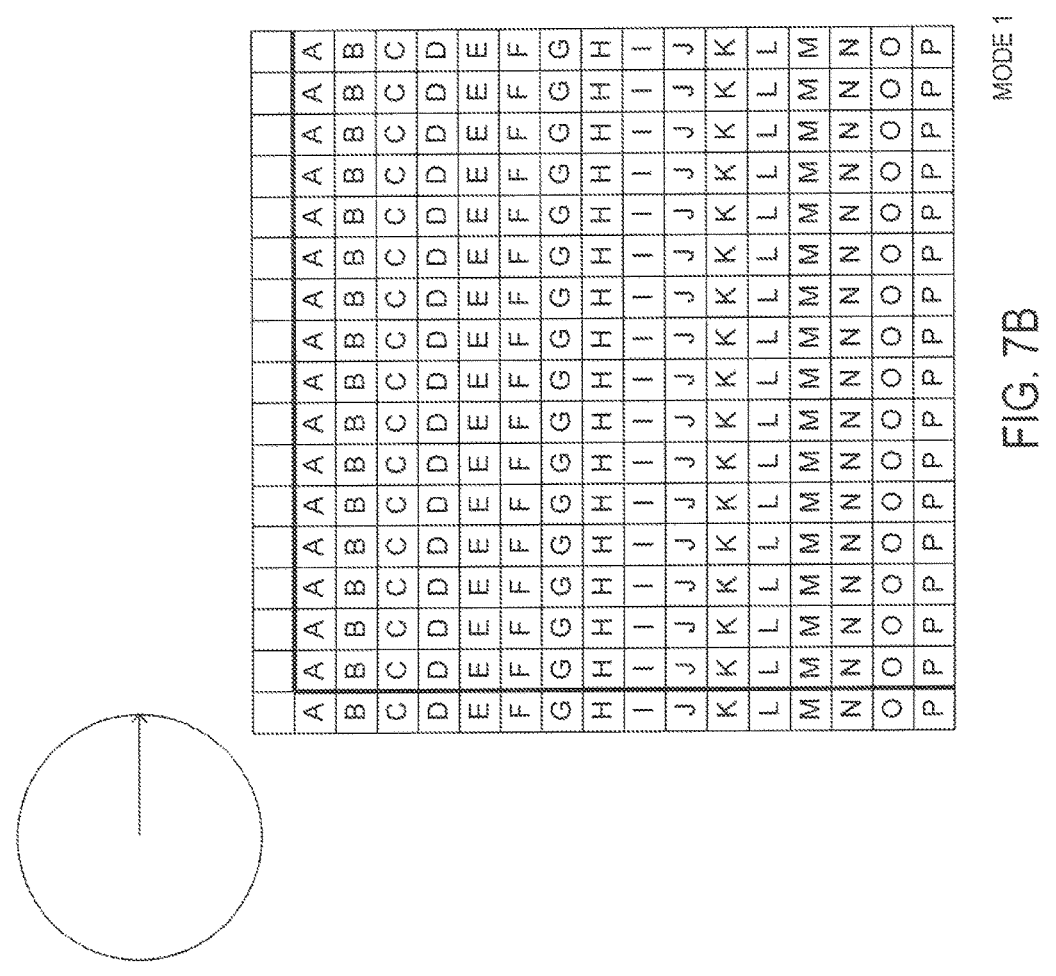

FIGS. 7A-7D illustrate, using similar illustration conventions as used in FIGS. 6A-B, two of the four modes for intra prediction of 16×16 luma blocks. In FIGS. 7A-B, the block being predicted is the 16×16 block in the lower right-hand portion of the matrix 702, the leftmost vertical column 704 is the rightmost vertical column of the left adjoining 16×16 luma block and the top horizontal row 706 is the bottom row of the upper adjoining 16×16 luma block. The upper leftmost cell 710 is the lower right-hand-corner cell of an upper, left diagonal 16×16 luma block. The 16×16 prediction, modes are similar to a subset of the 4×4 intra prediction modes, with the exception of mode 4, which is a relatively complex plane prediction mode that computes predicted values for each pixel from all of the pixels in the lower row of the upper, adjacent 16×16 luma block and the rightmost vertical column of the left adjacent 16×16 luma block. In general, the mode which produces a closest approximation to a current block that is being intra predicted is chosen as the intra-prediction mode to apply to the currently considered block. Predicted pixel values can be compared to actual pixel values using any of various comparison metrics, including mean pixel-value differences between the predicted and considered block, the mean of squared errors in pixel values, the sum of squared errors, and other such metrics. Coding and decoding using intra prediction is referred to as "spatial coding" and "interblock coding."

Figure 8:
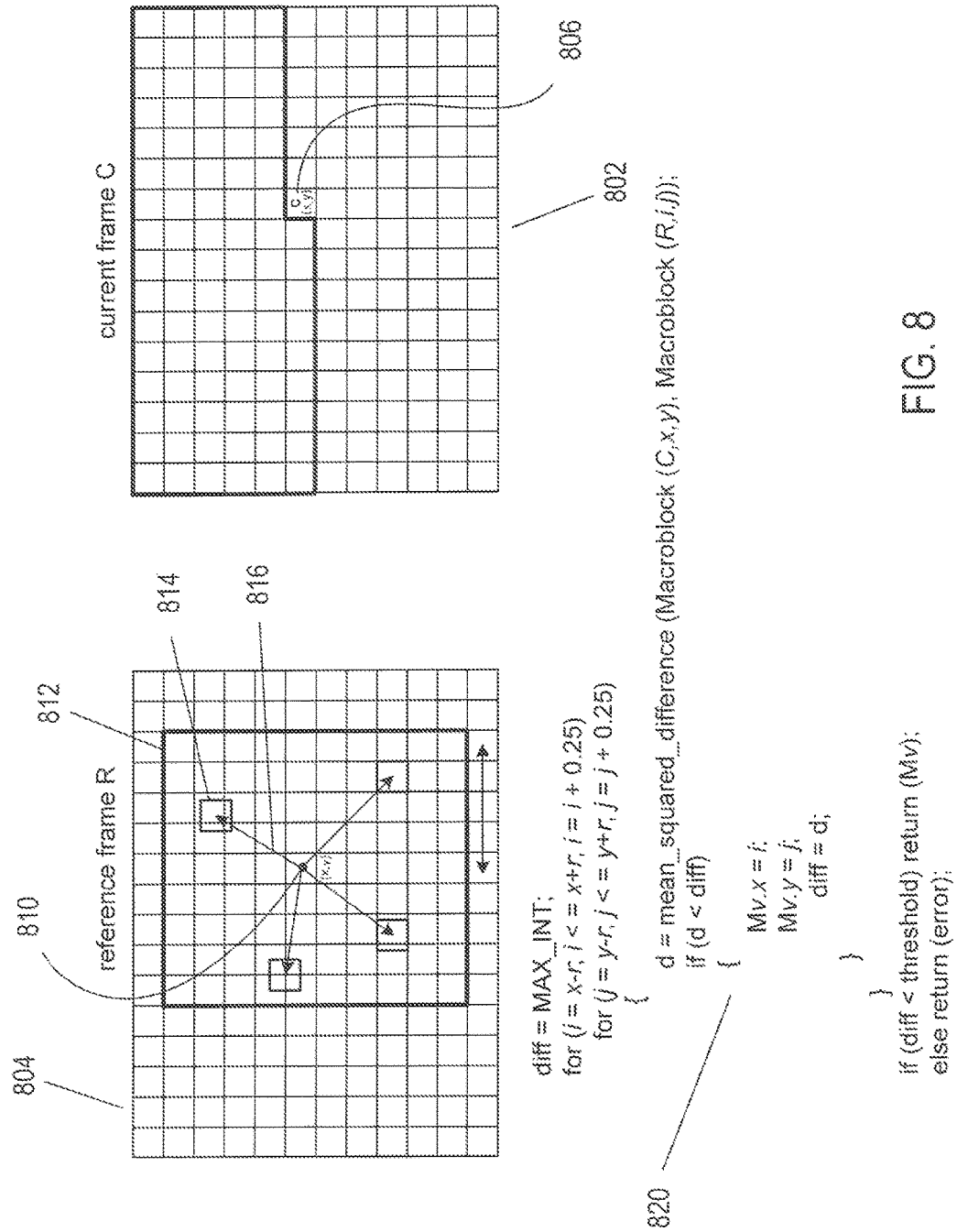
FIG. 8 illustrates inter prediction.

FIG. 8 illustrates inter prediction. Inter prediction, as discussed above, is temporal prediction, and can be thought of as motion-based prediction. For illustration purposes, consider a current frame 802 and a reference frame 804 that occurs, in the video signal, either before or after the current frame. At a current point in video compression, a currently considered macroblock 806 needs to be predicted from the contents of the reference frame. An example of the process is illustrated in FIG. 8. In the reference frame, a reference point 810 is chosen as the coordinates of the currently considered block 806, with respect to the current frame, applied to the reference frame. In other words, the process begins at the equivalent position, in the reference frame, of the currently considered block in the current frame. Then, within a bounded search space, indicated in FIG. 8 by a bold-lined square 812, each block within the search area is compared to the currently considered block 806 in the current frame in order to identify a block in the bounded search space 812 of the reference frame 804 most similar to the currently considered block 806. If the difference between the contents of the closest block, in pixel values, within the search area to the currently considered block is below a threshold value, then the closest block selected from the search area predicts the contents of the currently considered block. The selected block from the search area may be an actual block, or may be an estimated block at fractional coordinates with respect to the rectilinear pixel grid, with pixel values in the estimated block interpolated from actual pixel values in the reference frame. Thus, using inter prediction, rather than encoding the currently considered macroblock 806 as 256 pixel values, the currently considered macroblock 806 can be encoded as an identifier of the reference frame and a numerical representation of the vector that points from the reference point 810 to a macroblock selected from the bounded search space 812. For example, if the selected interpolated block 814 is found to most closely match the currently considered block 806, then the currently considered block can be encoded as an identifier for the reference frame 804, such as an offset, in frames, within the video signal from the current frame and a numerical representation of the vector 816 that represents the spatial displacement of the selected block 814 from the reference point 810.

Various different metrics can be used to compare the contents of actual or interpolated blocks within the search area of the reference frame 812 to the contents of the currently considered block 806, including a mean absolute pixel-value difference or a mean, squared difference between pixel values. C++-like pseudocode 820 is provided in FIG. 8 as an alternative description of the inter-prediction process described above. An encoded displacement vector is referred to as a motion vector. The spatial displacement of the selected block from the reference point in the reference frame corresponds to a temporal displacement of the currently considered macroblock in the video stream, which often corresponds to actual motion of objects in a video image. Motion-vector-based coding and decoding is referred to as "temporal coding" and as "interblock coding."

Figure 9A:
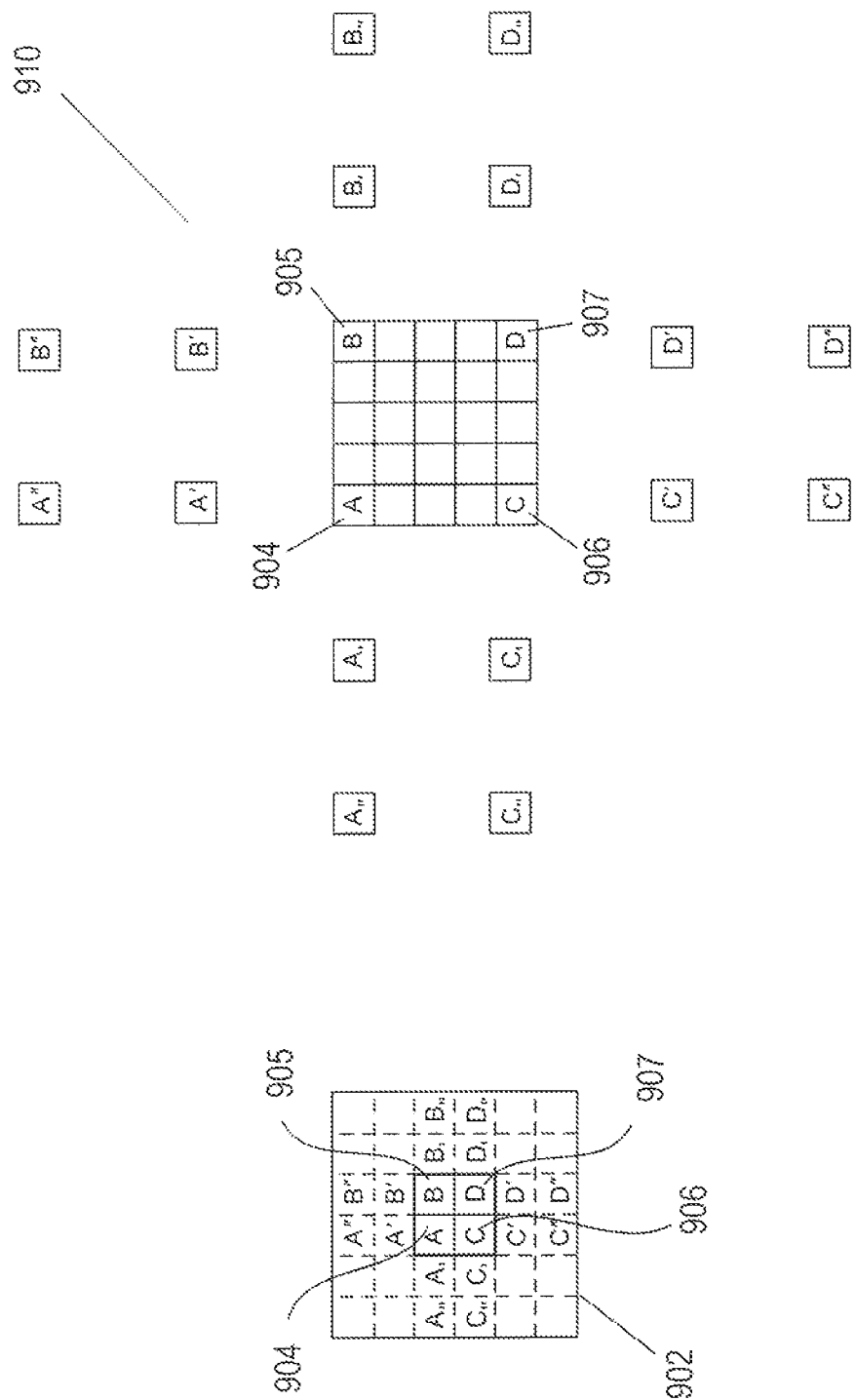
FIGS. 9A-D illustrate the interpolation process used to compute pixel values for blocks, within a search space of a reference frame, that can be thought of as occurring at fractional coordinates.
Figure 9B:
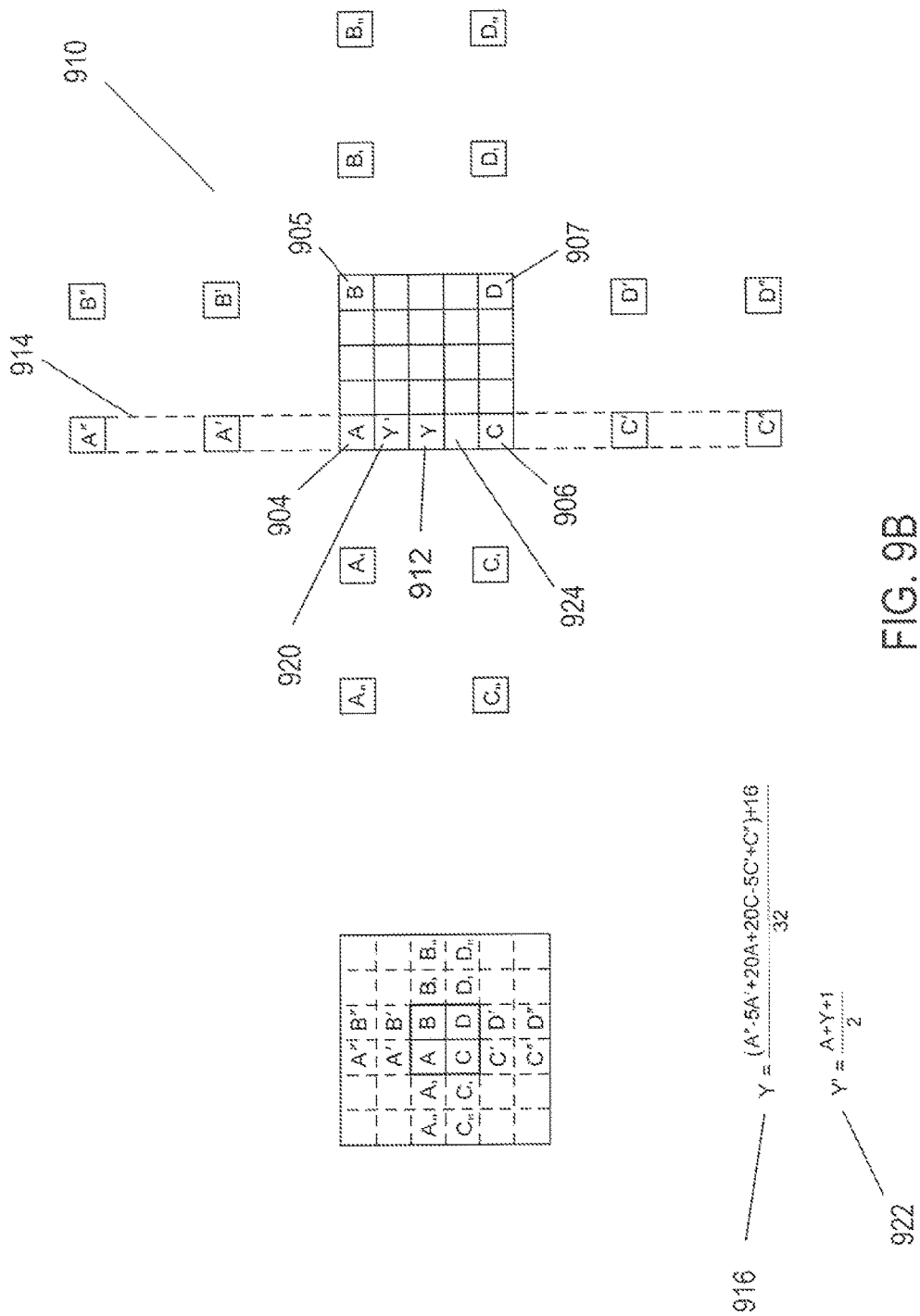
Figure 9C:
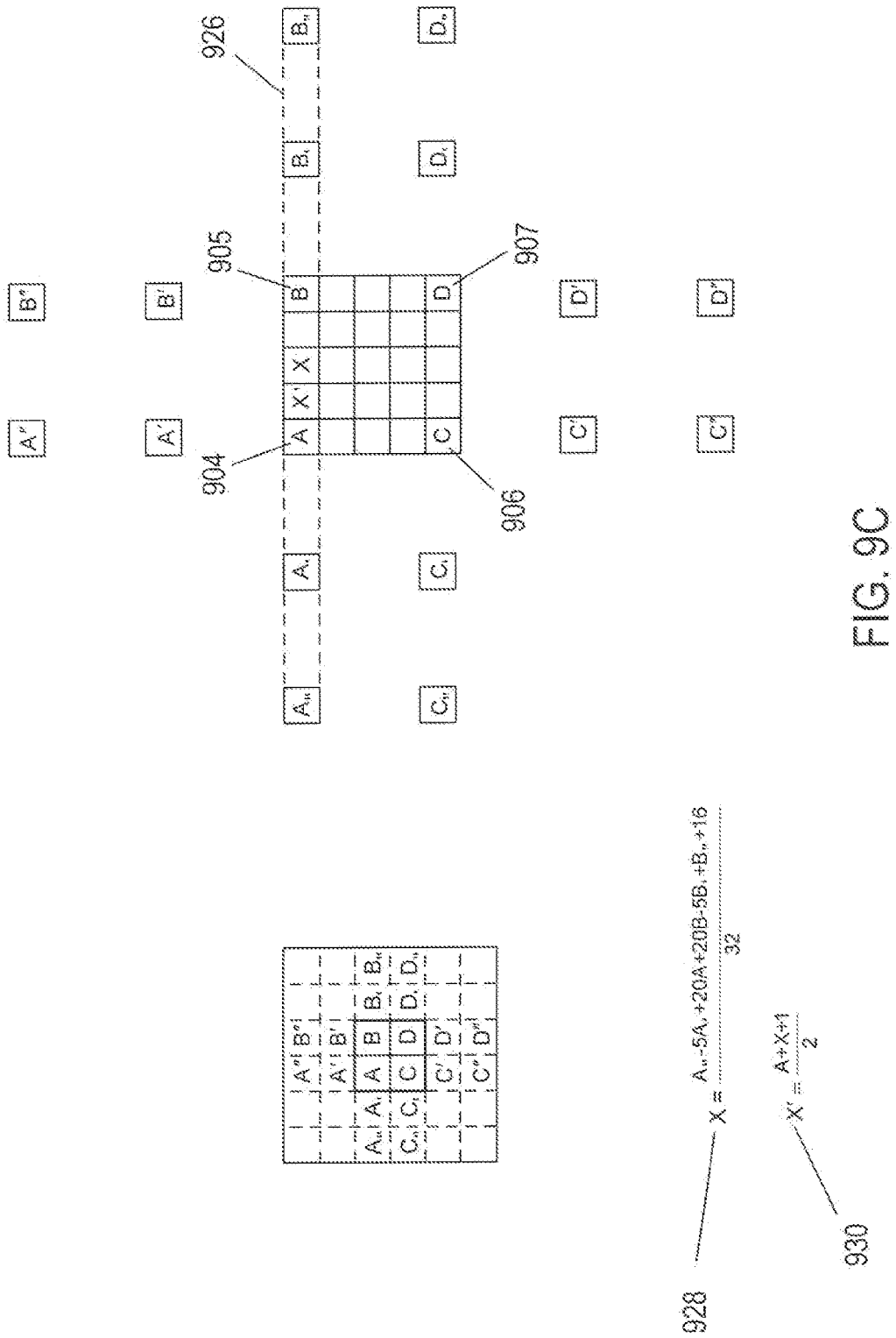
Figure 9D:
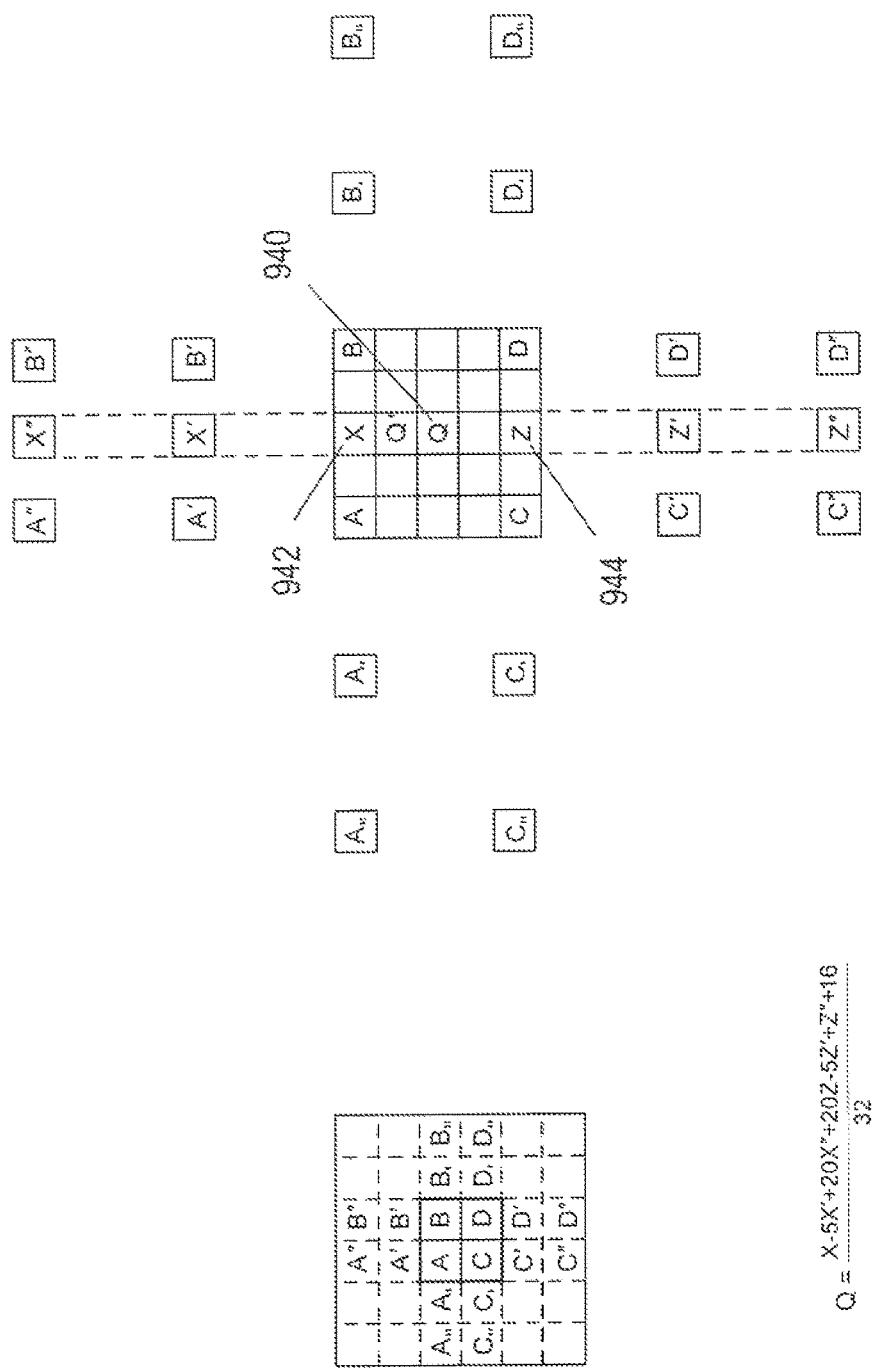

FIGS. 9A-D illustrate, an interpolation process used to compute pixel values for blocks, within a search area of a video frame, that can be thought of as occurring at fractional coordinates. The H.264 standard allows for a resolution of 0.25 with respect to integer pixel coordinates. The fractions of pixels that are described by these fractional coordinates are referred to as "q-pels," since q-pels have sides that are ¼, or one quarter, of the length of pixels. Consider the 6×6 block of pixels 902 to the left of FIG. 9A. The interpolation process can be considered as a translational expansion of the actual pixels in two dimensions and computation of interpolated values to insert between the expanded pixels. FIGS. 9A-D illustrate computation of the higher-resolution, inserted values between the central four pixels 904-907 in the 6×6 block of actual pixel values. The expansion is illustrated to the right of FIG. 9A 910. In this example, pixel values 904-907 have been spatially expanded, in two dimensions, and 21 new cells have been added to form a 5×5 matrix with the original pixel values 904-907 at the corners. The remaining pixels of the 6×6 matrix of pixels 902 have also been translationally expanded. FIG. 9B illustrates the interpolation process to produce interpolated value 912, midway between actual pixel values 904 and 906. A vertical filter is applied along the column of pixel values that include original pixel values 904 and 906, shown in FIG. 9B by dashed lines 914. Interpolated value Y 912 is computed according to formula 916. In this example, the value Y' 920 is interpolated by linear interpolation of the two vertical adjacent values, according to formula 922. The interpolation value 924 can be similarly computed by linear interpolation between values 912 and 906. The vertical filter 914 can be similarly applied to compute the interpolated values in the column containing original values 905 and 907. FIG. 9C illustrates computation of the interpolated values in horizontal rows between original values 904 and 905. In this example, a horizontal filter 926 is applied to actual pixel values, similar to application of the vertical filter in FIG. 9B. The mid-point interpolation value is computed by formula 928, and the quarter-point values on either side of the mid-point value can be obtained by linear interpolation according to formula 930 and a similar formula for the right-hand interpolated value between the mid-point and original value 905. The same horizontal filter can be applied to the final row containing original values 906 and 907. FIG. 9D illustrates computation of the central interpolated point 940 and adjacent quarter-points between the interpolated mid-point values 942 and 944. All remaining values can be obtained by linear interpolation.

Figure 10B:
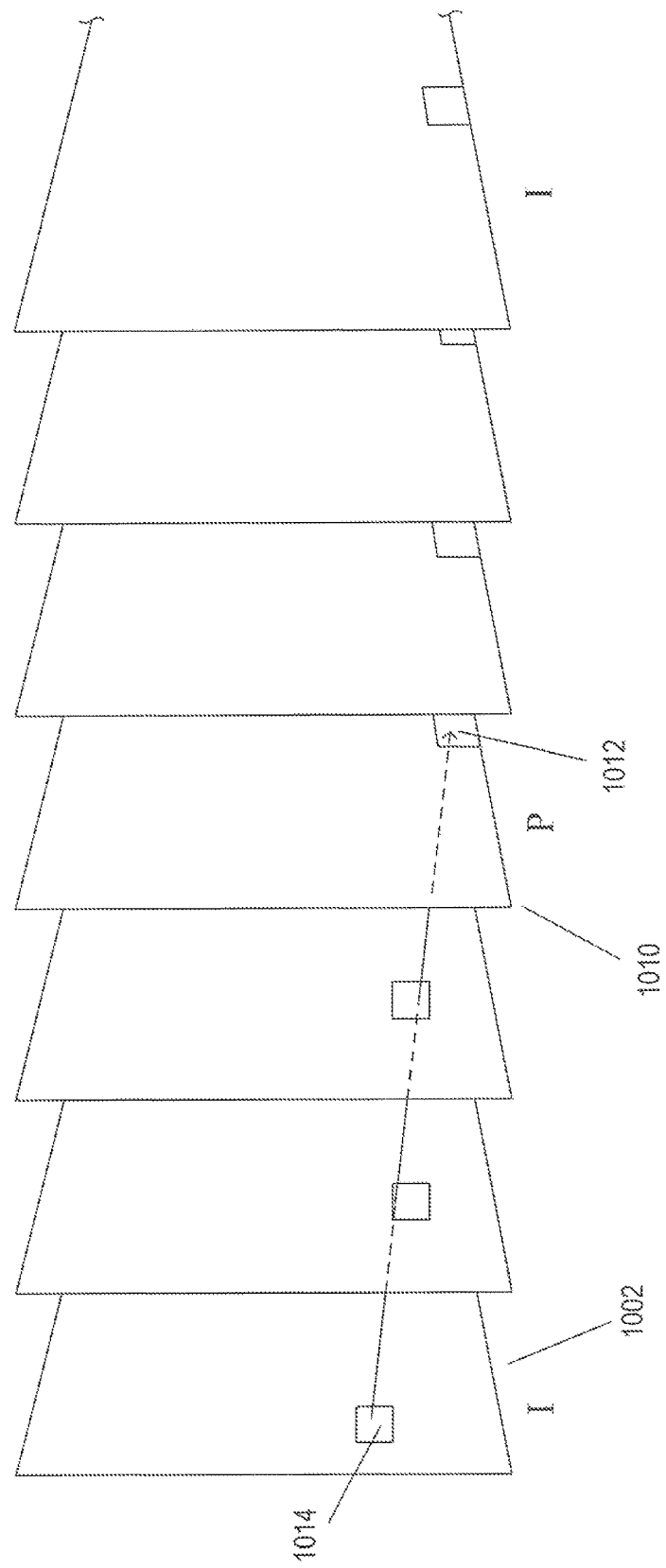

FIGS. 10A-C illustrate examples of different types of frames and the different types of inter prediction possible with respect to these different types of frames. As shown in FIG. 10A, a video signal comprises a linear sequence of video frames. In FIG. 10A, the sequence begins with frame 1002 and ends with frame 1008. A first type of frame in a video signal is referred to as an "I" frame. The pixel values of macroblocks of an I frame cannot be predicted by inter prediction. An I frame is a type of check point within a decompressed video signal. The contents of an encoded I frame depend only on the contents of the raw-signal I frame. Thus, when systematic errors occur in decompression involving problems associated with inter prediction, the video-signal decompression can be recovered by jumping ahead to a next I reference frame and resuming decoding from that frame. Such errors do not propagate past the I-frame barriers. In FIG. 10A, the first and last frames 1002 and 1004 are I frames.

A next type of frame is illustrated in FIG. 10B. A P frame 1010 may contain blocks that have been inter predicted from an I frame. In FIG. 10B, the block 1012 has been encoded as a motion vector and an identifier for reference frame 1002. The motion vector represents temporal movement of block 1014 in reference frame 1002 to the position of block 1012 in P frame 1010. P frames represent a type of prediction-constrained frame containing blocks that may have been predicted by inter prediction from reference frames. P frames represent another type of barrier frame within an encoded video signal. FIG. 10C illustrates a third type of frame. A B frame 1016-1019 may contain blocks predicted, by inter prediction, from one or two other B frames, P frames, or I frames. In FIG. 10C, B frame 1018 contains a block 1020 that is inter predicted from block 1022 in P frame 1010. B frame 1016 contains a block 1026 that is predicted both from block 1028 in B frame 1017 and block 1030 in reference frame 1002. B frames can make best use of inter prediction, and thus achieve highest compression due to inter prediction, but also have a higher probability of various errors and anomalies that may arise in the decoding process. When a block, such as block 1026, is predicted from two other blocks, the block is encoded as two different reference-frame identifiers and motion vectors, and the predicted block is generated as a weighted average of the pixel values in the two blocks from which it is predicted.

As mentioned above, were intra prediction and/or inter prediction completely accurate, extremely high compression ratios could be obtained. It is certainly more concise to represent a block as one or two motion vectors than as 256 different pixel values. It is even more efficient to represent a block as one of 13 different intra-prediction modes. However, as can be appreciated by the vast number of different possible macroblock values, considering a macroblock value to be a 256-byte-encoded numerical value, neither intra nor inter prediction can possibly produce an exact prediction of the contents of blocks within a video frame, unless the video signal in which the video frame is contained contains no noise and almost no information, such as a video of a uniform, unchanging, solid-color background. However, even though intra and inter prediction cannot exactly predict the contents of macroblocks, in general, they can often relatively closely approximate the contents of macroblocks. This approximation can be used to generate difference macroblocks that represent the difference between an actual macroblock and the predicted values for the macroblock obtained by either intra or inter prediction. When the prediction is good, the resulting difference block generally contains only small or even zero pixel values.

Figure 11:
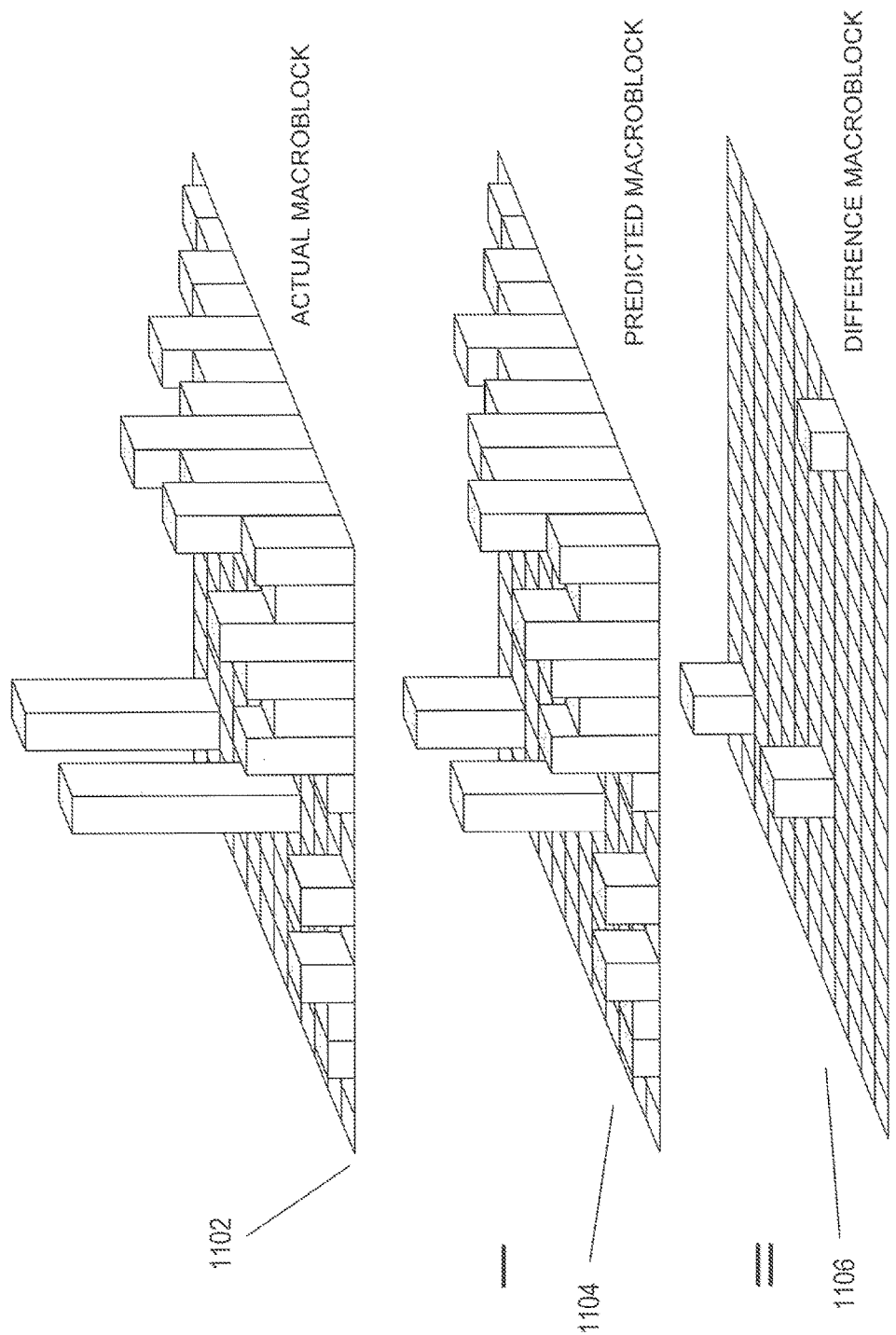
FIG. 11 illustrates generation of difference macroblocks.

FIG. 11 illustrates examples of generation of difference macroblocks. In the FIG. 11 example, macroblocks are shown as three-dimensional graphs, in which the height of columns above a two-dimensional surface of the macroblock represents the magnitudes of pixel values within the macroblock. In FIG. 11, the actual macroblock within a currently considered frame is shown as the top three-dimensional graph 1102. The middle, three-dimensional graph represents a predicted macroblock obtained by either intra or inter prediction. Note that the three-dimensional graph of the predicted macroblock 1104 is quite similar to the actual macroblock 1102. FIG. 11 represents a case where either intra or inter prediction has generated a very close approximation of the actual macroblock. Subtraction of the predicted macroblock from the actual macroblock generates a difference macroblock, shown as the lower three-dimensional graph 1106 in FIG. 11. While FIG. 11 is an exaggeration of a best case prediction, it does illustrate that the difference macroblock not only generally contains smaller-magnitude values, but often fewer non-zero values, than the actual end-predicted macroblocks. Also note that the actual macroblock can be fully restored by adding the difference macroblock to the predicted macroblock. Of course, predicted pixel values may exceed or fall below actual pixel values, so that the difference macroblock may contain both positive and negative values. However, by way of example, shifting of the origin can be used to produce an all-positive-valued difference macroblock.

Figure 12:
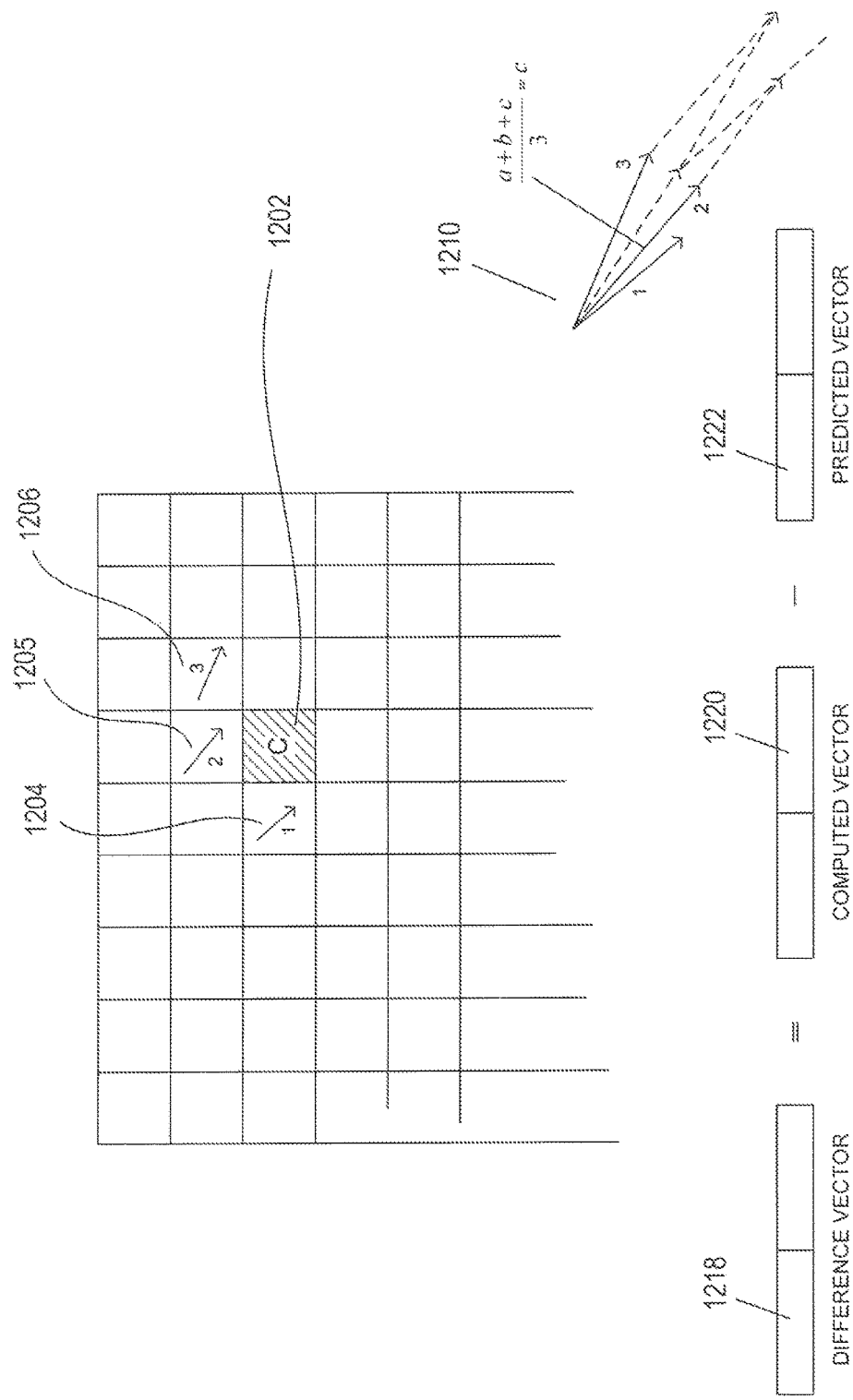
FIG. 12 illustrates motion-vector and intra-prediction-mode prediction.

Just as the pixel values within a macroblock can be predicted from the values in blocks spatially adjacent and/or temporally adjacent to the macroblock, the motion vectors generated by inter prediction and the modes generated by intra prediction, can also be predicted. FIG. 12 illustrates an example of motion-vector and intra-prediction-mode prediction. In FIG. 12, a currently considered block 1202 is shown within a grid of blocks of a portion of a frame. Adjacent blocks 1204-1206 have already been compressed by intra or inter prediction. Therefore, there is either an intra-prediction mode, which is a type of displacement vector, or an inter-prediction motion vector associated with these neighbouring, already compressed blocks. It is therefore reasonable to assume that the spatial vector or temporal vector, depending on whether intra or inter prediction is used, associated with the currently considered block 1202 would be similar to the spatial or temporal vectors associated with the neighbouring, already compressed blocks 1204-1206. In fact, the spatial or temporal vector associated with currently considered block 1202 may be predicted as the average of the spatial or temporal vectors of the neighbouring blocks, as shown by the vector addition 1210 to the right of FIG. 12. Therefore, rather than coding motion vectors or inter-prediction modes directly the H.264 standard computes a difference vector 1218, based on vector prediction, as the predicted vector 1222 subtracted from the actual computed vector 1220. The temporal motion of blocks between frames and spatial homogeneities within a frame would be expected to be generally correlated, and, therefore, predicted vectors would be expected to closely approximate actual, computed vectors. The difference vector is therefore generally of smaller magnitude than the actual, computed vector, and therefore can be encoded using fewer bits. Again, as with a difference macroblock, the actual, computed vector can be accurately reconstituted by adding the difference vector to the predicted vector.

Once a difference macroblock is produced, by either inter or intra prediction, the difference macroblock is then decomposed into 4×4 difference blocks, according to a predetermined order, each of which is transformed by an integer transform to produce a corresponding coefficient block, the coefficients of which are then quantized to produce a final sequence of quantized coefficients. The advantage of intra and inter prediction is that the transform of the difference block generally produces a large number of trailing zero coefficients, which can be quite efficiently compressed by a subsequent entropy-coding step.

Figure 13:
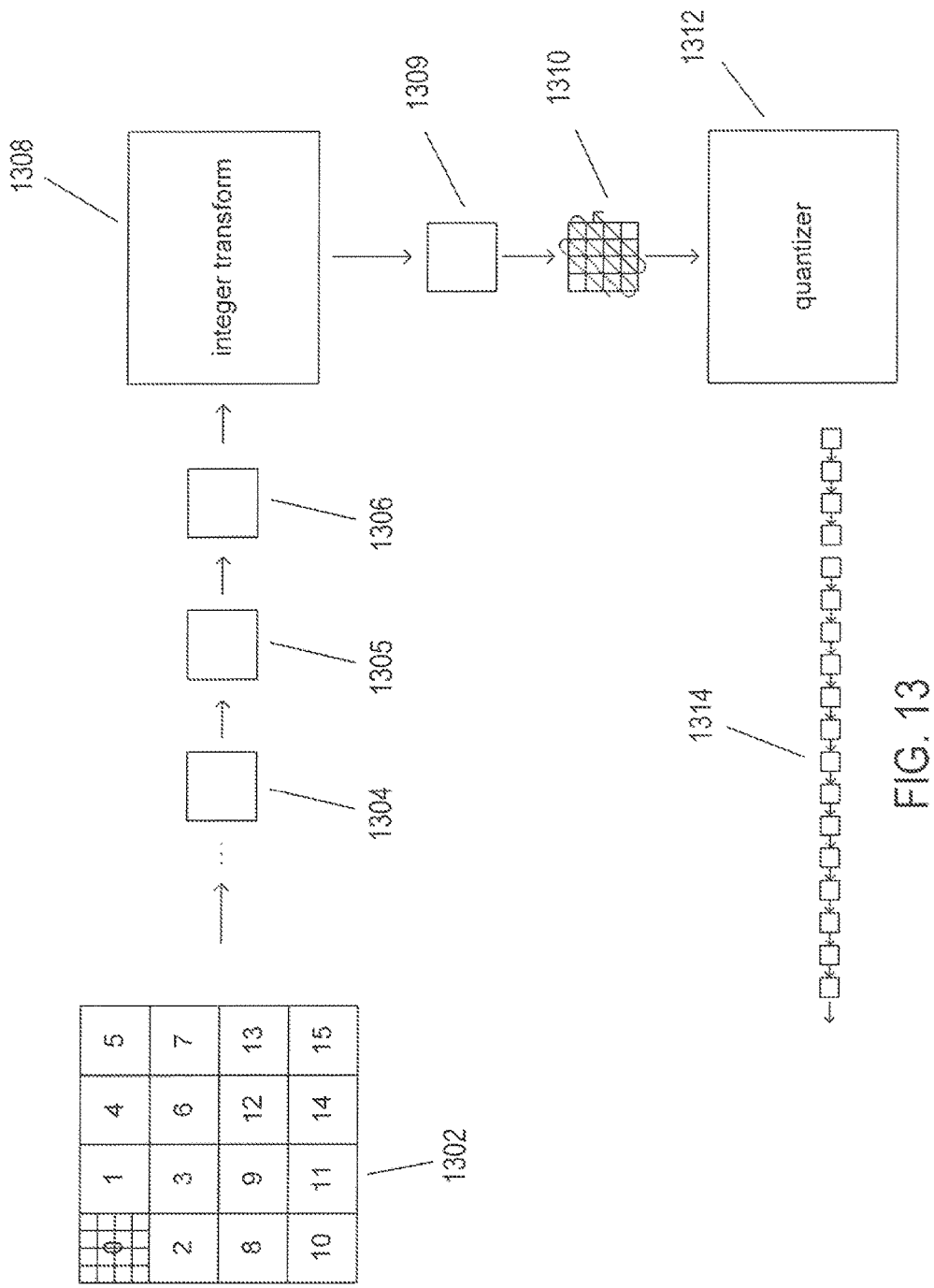
FIG. 13 illustrates decomposition, integer transformation, and quantization of a difference macroblock.

FIG. 13 illustrates one example of decomposition, integer transformation, and quantization of a difference macroblock. In this example, the difference macroblock 1302 is decomposed into 4×4 difference blocks 1304-1306 in the order described by the numerical labels of the cells of the difference macroblock in FIG. 13. An integer transform 1308 computation is performed on each 4×4 difference block to produce a corresponding 4×4 coefficient block 1309. The coefficients in the transformed 4×4 block are serialized according to a zig-zag serialization pattern 1310 to produce a linear sequence of coefficients which are then quantized by a quantization computation 1312 to produce a sequence 1314 of quantized coefficients. Many of the already discussed steps in video-signal compression are lossless. Macroblocks can be losslessly regenerated from intra or inter prediction methods and corresponding difference macroblocks. There is also an exact inverse of the integer transform. However, the quantization step 1312 is a form of lossy compression in that, once quantized, an approximate value of the original coefficient can be regenerated by an approximate inverse of the quantization method, referred to as "rescaling." Chroma-plane decimation is another lossy compression step, in that the higher-resolution chroma data cannot be recovered from lower-resolution chroma data. Quantization and chroma-plane decimation are, in fact, the two lossy compression steps in the H.264 video-compression technique.

FIG. 14 provides derivation of the integer transform and inverse integer transform employed in H.264 video compression and video decompression, respectively. The symbol "X" 1402 represents a 4×4 difference, or residual, block (e.g. 1304-1306 in FIG. 13). A discrete cosine transform, a well-known discrete-Fourier-like transform, is defined by a first set of expressions 1404 in FIG. 14. The discrete cosine transform is, as shown in expression 1406, a matrix-multiplication-based operation. The discrete cosine transform can be factored as shown in expression 1408 in FIG. 14. The elements of matrix C 1410 include a rational number "d" 1412. In order to efficiently approximate the discrete cosine transform, this number can be approximated as ½, leading to approximate matrix elements 1414 in FIG. 14. This approximation, with multiplication of two rows of matrix C in order to produce all-integer elements, produces the integer transform 1418 in FIG. 14 and a corresponding inverse integer transform 1420.

Figure 15:
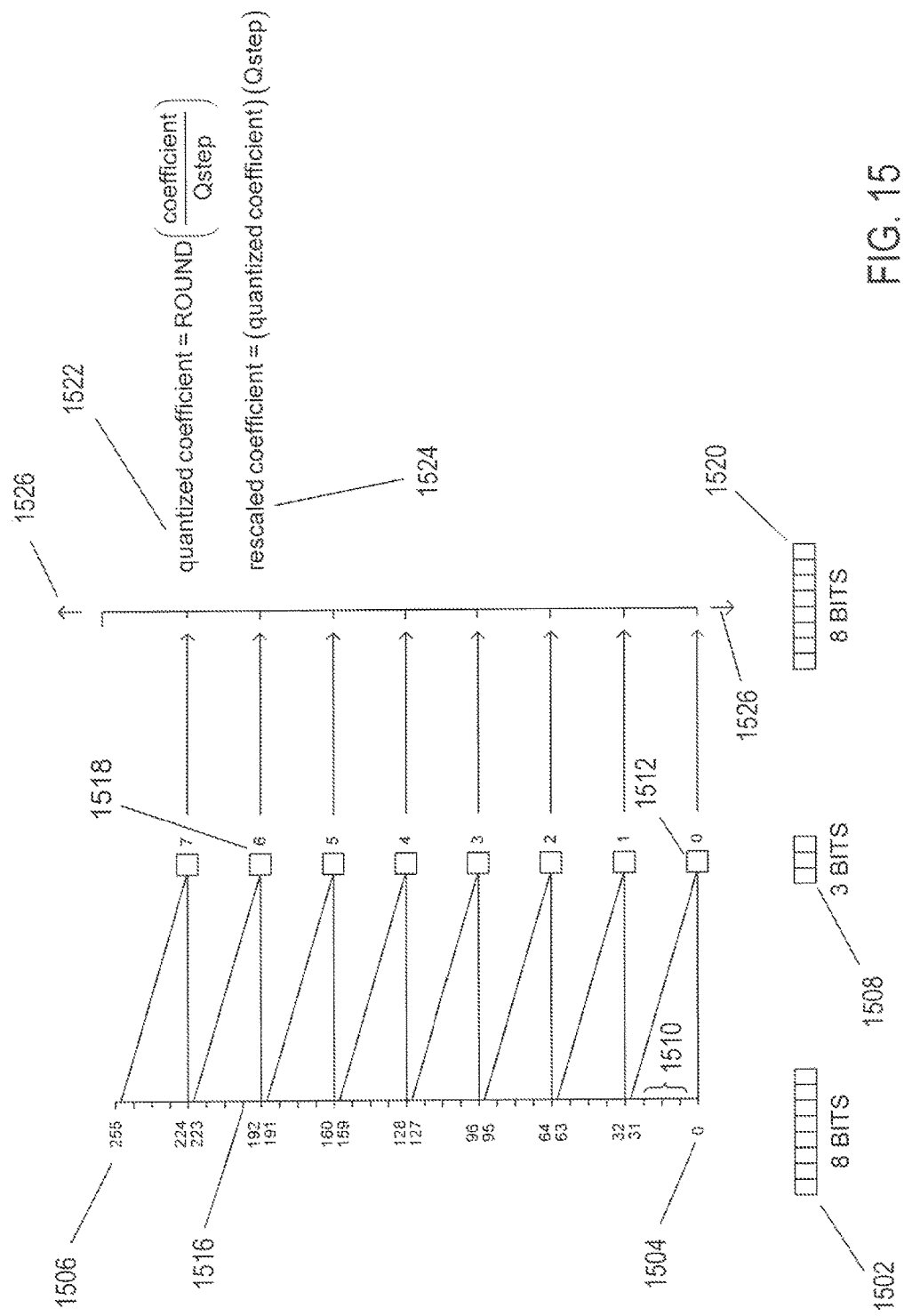
FIG. 15 illustrates the quantization process.

FIG. 15 illustrates the quantization process. Consider, as a simple example, a number encoded in eight bits 1502 that can therefore range in value between 0 (1504 in FIG. 15) and 255 (1506 in FIG. 15), potentially assuming any integer value in the range 0-255. A quantization process can be used to encode the eight-bit number 1502 in only three bits 1508 by an inverse linear interpolation of integers in the range 0-255 to integers in the range 0-7, as shown in FIG. 15. In this case, integer values 0-31 represented by an eight-bit-encoded number are all mapped to the value 0 (1512 in FIG. 15). Successive ranges of 32 integer values are mapped to the values 1-7. Thus, for example, quantization of the integer 200 (1516 in FIG. 15) produces the quantized value 6 (1518 in FIG. 15). Eight-bit values can be regenerated from the three-bit quantized values by simple multiplication. The three-bit quantized value can be multiplied by 32 to produce an approximation of the original eight-bit number. However, the approximate number 1520 can have only one of the values 0, 32, 64, . . . , 224. In other words, quantization is a form of numeric-value decimation, or loss of precision. A rescaling process, or multiplication, can be used to regenerate numbers that approximate the original values that were quantized, but cannot recover the precision lost in the quantization process. In general, quantization is expressed by formula 1522, and the inverse of quantization, or rescaling, is expressed by formula 1524. The value "Qstep" in these formulas controls the degree of precision lost in the quantization procedure. In the example illustrated on the left side of FIG. 15, Qstep has the value "32." A smaller value of Qstep provides a smaller loss in precision, but also less compression, while larger values provide greater compression, but also greater loss of precision. For example, in the example shown in FIG. 15, had Qstep been 128 rather than 32, the eight-bit number could have been encoded in a single bit, but rescaling would produce only the two values 0 and 128. Note also that the rescaled values can be vertically shifted, as indicated by arrows 1526 and 1528, by an additional-addition step following rescaling. For example, in the example shown in FIG. 15, rather than generating values 0, 32, 64, . . . , 224, addition of 16 to the rescaled values generates corresponding values of 16, 48, . . . , 240, leaving a less dramatic gap at the top of the rescaled vertical number line.

Following quantization of residual, or difference, blocks and collection of difference vectors and other objects produced as a stream of data from the steps upstream to entropy encoding, an entropy encoder is applied to the partially compressed data stream to produce an entropy-encoded data stream. Entropy encoding is a lossless encoding technique that takes advantage of statistical non-uniformities in the partially encoded data stream. One well-known example of entropy encoding is the Morse code, which uses single-pulse encoding of commonly occurring letters, such as "E" and "T," and four-pulse or five-pulse encodings of infrequently encountered letters, such as "Q" and "Z."

Figure 16:
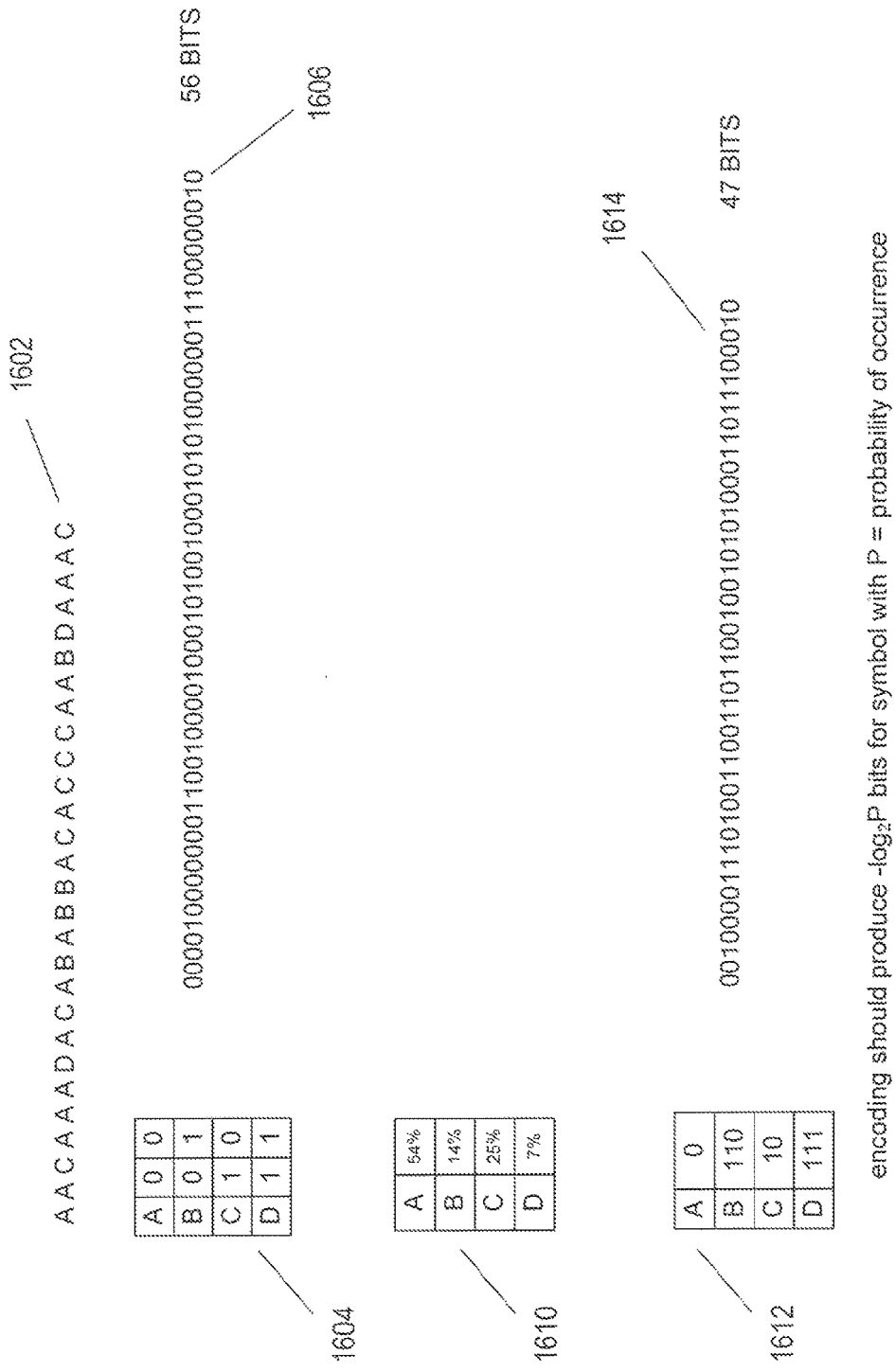
FIG. 16 provides a numerical example of entropy encoding.

FIG. 16 provides numerical example of entropy encoding. Consider the four-symbol character string 1602 comprising 28 symbols, each selected from one of the four letters "A," "B," "C," and "D," A simple and intuitive encoding of this 28-symbol string would be to assign one of four different two-bit codes to each of the four letters, as shown in the encoding table 1604. Using this two-bit encoding, a 56-bit encoded symbol string 1606 equivalent to symbol string 1602 is produced. However, analysis of the symbol string 1602 reveals the percentage occurrence of each symbol, shown in table 1610. "A" is, by far, the most frequently occurring symbol, and "D" is, by far, the least frequently occurring symbol. A better encoding is represented by encoding table 1612, which uses a variable-length representation of each symbol. "A" being the most frequently occurring symbol, is assigned the code "0." The least frequently occurring symbols "B" and "D" are assigned the codes "110" and "111," respectively. Using this encoding produces the encoded symbol string 1614, which uses only 47 bits. In general, a binary entropy encoding produces an encoded symbol of −log 2P bits for symbols with a probability of occurrence of P. While the improvement in encoding length is not spectacular in the example shown in FIG. 16, for long sequences of symbols having decidedly non-uniform symbol-occurrence distributions, entropy encoding produces relatively high compression ratios.

Figure 17A:
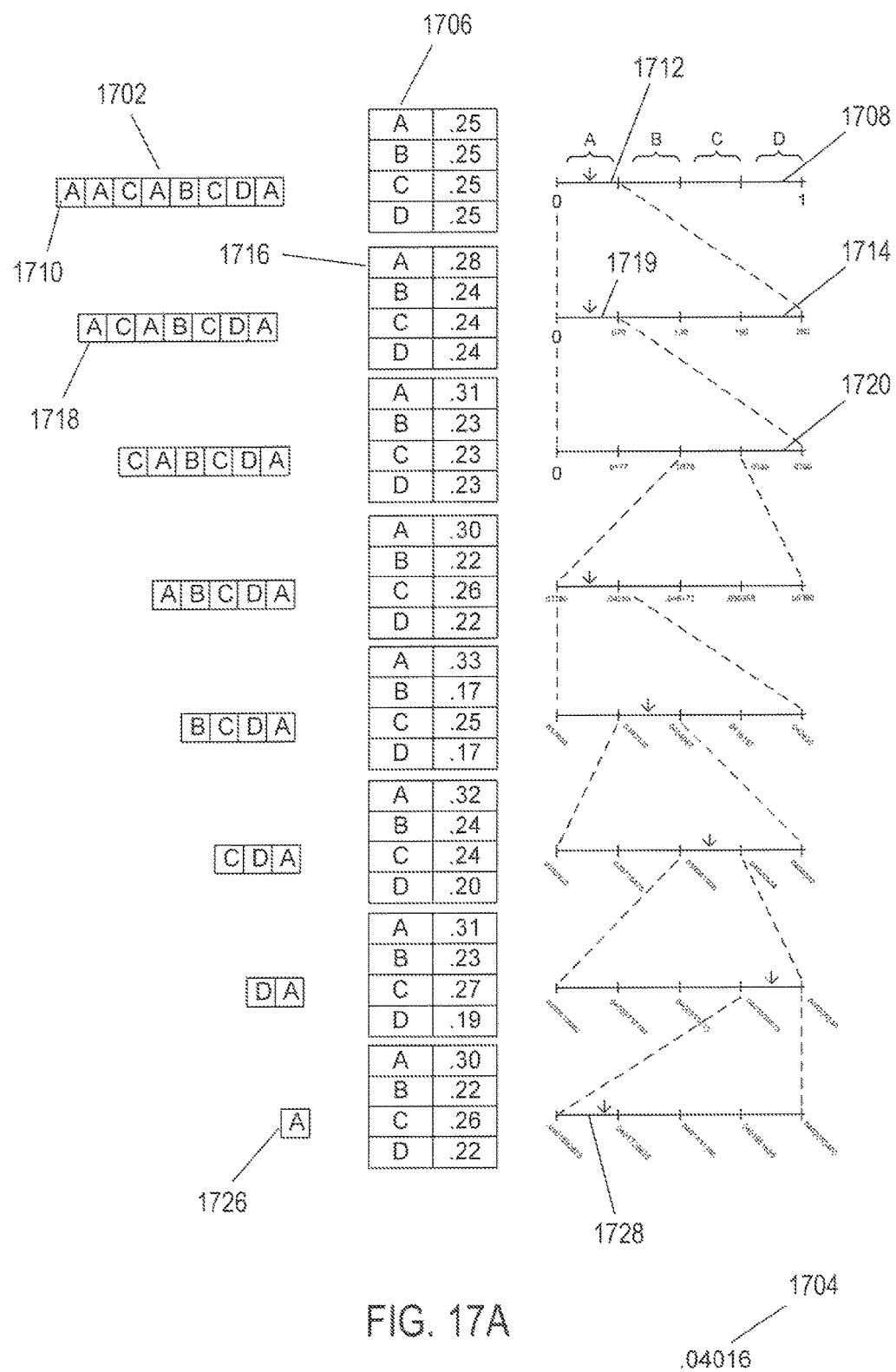
FIGS. 17A-B provide an example of arithmetic encoding.
Figure 17B:
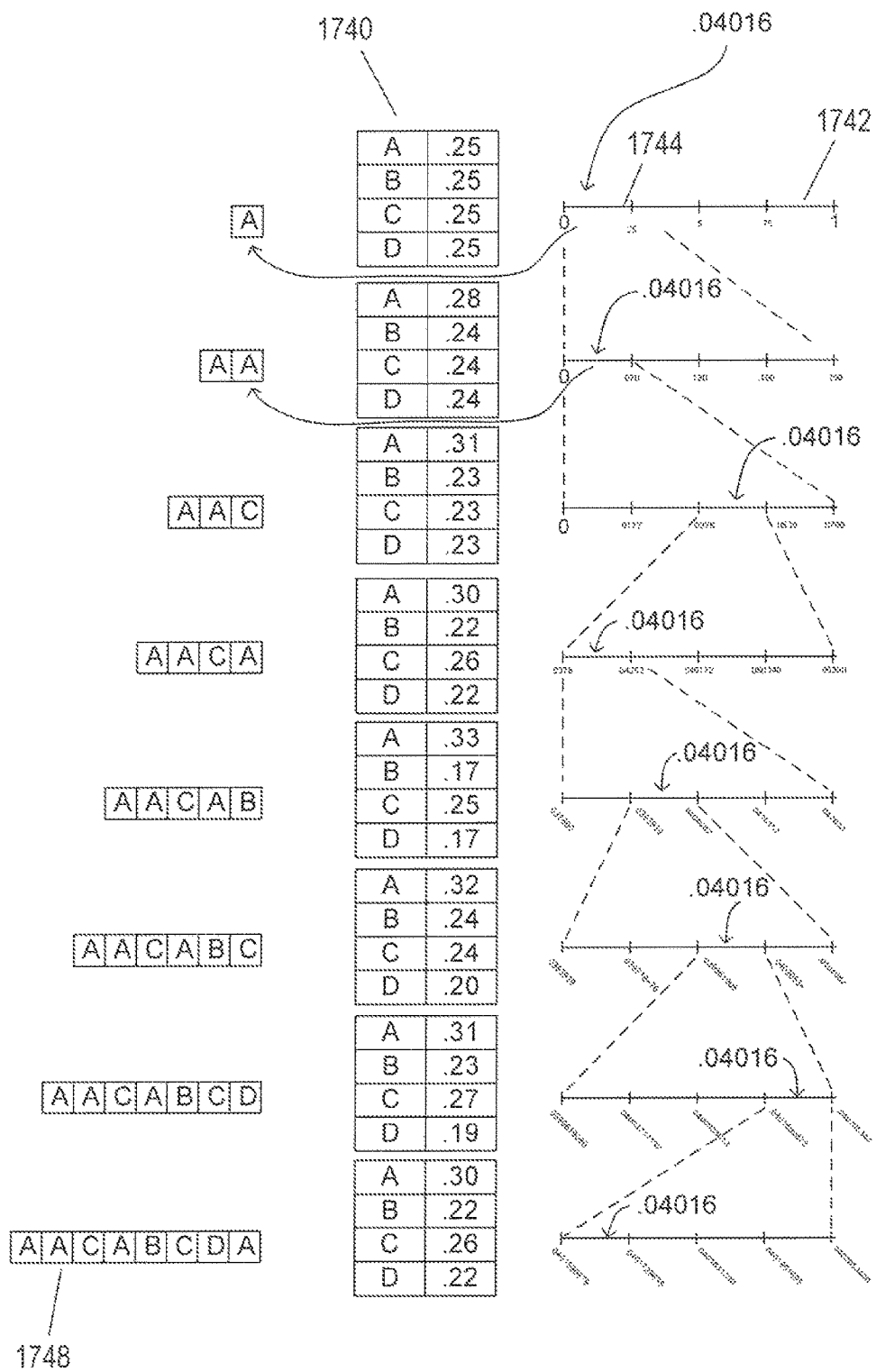

One type of entropy, encoding is referred to as "arithmetic encoding." A simple example is provided in FIGS. 17A-B. The arithmetic encoding illustrated in FIGS. 17A-B is a version of a context-adaptive encoding method. In this example, an eight-symbol sequence 1702 is encoded as a five-place fractional value 0.04016 (1704 in FIG. 17A), which can be encoded by any of various known binary numerical encodings to produce a binary encoded symbol string. In this simple example, a symbol-occurrence-probability table 1706 is updated constantly during the coding process. This provides context adaption, since the encoding method dynamically changes, over time, as the symbol-occurrence probabilities are adjusted according to the symbol-occurrence frequencies observed during coding. Initially, for lack of a better set of initial probabilities, the probability for all symbols is set to 0.25. At each step, an interval is employed. The interval at each step is represented by a number line, such as number line 1708. Initially, the interval ranges from 0 to 1. At each step, the interval is divided into four partitions according to the probabilities in the current symbol-occurrence-frequency table. Because the initial table contains equal probabilities of 0.25, the interval is divided, in the first step, into four equal parts. In the first step, the first symbol "A" 1710 in the symbol sequence 1702 is encoded. The interval partition 1712 corresponding to this first symbol is selected as the interval 1714 for the next step. Furthermore, because the symbol "A" was encountered, the symbol-occurrence probabilities are adjusted in the next version of the table 1716 by increasing probability of occurrence for symbol "A" by 0.03, and decreasing probabilities of occurrence of the remaining symbols by 0.01. The next symbol is also "A" 1718, and so the first interval partition 1719 is again selected to be the subsequent interval 1720 for the third step. This process continues until all symbols in the symbol string have been consumed. The final symbol, "A," 1726, selects the first interval 1728 in the final interval computed in the procedure. Note that the intervals decrease in size with each step, and generally require a greater number of decimal places to specify. The symbol string can be encoded by selecting any value within the final interval 1728. The value 0.04016 falls within this interval, and therefore represents an encoding of the symbol string. The original symbol string can be regenerated, as shown in FIG. 17B, by starting the process again with an initial, equals-valued symbol-occurrence-frequency probability table 1740 and an initial interval of 0-1 1742. The encoding, 0.04016, is used to select a first partition 1744 which corresponds to the symbol "A." Then, in steps similar to the steps in the forward process, shown in FIG. 17A, the encoding 0.04016 is used to select each subsequent partition of each subsequent interval until the final symbol string is regenerated 1748.

While this example illustrates the general concept of arithmetic encoding, it is an artificial example, because the example assumes infinite precision arithmetic and because the symbol-occurrence-frequency-probability table adjustment algorithm would quickly lead to unworkable values. Actual arithmetic encoding does not assume infinite precision arithmetic, and instead employs techniques to adjust the intervals in order to allow for interval specification and selection within the precision provided by any particular computer system. The H.264 standard specifies several different encoding schemes, one of which is a context-adaptive arithmetic encoding scheme. Table-lookup procedures are used for encoding frequently occurring symbol strings produced by the up-stream encoding techniques, including various metadata and parameters included in the partially compressed data stream to facilitate subsequent decompression.

Figure 18:
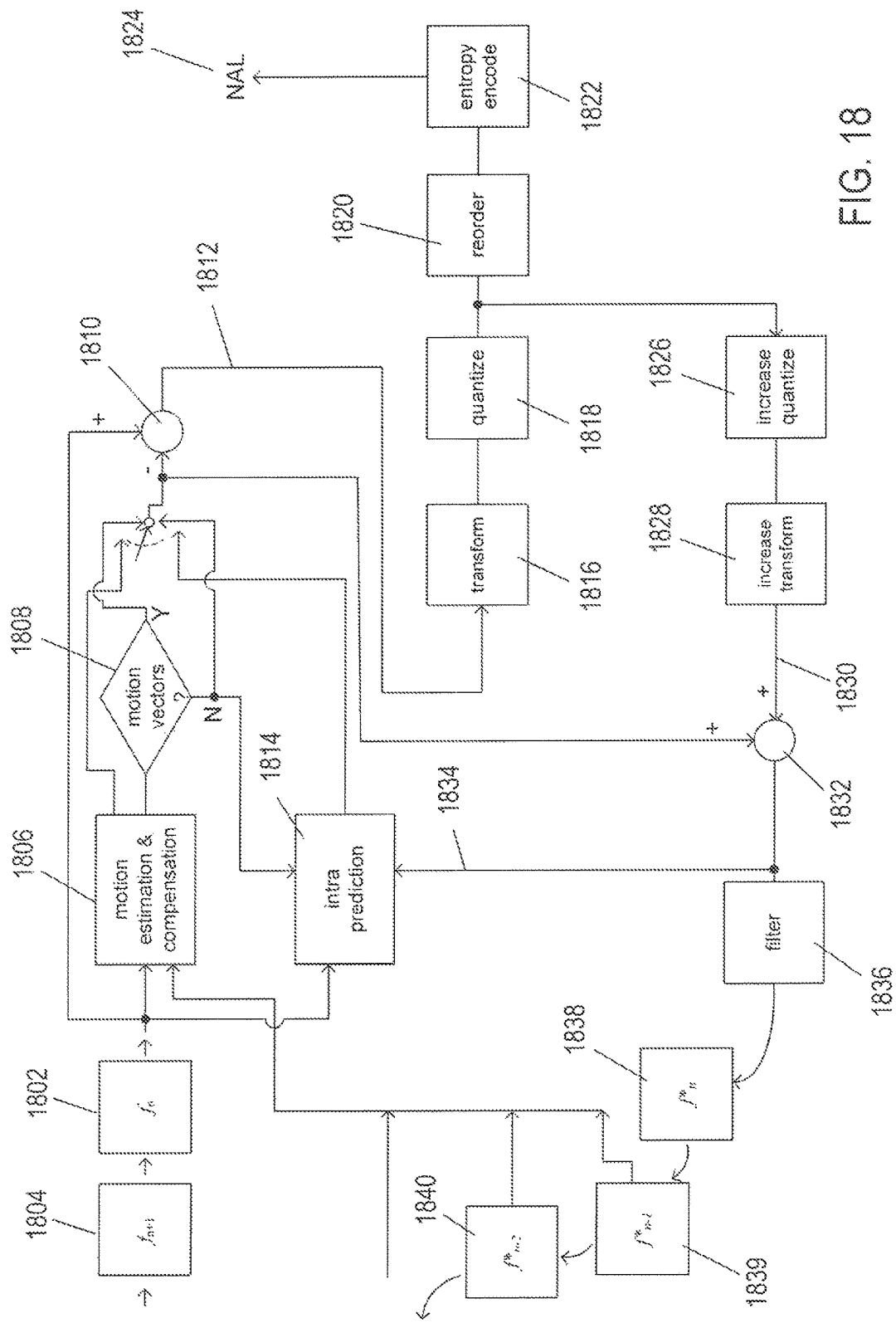
FIG. 18 summarizes H.264 video-data-stream encoding.

FIG. 18 summarizes H.264 video-data-stream encoding. FIG. 18 provides a block diagram, and a therefore high-level description of the encoding process. However, this diagram, along with the previous discussion and previously referenced figures, provides a substantial overview of H.264 encoding. It should be noted that there are a plethora of fine points, details, and special cases in video encoding and video decoding that cannot be addressed in an overview section of this document. The official H.264 specification is over 500 pages long. These many details include, for example, special cases that arise from various boundary conditions, specific details and optional alternative methods that can be applied in various context-related cases. Consider, for example, intra prediction. Intra prediction modes depend on the availability of pixel values in specific, neighbouring blocks. For boundary blocks without neighbours, many of the modes cannot be used. In certain cases, unavailable neighbouring pixel values may be interpolated or approximated in order to allow a particular intra-prediction mode to be used. Many interesting details in the encoding process are related to choosing optimal prediction methods, quantization parameters, and making other such parameter choices in order to optimize the compression of a video data stream. The H.264 standard does not specify how compression is to be carried out, but instead specifies the format and contents of an encoded video-data stream and how the encoded video-data stream is to be decompressed. The H.264 standard also provides a variety of different levels of differing computational complexity, with high-end levels supporting more computationally expensive, but more efficient additional steps and methods.

In FIG. 18, a stream of frames 1802-1804 are provided as input to an encoding method. In this example, the frames are decomposed into macroblocks or macroblock partitions, as discussed above, for subsequent processing. In a first processing step, a currently considered macroblock or macroblock partition is attempted to be inter predicted from one or more reference frames. When inter prediction is successful, and one or more motion vectors generated, as determined in step 1808, then the predicted macroblock generated by the motion estimation and compensation step 1806 is subtracted from the actual, raw macroblock in a differencing step 1810 to produce a corresponding residual macroblock which is output by the differencing step onto data path 1812. However, if inter prediction fails, as also determined in step 1808, then an intra prediction step 1814 is launched to carry out intra prediction on the macroblock or macroblock partition, which is then subtracted from the actual raw macroblock or macroblock partition, in step 1810, to produce a residual macroblock or residual macroblock partition output to data path 1812. The residual macroblock or residual macroblock partition is then transformed, by the transform step 1816, quantized by the quantize step 1818, potentially re-ordered for more efficient encoding in step 1820, and then entropy encoded in step 1822 to produce encoded output. In the case of a digital video camera, a stream of output NAL packets 1824 is produced. In other cases, the output is one or more compressed-video files. In general, compression implementations seek to employ the prediction method that provides closest prediction of a considered macroblock, while balancing the cost, in time and memory usage, of various prediction methods. Any of various different orderings and selection criteria for applying prediction methods can be used.

Following quantization, in step 1818, the quantized coefficients are input to the re-ordering and entropy-encoding stages 1820 and 1822, and also input to an inverse quantizer 1826 and an inverse transform step 1828 to regenerate a residual macroblock or residual macroblock partition that is output onto data path 1830 by the inverse transform step. The residual macroblock or macroblock partition output by the inverse transform step is generally not identical to the residual macroblock or residual macroblock partition output by the differencing step 1810 to data path 1812. Recall that quantization is a lossy compression technique. Therefore, the inverse quantizing step 1826 produces an approximation of the original transform coefficients, rather than accurately reproducing the original transform coefficients. Therefore, although the inverse integer transform would produce an exact copy of the residual macroblock or macroblock partition, were it applied to the original coefficients produced by the integer transform step 1816, because the inverse integer transform step 1828 is applied to rescaled coefficients, only an approximation to the original residual macroblock or macroblock partition is produced in step 1828. The approximate residual macroblock or macroblock partition is then added to the corresponding predicted macroblock or macroblock partition, in the addition step 1832, to generate a decompressed version of the macroblock. The decompressed, but not filtered, version of the macroblock is input to the intra prediction step 1812, via data path 1834, for intra prediction of a subsequently processed block. The deblocking filter 1836 step is performed on decompressed macroblocks to produce filtered, decompressed macroblocks that are then combined to produce decompressed images 1838-1840 that may be input to the motion estimation and compensation step 1806. One subtlety involves input of the decompressed, or reconstructed, frames to motion estimation and compensation step 1806 and decompressed, but non-filtered macroblocks and macroblock partitions to the intra prediction step 1814. Recall that both intra prediction and most motion estimation and compensation use neighbouring blocks, either in a current frame, in the case of spatial prediction, or in previous and/or subsequent frames, in the case of temporal, inter prediction, in order to predict values in a currently considered macroblock or macroblock partition. But, consider the recipient of a compressed data stream. The recipient will not have access to the original, raw video frames 1802 and 1804. Therefore, during decompression, the recipient of the encoded video data stream will use previously decoded or decompressed macroblocks for predicting the contents of subsequently decoded macroblocks. If the encoding process were to use the raw video frames for prediction, then the encoder would be using different data for prediction than is subsequently available to the decoder. This would cause significant errors and artifacts in the decoding process. To prevent this, the encoding process generates decompressed, or reconstructed, macroblocks and macroblock partitions, and decompressed and filtered, or reconstructed, video frames for use in the inter and intra prediction steps, so that intra and inter prediction use the same data for predicting procedure that can rely only on the encoded video data stream for decompression. Thus, the reconstructed macroblock and macroblock partitions input through data path 1834 to the intra prediction step 1814 are the neighbouring blocks from which a current macroblock or macroblock partition is subsequently predicted, and the reconstructed video frames 1838-1840 are used as reference frames by the motion estimation and compensation step 1806 for processing other frames.

Figure 19:
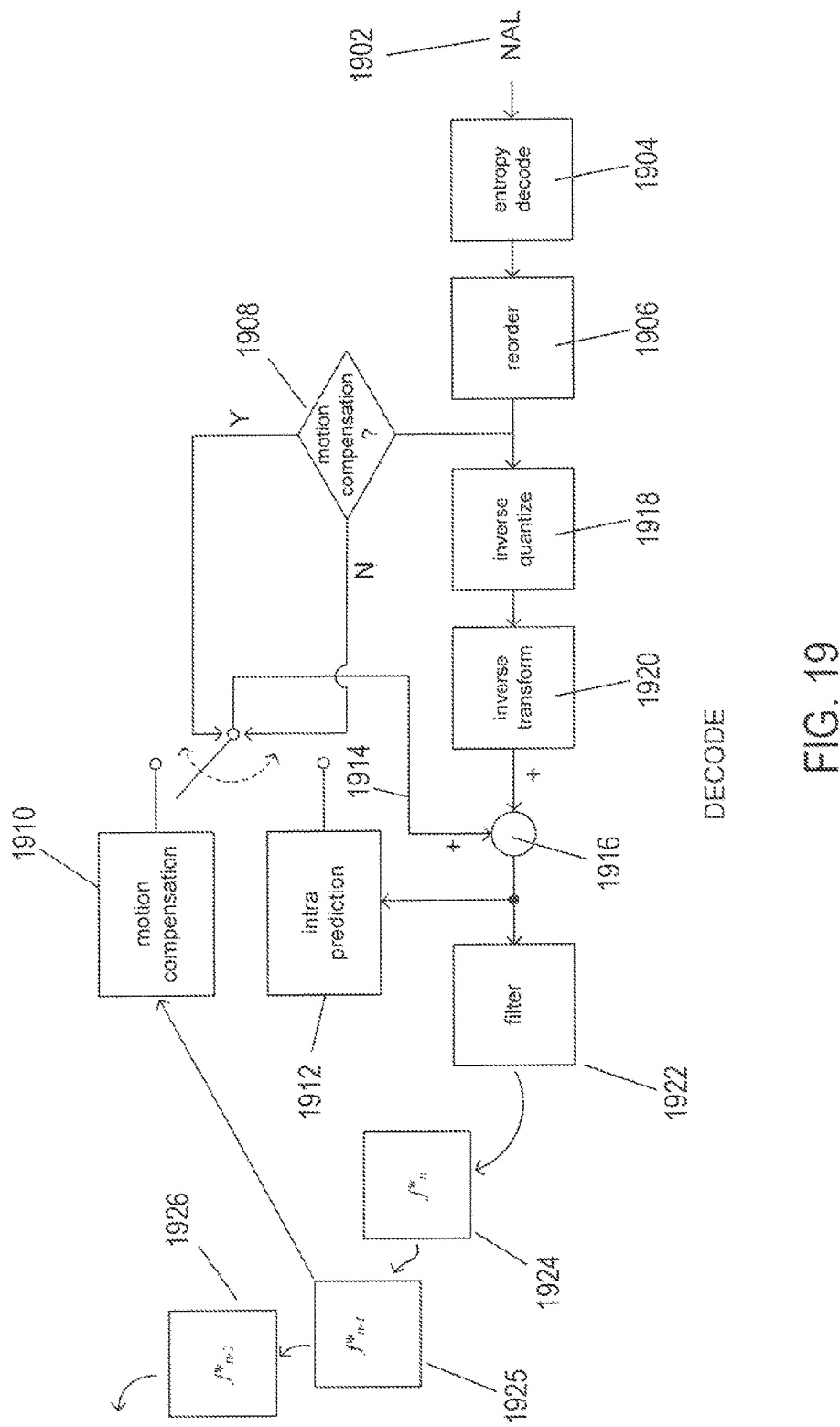
FIG. 19 illustrates, in a block diagram fashion similar to that used in FIG. 23, the H.264 video-data-stream decoding process.

FIG. 19 illustrates, in a block-diagram fashion similar to that used in FIG. 18, the H.264 video-data-stream decoding process. Decompression is more straightforward than compression. A NAL packet stream 1902 or compressed-video file is input into an entropy decode step 1904 which applies an inverse entropy encoding to generate quantized coefficients that are reordered by a reordering step 1906 complementary to the reordering carried out by the reorder step 1820 in FIG. 18. Information in the entropy decoded stream can be used to determine the parameters by which the data was originally encoded, including whether or not intra prediction or inter prediction was employed during compression of each block. This data allows for selecting, via step 1908, either inter prediction, in step 1910, or intra prediction, in step 1912, for producing predicted values for macroblocks and macroblock partitions that are furnished along data path 1914 to an addition step 1916. The reordered coefficients are rescaled by an inverse quantifier, in step 1918, and an inverse integer transform is applied, in step 1920, to produce an approximation of the residual, or residual, macroblocks or macroblock partitions, which are added, in the addition step 1916, to predicted macroblocks or macroblock partitions generated based on previously decompressed macroblocks or macroblock partitions. The addition step produces decompressed macroblocks or macroblock partitions to which a deblocking filter is applied in order to produce final decompressed video frames, in step 1922, to produce the decompressed video frames 1924-1926. The decompression process is essentially equivalent to the lower portion of the compression process, shown in FIG. 1

Block Segmentation and Coding

The current application is directed to a more flexible approach to inter prediction and motion-vector-based macroblock encoding and decoding. In this approach, macroblocks can be segmented into two or more segments or regions. The segment boundaries are described at q-pel resolution, and can be straight lines, simple curves, and complex curves. These segment boundaries arise from a segmentation image-processing method that partitions video frames into segments, or regions, by various, different segmentation criteria. In preparation to describing segmented-block motion-vector-based coding and decoding, an example demonstrating the utility of segmented-block motion-vector-based coding and decoding is next provided.

Figure 20A:
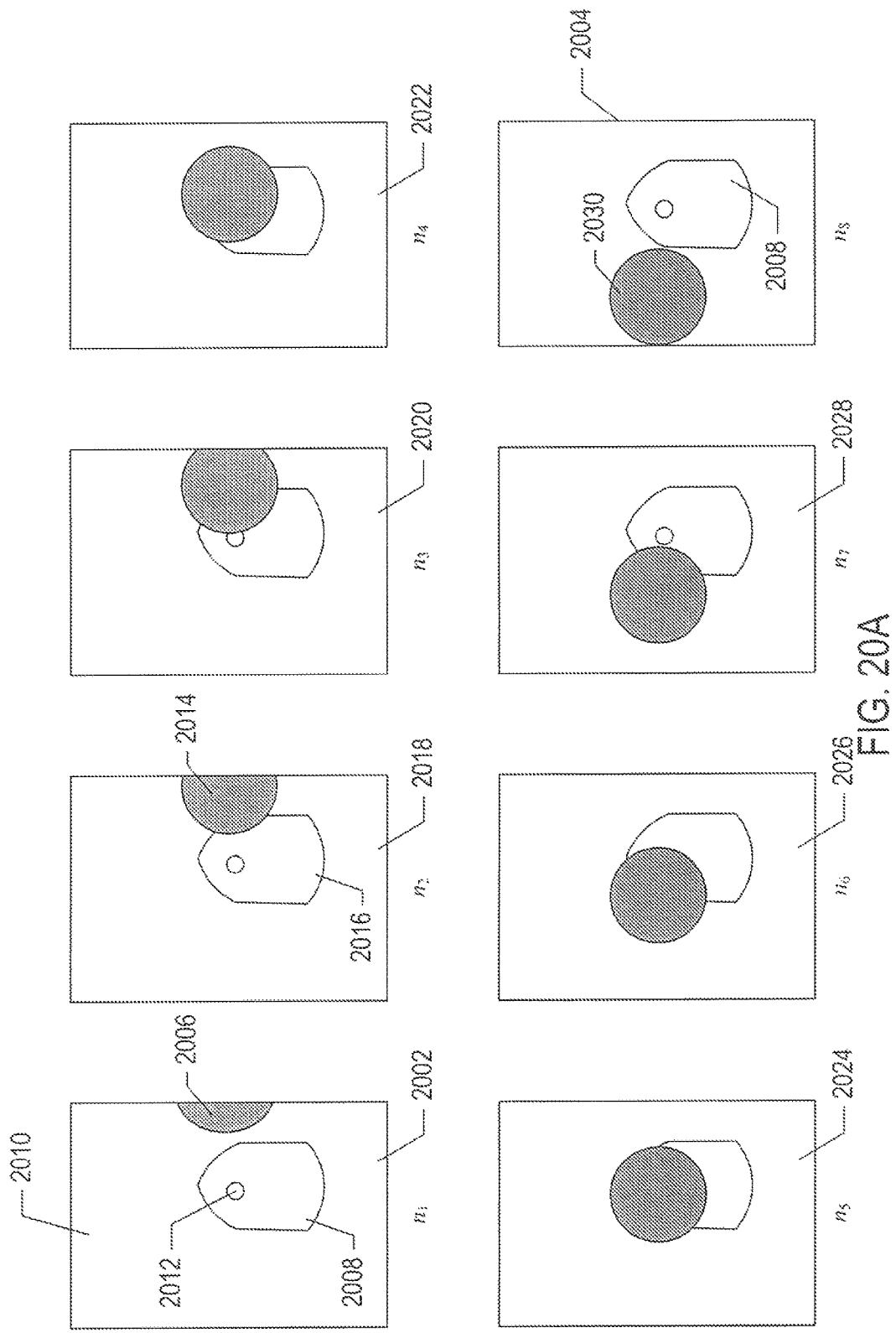
Figure 20B:
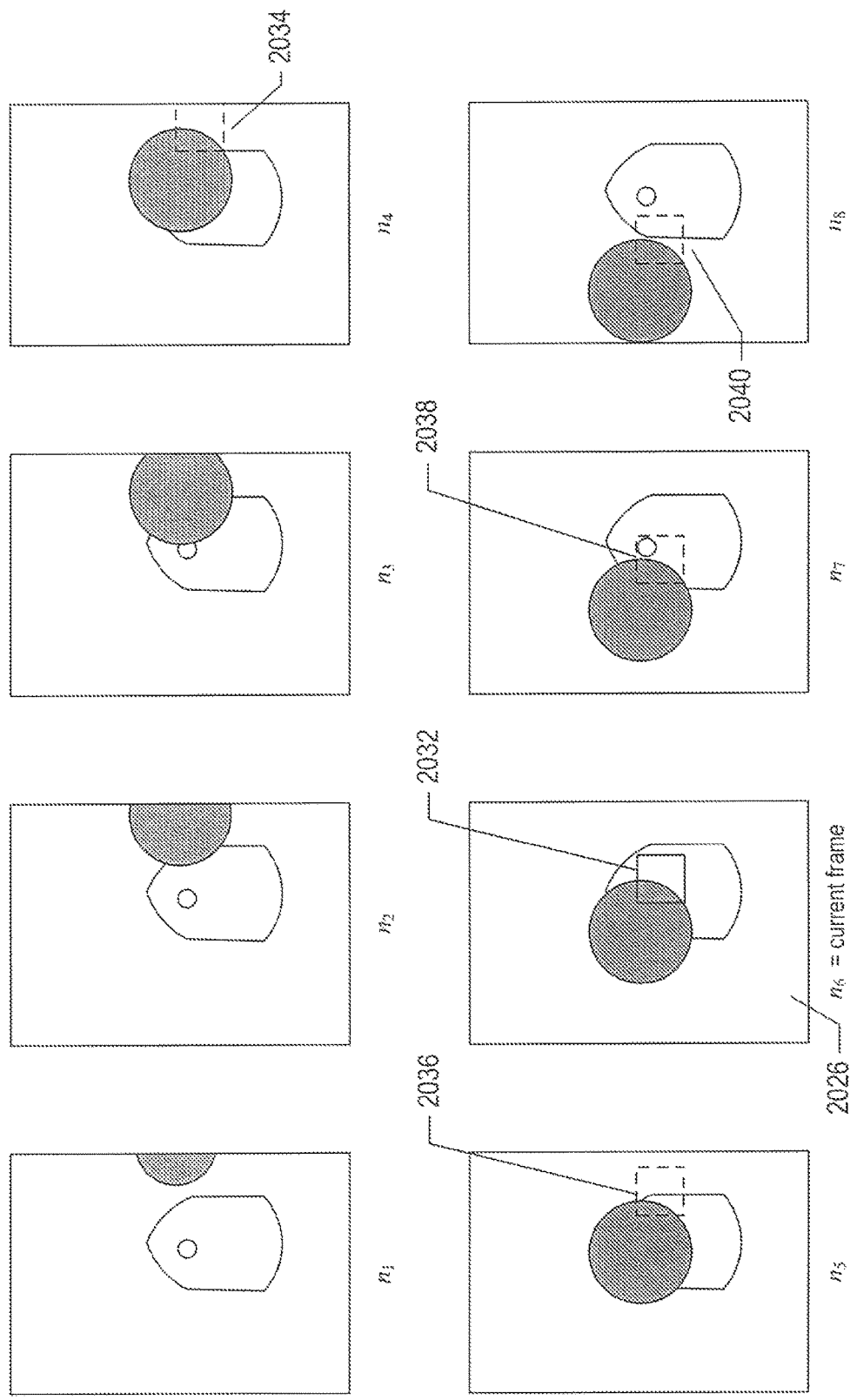

FIGS. 20A-C illustrate a situation in which conventional motion-vector-based coding and intrablock encoding do not provide satisfactory results. FIG. 20A shows small portions of a sequence of video frames, $n_1$-$n_8$, in which a small foreground object moves relatively rapidly across a static background. Each of the small regions shown in FIG. 20A is located at the same position within the region's corresponding video frame. As can be seen in the sequence beginning with the small region of video frame $n_1$ 2002 and ending with the small region of video frame $n_s$ 2004, a small, relatively darkly colored disk-shaped region, the left-hand portion of which 2006 is visible at the right-hand side of small-region 2002 within video frame $n_1$, moves leftward across a static background comprising a relatively lightly colored object 2008 fixed with respect to a white background 2010. The lightly colored static object 2008 includes white disk-shaped region 2012. As the relatively darkly colored disk-shaped object 2006 moves leftward over the sequence of video frames, the darkly colored disk-shaped object 2014 begins to occlude the static, lightly colored object 2016 in frame $n_2$ 2018, increasingly occludes the static background object in frames $n_3$ 2020, $n_4$ 2022, $n_5$ 2024, and $n_6$ 2026, then proceeds leftward in frame $n_7$ 2028 to a position at which the static, relatively lightly colored background object is only slightly occluded by the darkly colored disk-shaped object and, finally, proceeds to a position within video frame $n_8$ 2004 in which the relatively darkly colored, disk-shaped object 2030 does not occlude the relatively lightly colored, static background object 2008.

FIG. 20B illustrates encoding of a macroblock within the small region of video frame $n_6$ shown in FIG. 20A. In FIG. 20B, a currently considered macroblock 2032 of video frame $n_6$ is shown within the small region 2026 of video frame $n_6$ as a square outline superimposed over the small region of video frame $n_6$. In FIG. 20B, candidate macroblocks for motion-vector encoding of macroblock 2032 in the small portions of video frames $n_4$, $n_5$, $n_7$ and $n_8$ are indicated by dashed square outlines 2034, 2036, 2038, and 2040, respectively. These are selected as the most likely candidate macroblocks for interblock encoding macroblock 2032 in video frame $n_6$, since each of these candidate macroblocks includes an identically positioned, lower right-hand side of the darkly colored, disk-shaped object 2006. However, as can be seen by comparing the candidate macroblocks to macroblock 2032, the remaining portion of macroblock 2032 is different from the remaining portions of the candidate macroblocks. FIG. 20C illustrates the result of copying each of the candidate macroblocks 2034, 2036, 2038, and 2040 into macroblock 2032 of video frame $n_6$. When macroblock 2034 is copied into the position of macroblock 2032 in video frame $n_6$, as shown in reconstructed video frame $n_6$ 2050 in FIG. 20C, a large white portion of macroblock 2034 from frame $n_4$ appears as an artifact within the lightly colored, static background object 2008. Similar artifacts and inconsistencies occur when candidate macroblock 2036 is copied into the position of macroblock 2032, as shown in reconstructed frame $n_6$ 2054, when candidate macroblock 2038 from video frame $n_7$ is copied into the position of macroblock 2032 in reconstructed video frame $n_6$ 2056, and when candidate macroblock 2040 is copied from video frame $n_8$ into the position of macroblock 2032 in reconstructed video frame $n_6$ 2058. As can be seen by inspecting each of the small portions of video frames shown in FIG. 20B, none of the candidate macroblocks for a motion-vector reference from video frame $n_6$ for macroblock 2032 provides an acceptable, artifact-free result. In this case, many video-encoding methods would choose either inter-frame encoding methods or would insert macroblock 2032 into the representation of video frame $n_6$ and rely on quantization and entropy encoding to achieve whatever compression may be possible when both intrablock and interblock encoding fail. Unfortunately, intrablock encoding would also produce an unacceptable result in this case. However, as discussed below, there is sufficient information in the sequence of small regions of video frames shown in FIG. 20B to reconstruct macroblock 2032 from information included in video frames other than video frame $n_6$ with prefect fidelity. Unfortunately this information is not contained within a single candidate macroblock for a motion-vector reference for macroblock 2032 from video frame $n_6$ and an averaging of the contents of any two of the candidate macroblocks shown in FIG. 20B would not produce a faithful reconstruction of macroblock 2032.

Figure 22:
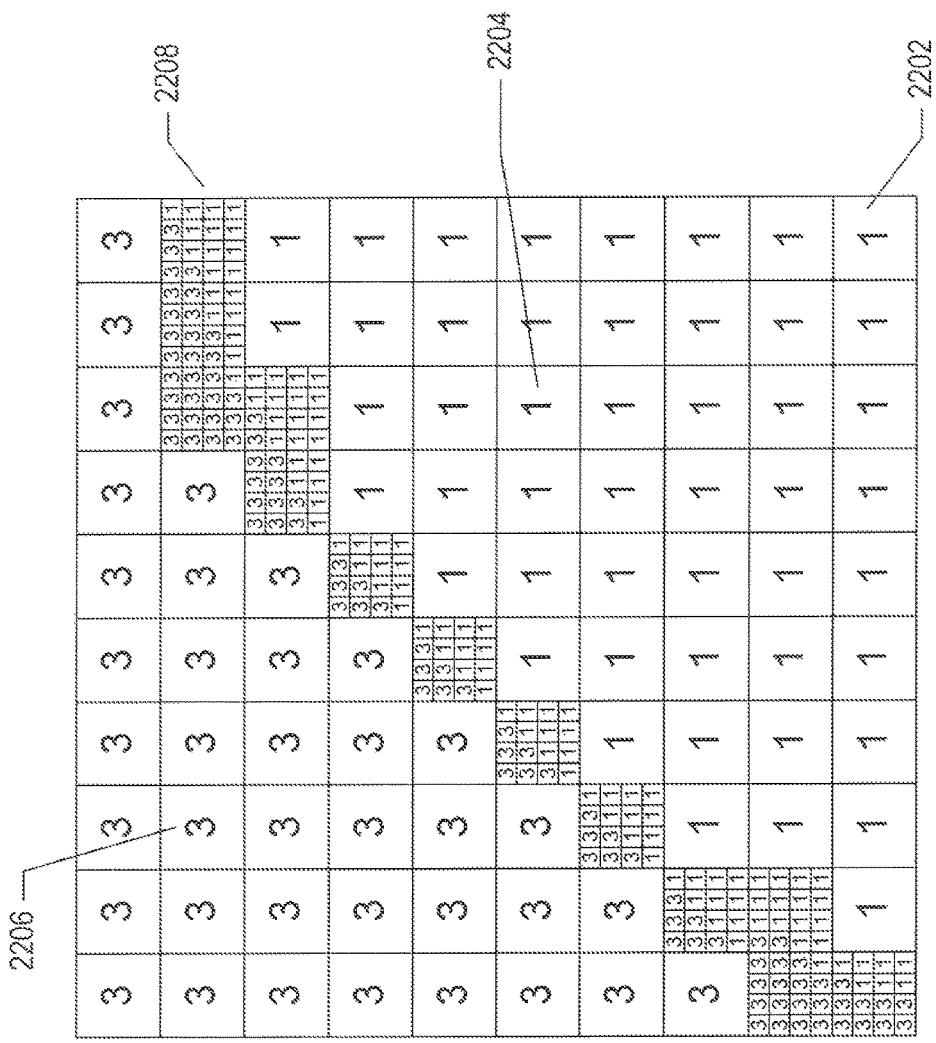

Prior to discussing segmented-block motion-vector-based coding that addresses coding tasks such as encoding macroblock 2032 in video-frame $n_6$, discussed above with reference to FIG. 20B, the concept of segmentation maps and depth maps are next discussed. FIGS. 21A-22 illustrate generation of a segmentation map for a small portion of a video frame. FIG. 21A illustrates certain of the additional information that may be available with respect to a video frame during both encoding and decoding. FIG. 21A uses the small portion of video frame $n_6$ from the sequence of small portions of video frames shown in FIGS. 20A-B as an example.

As shown in FIG. 21A, in addition to the small region of video frame $n_6$ 2102, also referred to below as an "intensity-and-color map," an encoder may have a depth map 2104 for the video frame as well as segmentation maps 2106 and motion-field maps 2108 for previously processed video frames. In FIG. 21A, the ellipsis 2110 indicates that segmentation maps and motion-field maps may be available for previously processed frames in addition to video frame $n_5$. The depth-field map 2104 contains numerical indications of the depth of the object in the field of the camera corresponding to each pixel. For example, in the small portion of the depth-field map 2104 for video frame $n_6$, the darkly colored disk-shaped object (2006 in FIG. 20C) has an indicated depth of "1," 2112, the static background object (2008 in FIG. 20C) has a depth represented by the value "10" 2114, and the remaining background has depth values, not shown in FIG. 21A, corresponding to infinity 2116. Depth maps can be generated from depth information recorded by various types of depth sensors within video-recording equipment, may be generated by interpretative image-processing techniques applied to sequences of video frames, or may be generated by other methods. Depth maps may be quantized and included within a compressed video file or compressed-video stream.

The motion-field map 2108 for a small portion of the video frame $n_5$ includes vector values, shown in FIG. 21A as small arrows, such as arrow 2120, that provide indications of estimated instantaneous velocities of objects represented by pixels within the video frame. As shown in the small, portion of the motion-field map 2108 in FIG. 21A information including motion vectors generated for already processed video frames as well as intensity-and-color maps and depth maps can be used to estimate the instantaneous velocities of objects corresponding to each pixel. In the small portion of the motion-field map for video frame $n_5$ 2108, the pixels corresponding to the relatively darkly colored disk-shaped object (2006 in FIG. 20C) are associated with leftward-pointing instantaneous-velocity vectors while the remaining portion of the small portion of video frame $n_5$ is associated with 0 instantaneous-velocity vectors, not shown in FIG. 21A. Finally, the segmentation map for a small portion of video frame $n_5$, 2106 in FIG. 21A, partitions the small portion of the video frame into regions that likely correspond to different real-world objects in the video frame. For the small portion of video frame $n_5$, the darkly colored disk-shaped moving object (2006 in FIG. 20C) is labeled "1." 2122, the static, lightly colored background object (2008 in FIG. 20C) is labeled "2" 2124, and the remaining background of the small portion of video frame $n_5$ is labeled "3" 2126. Certain of the pixels in the segmentation map have intermediate values, represented in FIG. 21A by slashes. In FIG. 21A, the depth map, motion-field map, and segmentation map are all idealized and correspond closely to the respective small portions of video frames $n_6$ and $n_5$, shown in FIGS. 20A-B. However, in non-ideal, real cases, there may be discrepancies between these various maps. Many different types of segmentation maps, depth maps, motion-field-maps, and other information that may be available during coding are possible which use different encodings and formats.

FIG. 21B illustrates generation of a segmentation map for the small portion of video frame $n_6$ 2102 shown in FIG. 20A. Rather than showing labelled pixels, as in the small portion of segmentation map 2106 shown in FIG. 21A, the segmentation map for the small portion of video frame $n_6$ 2130 is represented as labeled, outlined regions. The region corresponding to the darkly colored, moving disk-shaped object (2005 in FIG. 20C) 2132 is labeled "1," the region corresponding to the static background object (2008 in FIG. 20C) is labeled "2" 2134, and the background is labeled "3" 2136. As indicated in FIG. 21B, the segmentation map for the small region of video frame $n_6$ can be prepared using various combinations of information available to either an encoder or decoder. This information includes a reconstructed intensity-and-color frame for which the segmentation map is being prepared, a reconstructed depth map for the current video frame, segmentation maps prepared for previously processed frames, reconstructed depth maps for a number of previously processed frames, motion-field maps for previously processed frames, higher-level derived kinematic and spatial contexts provided by higher-level image processing, and other information.

As one example, consider the darkly colored disk-shaped object. In the depth map of video frame $n_6$ (2104 in FIG. 21A), a region corresponding to this object is clearly in the foreground and is the closest object to the camera. Moreover, in the motion-field map (2108 in FIG. 21A) for the previous frame $n_5$, this object is clearly moving relative to the remaining pixels in the frame. In the reconstructed intensity-and-color map (2102 in FIG. 21A) for the current frame, the region is differently colored from the remaining regions. All of this information, taken together, strongly indicates that this disk-shaped region is a separate and distinct object from all other objects represented by pixels within the video frame. Therefore, those objects are identified as a distinct region for the segmentation map. As can be imagined, in actual image processing, the various types of information and indications may not be as consistent and clear as in the hypothetical example of FIGS. 21A-B. Nonetheless, sophisticated image-processing techniques are currently available to produce high-quality segmentation maps for video frames. Note also that the segmentation map is generally prepared for a reconstructed frame, both during encoding and decoding, using reconstructed depth maps. Only information commonly and identically available to both the encoder and decoder can be used for segmentation, since the segmentation maps, as discussed below, are used during the decoding process, when the original video data is not available.

FIG. 22 shows a small portion of the segmentation map for a small region of video frame $n_5$ shown in FIG. 21A. FIG. 22 illustrates the fact that segmentation can be performed at a granularity greater than the granularity of pixels. In the example shown in FIG. 22, the segmentation map includes q-pel resolution at the boundary between regions. Much as motion vectors can be computed to q-pel resolution, as discussed above, pixels at the boundary of segments within a segmentation map may be assigned values intermediate between the values of the two adjacent regions to delineate the boundary at greater resolution. For example, in FIG. 22, pixels are represented by the relatively large cells, such as cell 2202. The lower right-hand portion of the small portion of the segmentation map shown in FIG. 22 is assigned to a region labelled "1" 2204 and the upper left-hand portion of the small region of the segmentation map is assigned to a region labelled "3" 2206. Pixels at the boundary between the two regions, such as pixel 2208, are shown at 4× resolution. Although 16 higher-resolution values cannot be associated with a single pixel, the pixel can be assigned an intermediate value between 1 and 3 to represent the boundary nature of the pixel and the fraction of the pixel corresponding to each region. For example, pixel 2208 can be assigned an intermediate value that is the average of the 16 4× values shown in the pixel in FIG. 22, 1.5, to indicate that the pixel is 25 percent region 3 and 75 percent region 1. Thus, segmentation maps, like motion vectors, can be encoded at greater than pixel granularity. Moreover, a higher-resolution macroblock-sized region of a segmentation map can be referenced by a motion vector that references the video frame with which the segmentation map is associated, the higher-resolution macroblock-sized region of the segmentation map corresponding, in position, to the position of a macroblock-sized region of the video frame referenced by the motion vector. Therefore, segmentation of a macroblock-sized region of a video frame that is positioned at q-pel resolution, for example, can be defined by a corresponding macroblock-sized region of a video frame with which the segmentation map is associated, where "corresponding" means that the macroblock-sized regions are located at the same position, expressed at the same resolution, within the video frame and segmentation map.

Figure 23:
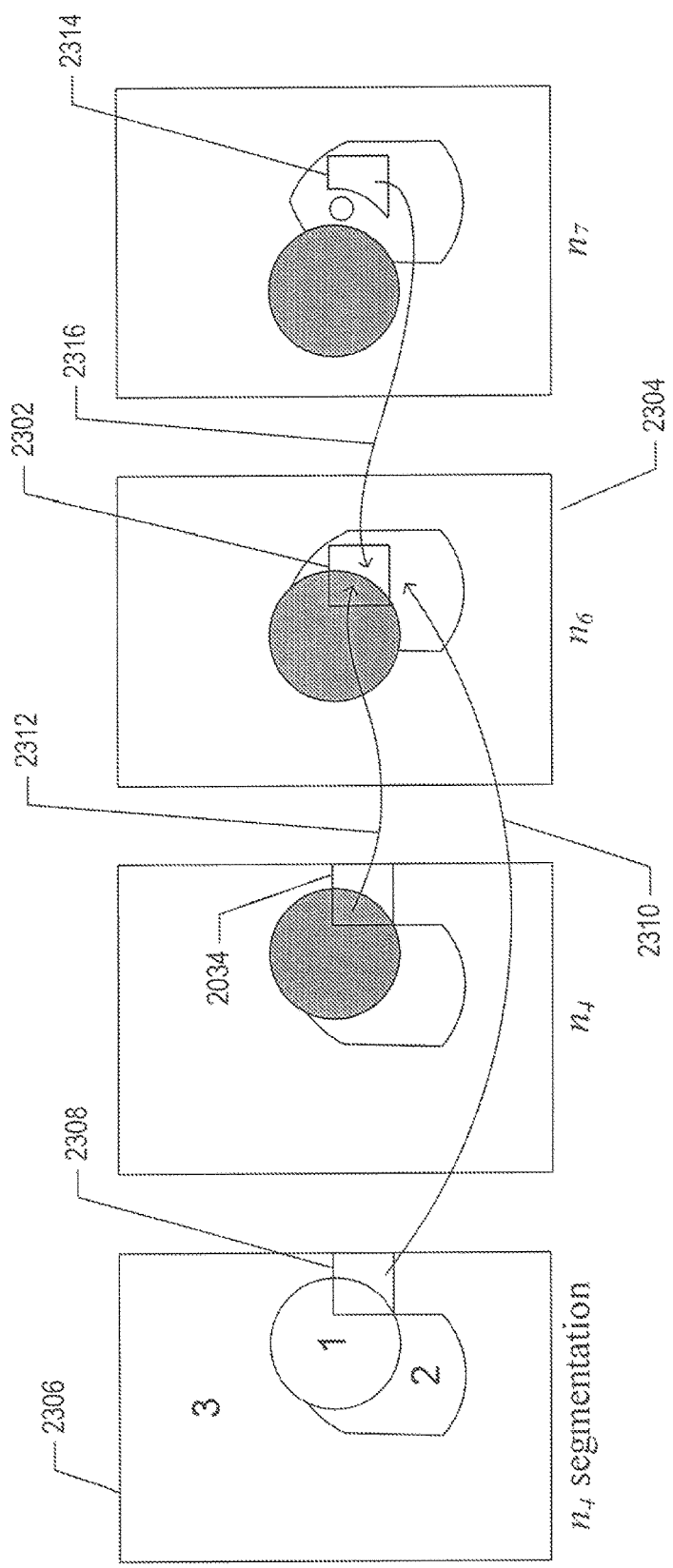
FIG. 23 illustrates a segmented-block motion-vector approach to encoding the macroblock of video frame $n_6$ discussed above with reference to FIG. 20B.

FIG. 23 illustrates a segmented-block motion-vector approach to encoding the macroblock of video frame $n_6$ discussed above with reference to FIG. 20B. The macroblock in question, macroblock 2032 in FIG. 20B, is shown again by a square outline as macroblock 2302 within the small region of the intensity-and-color map 2304 for frame $n_6$. Looking back through candidate macroblocks 2036 and 2034 of previous frames $n_5$ and $n_4$, shown in FIG. 20B, it can be seen that a portion of a segment map for candidate macroblock 2034 would be nearly identical to a portion of a segment map for currently considered macroblock 2302. In the case that a segment map is available for video frame $n_4$, shown as a portion of the segment map for frame $n_4$ 2306 in FIG. 23, the portion of the segment map corresponding to candidate macroblock 2034, shown as square 2308 in FIG. 23, can be used as a segment map for currently considered macroblock 2302. Thus, as shown by arrow 2310, a first piece of information for segmented-block motion-vector encoding of the currently considered macroblock 2302 of video frame $n_6$ is square region 2308 of the segmentation map for frame $n_4$ corresponding to candidate macroblock 2034 in video frame $n_4$. With the currently considered macroblock 2302 segmented, coding of the currently considered macroblock 2302 next involves finding suitable segments within macroblocks other than macroblock 2302 for encoding the segments of currently considered macroblock 2302. As shown in FIG. 23, for the left-hand segment corresponding to the moving disk-shaped object, the contents of candidate macroblock 2034 in frame $n_4$ can be used, represented in FIG. 23 by arrow 2312. For the right-hand segment of currently considered macroblock 2302, a similarly shaped portion of the macroblock 2314 at the same position of currently considered macroblock 2302 in frame $n_7$ can be used, as indicated in FIG. 23 by arrow 2316. Thus, during encoding of currently considered macroblock 2302 of frame $n_6$, motion vectors referencing the macroblock-sized portion of the video-frame $n_4$ segmentation map 2308, the left-hand region of candidate macroblock 2034 in video frame $n_4$, and the right-hand portion of macroblock 2314 in video frame $n_7$ can be used to represent currently considered macroblock 2302. In the hypothetical example of FIGS. 20A-23, these three motion vectors can be used to exactly reconstruct macroblock 2302 of frame $n_6$ using information in frames $n_4$ and $n_7$ along with the segmentation map for frame $n_4$. As noted above, the motion vectors may reference-macroblock-sized regions within both segmentation maps and intensity-and-color maps at resolutions greater than pixel resolution, such as at q-pel resolution, and, as also discussed above, regions of segmentation maps may be defined with greater than pixel resolution, including q-pel resolution as shown in FIG. 22.

Figure 24:
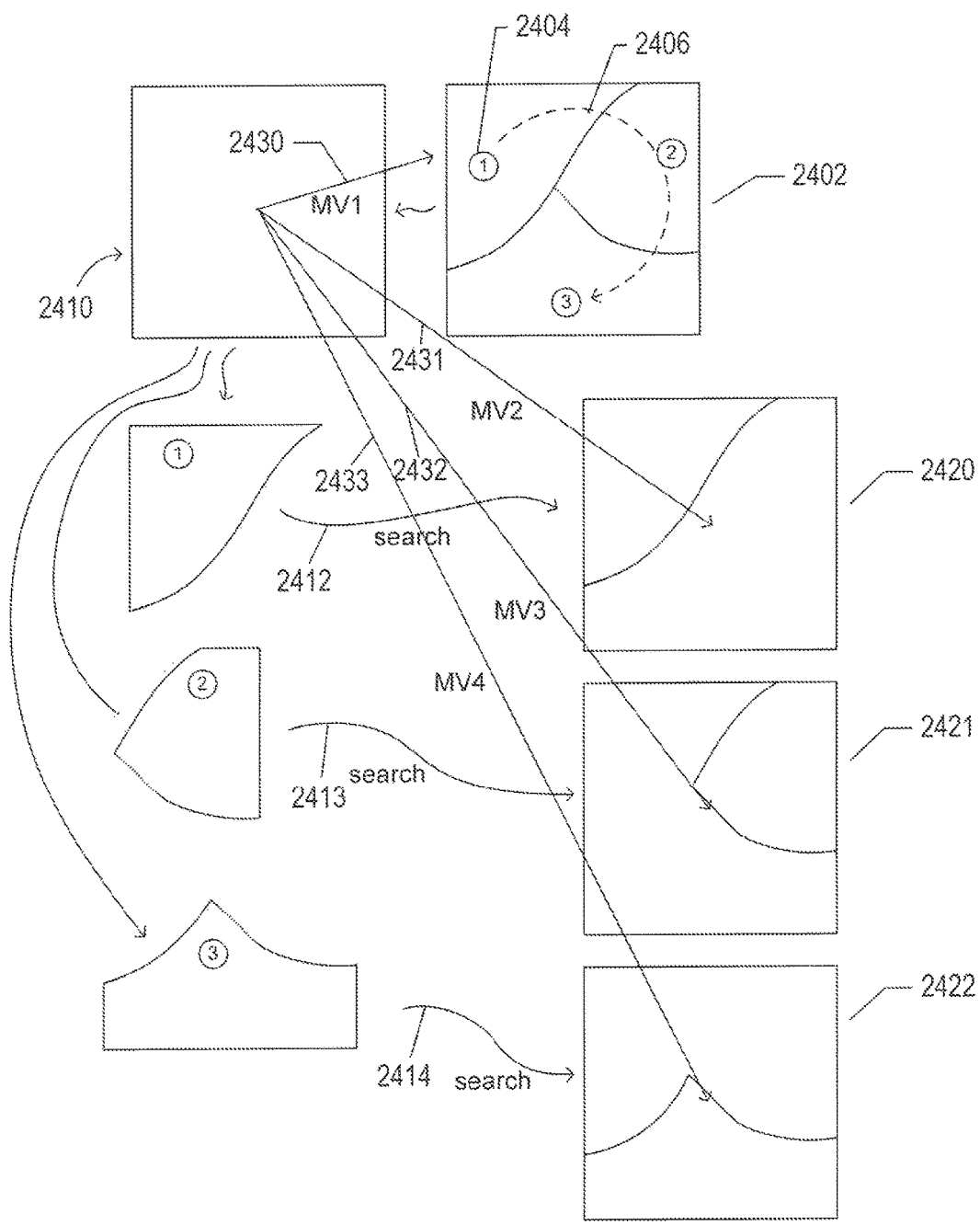
FIG. 24 provides a general illustration of segmented-block motion-vector encoding of a macroblock.

FIG. 24 provides a general illustration of segmented-block motion-vector encoding of a macroblock. The phrase "segmented-block motion vector" refers to an encoding of a macroblock that contains multiple conventional motion vectors, including a motion vector that references to a macroblock-sized region of a segmentation map and at least one additional motion vector that references a macroblock from which intensity-and-color data are extracted for copying into a segment of the encoded macroblock during reconstruction of the encoded macroblock. First, a corresponding region of a segment map 2402 of a previously processed frame is found by a constrained search method, one example of which is discussed below. Next, as indicated by circled numerical labels within the region of the segmented map, such as the circled "1" label 2404, the segments are numerically labelled in a well-known order. In one method, the segment that includes the uppermost left-hand corner of the macroblock-sized segmented-map region is designated segment 1, and the remaining segments encountered in a clockwise, circular or spiral path, represented by a dashed curved line 2406 in FIG. 24, are labeled with numerically increasing labels. For moderately sized macroblocks, it is unlikely that more than three different regions or segments are encountered. The macroblock-sized portion of the segmented map 2402 defines the segmentation of macroblock 2410 to be encoded with a segmented-block motion vector. A constrained search, described further below, is then used, in certain implementations, for each segment or region to identify a macroblock in an already processed video frame or portion of a video frame which contains that segment. In the example shown in FIG. 24, since there are three segments within the macroblock, labeled "1," "2," and "3," constrained searches, represented in FIG. 24 by arrows 2412-14 are undertaken to find target macroblocks 2420-2422 from which intensity-and-color values can be extracted to generate intensity-and-color values for the segments of the macroblock during reconstruction. The macroblock can thus be encoded as an array of four motion vectors, illustrated in FIG. 24 as vectors 2430-2433. During decoding, an inverse process is carried out, with the first motion vector within the segmented-block motion vector used to obtain a macroblock-sized portion of a segment map and the remaining motion vectors in the segmented-block motion vector each providing a reference to a macroblock of an intensity-and-color map from which intensity-and-color values can be extracted for a segment within the macroblock to be reconstructed. Please note that a source segment in an already-processed video frame may be defined, in general, at greater than pixel resolution, so that intensity-and-color values for the source frame located at a first q-pel-resolution position within a first video frame can be interpolated and shifted to generate intensity-and-color values for a target segment located at a different q-pel-resolution of a reconstructed video frame.

Figure 25:
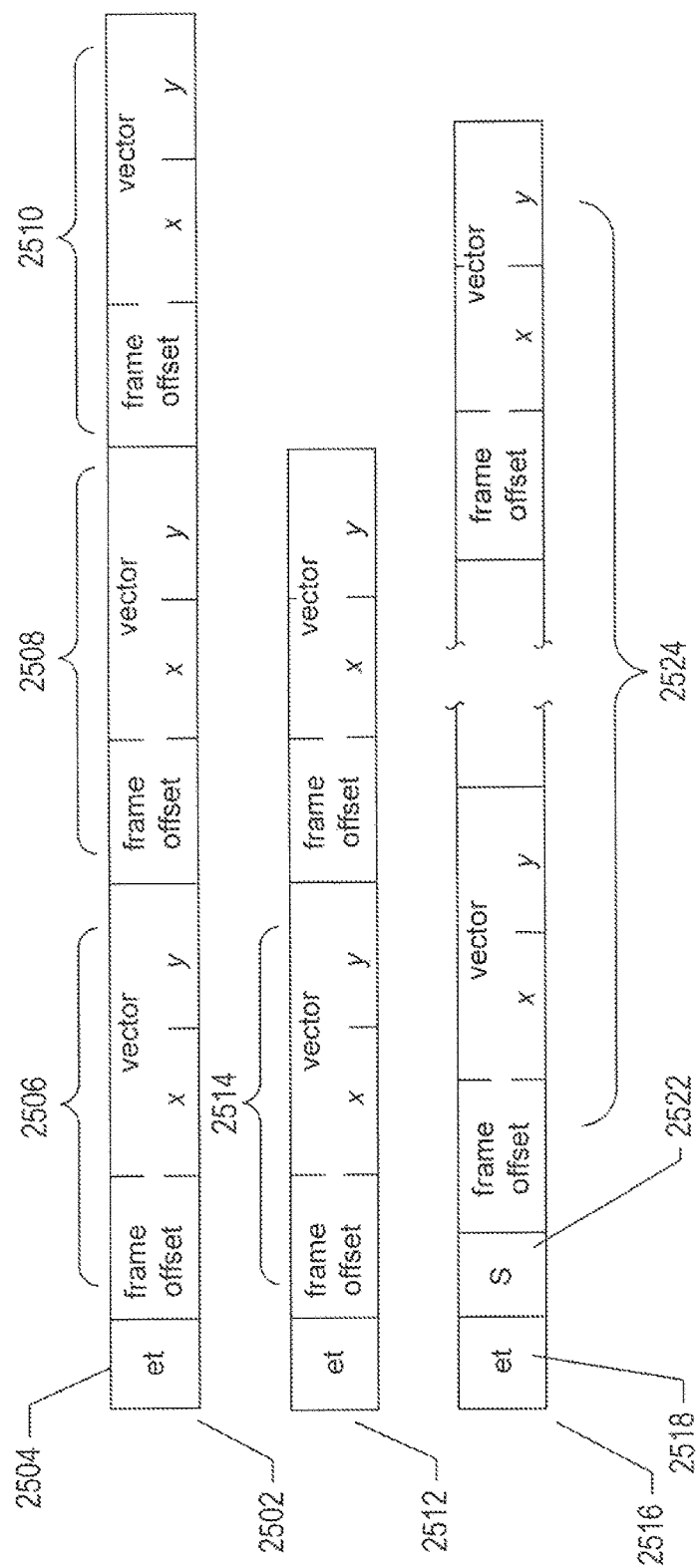
FIG. 25 illustrates several different encodings of segmented-block motion vectors produced during video encoding to represent macroblocks and processed, during decoding of encoded video signals, to reconstruct macroblocks.

FIG. 25 illustrates several different encodings of segmented-block motion vectors produced during video encoding to represent macroblocks and processed, during decoding of encoded video signals, to reconstruct macroblocks. A first example segmented-block motion-vector encoding 2502 could be used to encode the information used to encode macroblock 2302 of video frame $n_6$ in FIG. 23. The encoding of the segmented-block motion vector includes an encoding type ("et") value that indicates a three-motion-vector segmented-block motion vector 2504, including a first motion vector 2506 that references the macroblock-sized portion of the segmented map (2308 in FIG. 23), a second motion vector 2508 that references a macroblock from which intensity-and-color data for a first segment is obtained (2312 in FIG. 23), and a third motion vector 2510 that references a second macroblock from which intensity-and-color data can be obtained (2316 in FIG. 23) for a second segment.

In the example shown in FIG. 23, the segmentation map used for macroblock segmentation and the intensity-and-color map used for intensity-and-color values for the first segment are both associated with video frame $n_4$. Because it is often the case that the intensity-and-color values for one segment of a macroblock to be encoded can often be extracted from the same video frame that is associated with the segmentation map used to segment the macroblock, a more compact encoding of the segmented-block motion vector is obtained by double use of the first motion vector to point to a macroblock with intensity-and-color data for a first segment as well as for segmentation, as shown in encoding 2512 in FIG. 25. In this encoding, it is understood that motion vector 2514 indicates that segmentation information is obtained from the segmentation map of the referenced frame and that intensity-and-color data for the first segment is obtained from a corresponding macroblock of the intensity-and-color map for the same frame.

A more general segmented-block motion-vector encoding 2516 provides for any number of up to some maximum number of segments as well as for either separate motion vectors for the segmentation map and intensity-and-color map for a selected region, or for using the first motion vector to reference both the segmentation map and intensity-and-color map of a referenced video frame for the segmentation information and intensity-and-color values of a selected region. In this general encoding, the segmented-block motion vector includes an encoding-type field 2518, a field S indicating a selected segment 2520, and then a sequence of motion vectors 2524. When the value, in field S is 0, then the first motion vector points only to a segmentation map. When the value in field S is greater than 0, then the value in field S indicates the segment of the macroblock being encoded for which intensity-and-color values are extracted from the macroblock-sized region of the frame associated with the segmentation map referenced by the first motion vector. As can be seen in FIG. 25, the individual motion vectors within a segmented-block motion vector can be encoded as conventional motion vectors, including a frame offset and two numeric values for the x and y directions of the vector. In certain implementations, the motion vector fields can instead encode an intrablock mode for intrablock coding of a particular segment. For example, a frame offset of 0 can be used to indicate intrablock coding, and an intrablock-coding mode can be stored in an intrablock-coding-mode field following the offset instead of the two motion-vector-coordinate fields, in the case of interblock coding of a segment. A separate field that indicates the number of motion vectors within a segmented-block motion vector is not needed, since the number of included motion vectors can be determined from the information contained within the macroblock-sized portion of the segmented map that defines segmentation for the segmented-block motion-vector-encoded macroblock and from the contents of the field S. Various different segmented-block motion-vector encodings may use a different ordering of fields and motion vectors, may include additional fields, and may contain fewer fields.

Figure 26:
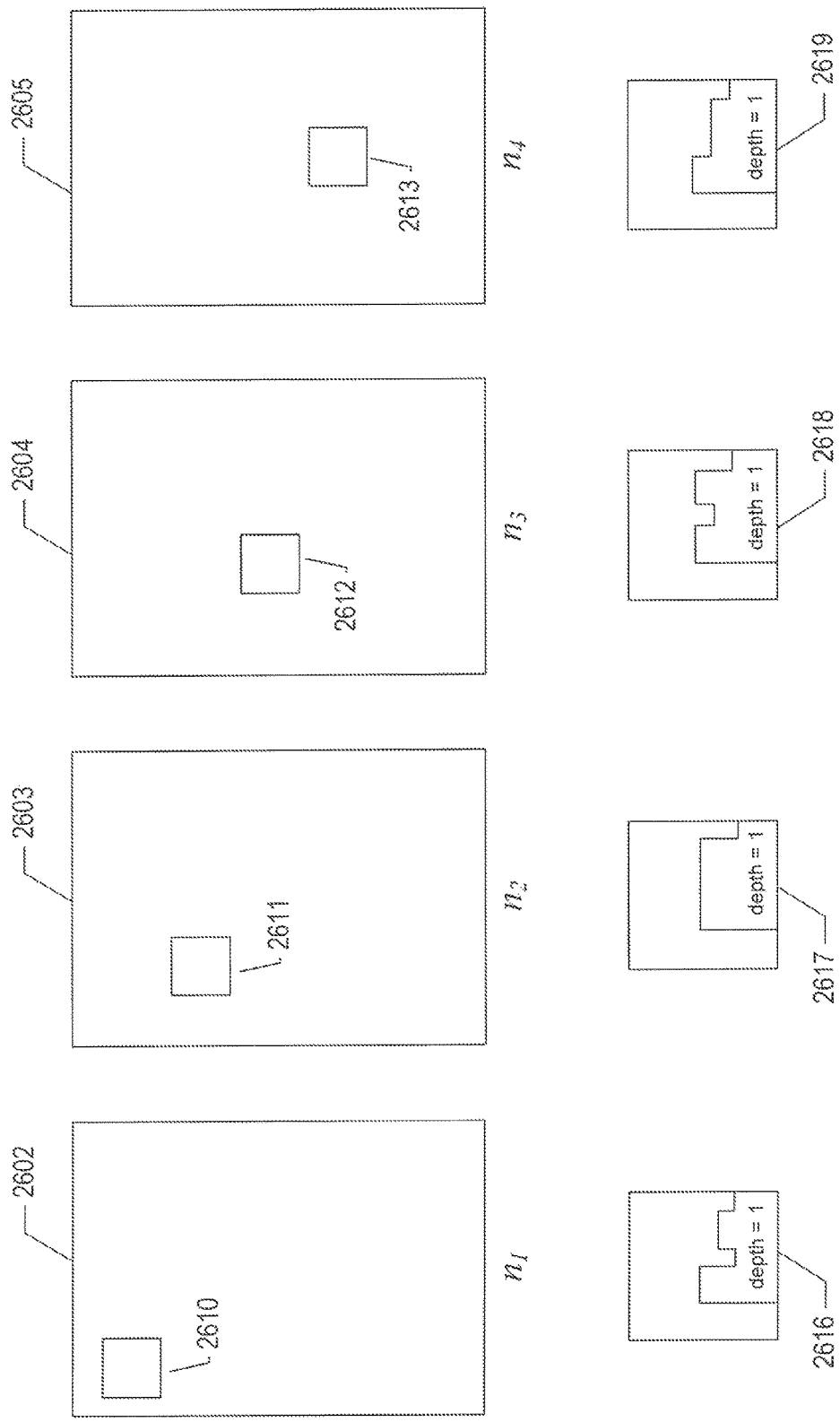

FIGS. 26 and 27 illustrate one type of constrained search for the macroblock-sized region of a segmentation map associated with the previously processed frame to define segmentation of a currently considered macroblock during video encoding. In FIG. 26, information contained in intensity-and-color maps and associated depth maps is used to select a sequence of macroblocks that describe trajectory of an object in space and time. Small portions of intensity-and-color maps of a sequence of video frames $n_1$-$n_4$ are shown at the top of FIG. 26 as large rectangles 2602-2605. Four macroblocks, one in each of the frames $n_1$-$n_4$, 2610-2613 are shown in outline, within the small portions of frames $n_1$-$n_4$. The portions of depth maps associated with frames $n_1$-$n_4$ corresponding to these macroblocks are shown, at larger scale, as depth-map portions 2616-2619 below the small portions of the intensity-and-color maps of the associated frames. As can be seen in these small portions of associated depth maps, each of macroblocks 2610-2613 have lower right-hand regions associated with an identical depth value. Furthermore, across the sequence of frames $n_1$-$n_4$, the selected macroblocks appear to describe a constant-velocity, constant-direction trajectory. Indeed, when the four small portions of the intensity-and-color maps of frames $n_1$-$n_4$ are superimposed in superposition 2702 of FIG. 27, and the four small portions of the associated depth maps are superimposed in superposition 2704 in FIG. 27, it is clear that the selected macroblocks do, in fact, describe a constant-direction, constant-velocity trajectory in time and space, and that the corresponding depth-map regions all show a similar lower right-hand region with identical depth, indicated in the superposition 2704 in FIG. 27 as shaded region 2706. Such patterns would be observed for macroblocks that represent portions of foreground objects moving across a relatively static background, as one example. A macroblock-sized region of a corresponding segmentation map for any of frames $n_1$-$n_4$ would thus be a good candidate for defining the segmentation for any other of the other macroblocks of the selected macroblocks of frames $n_1$-$n_4$, 2610-2613 in FIG. 26. A full exhaustive search of available, already-processed frames for a segmentation macroblock, including both macroblock translation and rotation, would generally be overly computationally expensive. Even searching for candidate segmentation macroblocks without rotation over numerous previously processed frames may be computationally taxing. However, by using depth information available in depth maps alone, or in combination with intensity-and-color information, and by constraining a search to macroblocks that define constant-direction and constant-velocity trajectories, the search space can be significantly decreased. Many different types of constraints may be employed to constrain the search for candidate segment macroblocks in addition to the trajectory-based and depth-map-segmentation-based approach discussed with reference to FIGS. 26 and 27. The trajectory-based and depth-map-segmentation-based approach discussed with reference to FIGS. 26 and 27 is provided as one example of many different methods by which segmentation maps associated with previously processed frames can be efficiently searched for a segmentation-defining macroblock-sized region.

Figure 28A:
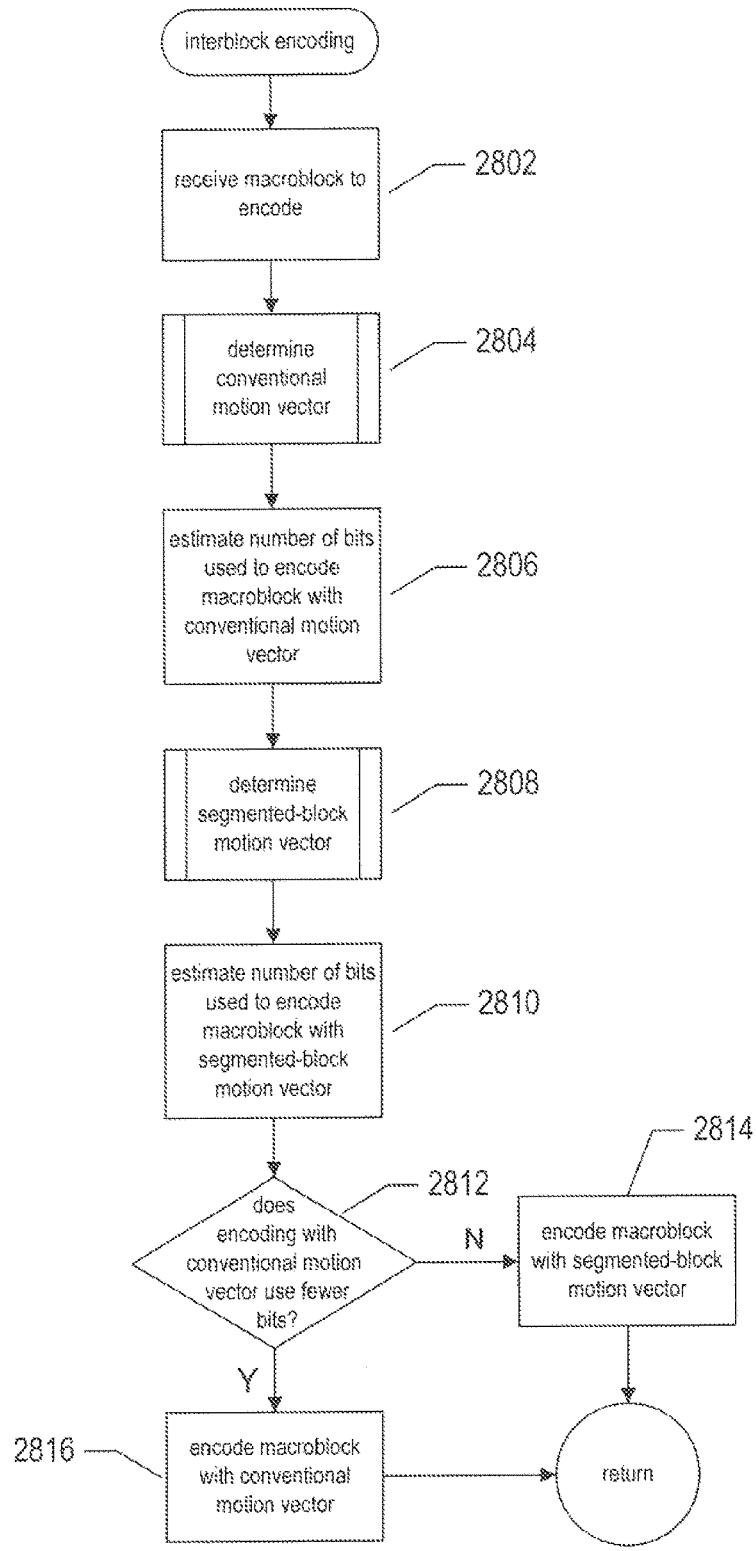
FIG. 28A provides a control-flow diagram for interblock coding.

Next, control-flow diagrams are provided, in FIGS. 28A-28D, to illustrate segmented-block motion-vector encoding of macroblocks. FIG. 28A provides a control-flow diagram for interblock coding. In step 2802, an indication of a next macroblock to encode in the context of a currently considered video frame and additional, already-processed video frames, segmentation maps, and depth maps, is received. This information may be encoded and stored in many different ways, depending on the detailed implementation details of a particular video-encoding method. In step 2804, conventional interblock encoding is carried out, as described above with reference to FIG. 8. In step 2806, an estimate is made of the number of bits that would be used to encode the macroblock with the conventional motion vector. In step 2808, an alternative, segmented-block-motion-vector encoding of the macroblock is carried out, after which, in step 2810, an estimate is made of the number of bits that would be used to encode the macroblock with the segmented-block motion vector determined in step 2808 When the convention-motion-vector encoding of the macroblock uses fewer bits than the segmented-block-motion-vector encoding of the macroblock, as determined in step 2812, the macroblock is encoded, in step 2816, with the conventional motion vector determined in step 2804. Otherwise, the macroblock is encoded, in step 2814, with the segmented-block motion vector determined in step 2808, using an encoding format for segmented-block motion vectors discussed above with reference to FIG. 25. As discussed above, interblock encoding may not always provide desired efficiencies and/or fidelities, in which case another type of encoding may be attempted or, when no other types of encoding for the macroblock remain untried, intensity-and-color values for the macroblock may be inserted into the coding stream for subsequent quantization, entropy encoding, and other types of encoding carried out downstream from interblock encoding.

Figure 28B:
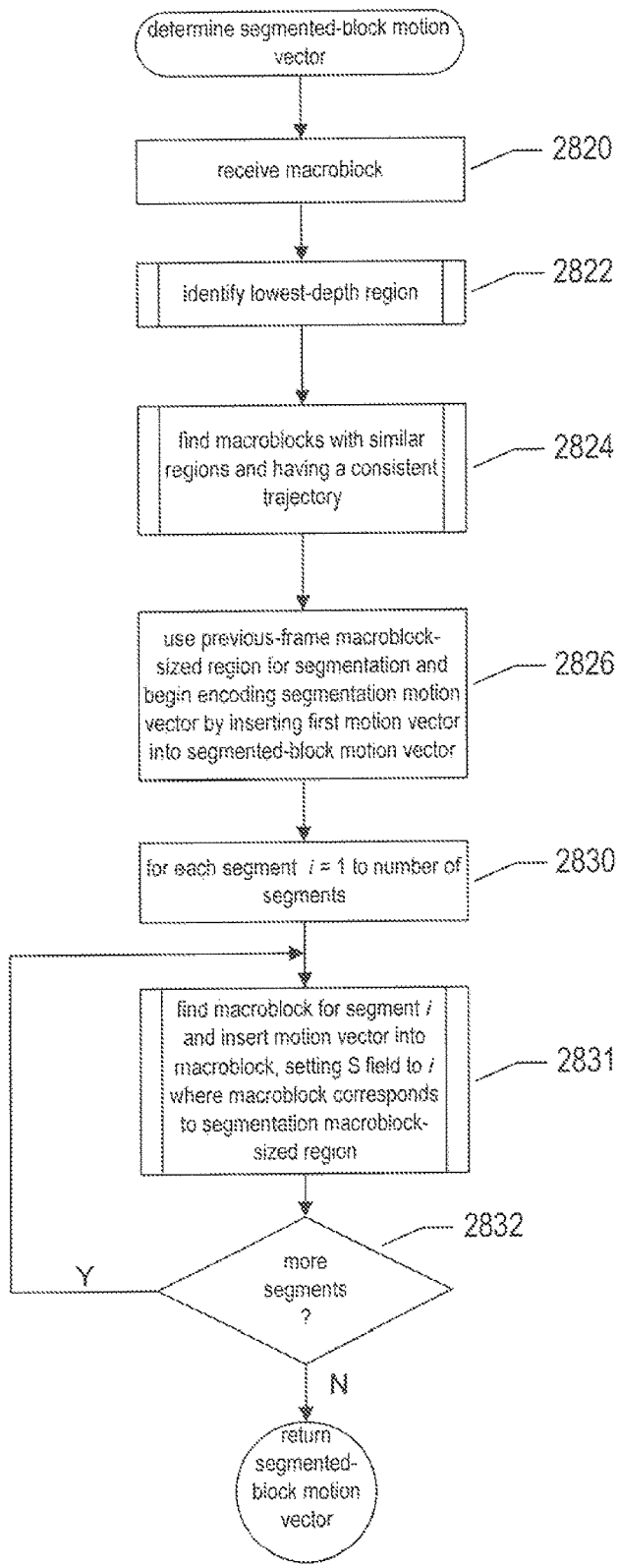
FIG. 28B illustrates determination of a segmented-block motion-vector encoding for a currently considered macroblock, carried out in step 2810 of FIG. 28A.

FIG. 28B illustrates determination of a segmented-block motion-vector encoding for a currently considered macroblock, carried out in step 2808 of FIG. 28A. In step 2820, an indication of the currently considered macroblock is received. In step 2822, a lowest-depth region of the currently considered macroblock is determined, using depth-map information for the current video frame. In step 2824, a constrained search of previously processed frames is carried out to find macroblocks with regions similar to the region identified in step 2822 and that exhibit some type of consistent trajectory in space and time. A macroblock-sized region of a segmentation map associated with one of the frames containing one of the macroblocks of the set of macroblocks identified in step 2824 is then chosen, in step 2826, as the segmentation macroblock for the currently considered macroblock. In certain cases, as discussed above, a single motion vector may be used to encode both the macroblock-sized portion of a segmentation map that defines segmentation of a target macroblock as well as the macroblock-sized region of the corresponding video frame from which intensity-and-color information are extracted for the first segment of the target macroblock. In other cases, the first motion vector included in the segmented-block motion vector refers only to the segmentation macroblock. Next, in the for-loop of steps 2830-2832, a search is employed to identify macroblocks from which intensity-and-color information is extracted for copying into a macroblock reconstructed by the decoding process for the remaining segments, with an additional motion vector added to the segmented-block motion vector for each additional macroblock identified in the search. A next motion vector is included into the segmented-block motion vector for each newly identified macroblock, except in the case that the newly identified macroblock corresponds to the macroblock-sized region of the segmentation map identified in step 2830, in which case the S field of the segmented-block motion vector is set to the currently considered segment number. In one implementation, the search for macroblocks first considers the macroblocks identified in step 2824. When a suitable macroblock is not found, small regions surrounding these macroblocks are then searched. The control-flow diagram of FIG. 28B assumes that suitable macroblocks are found for each segment. In an alternative implementation, when suitable macroblocks for the segments are not found by searching, a more expansive search may then be undertaken.

Figure 28C:
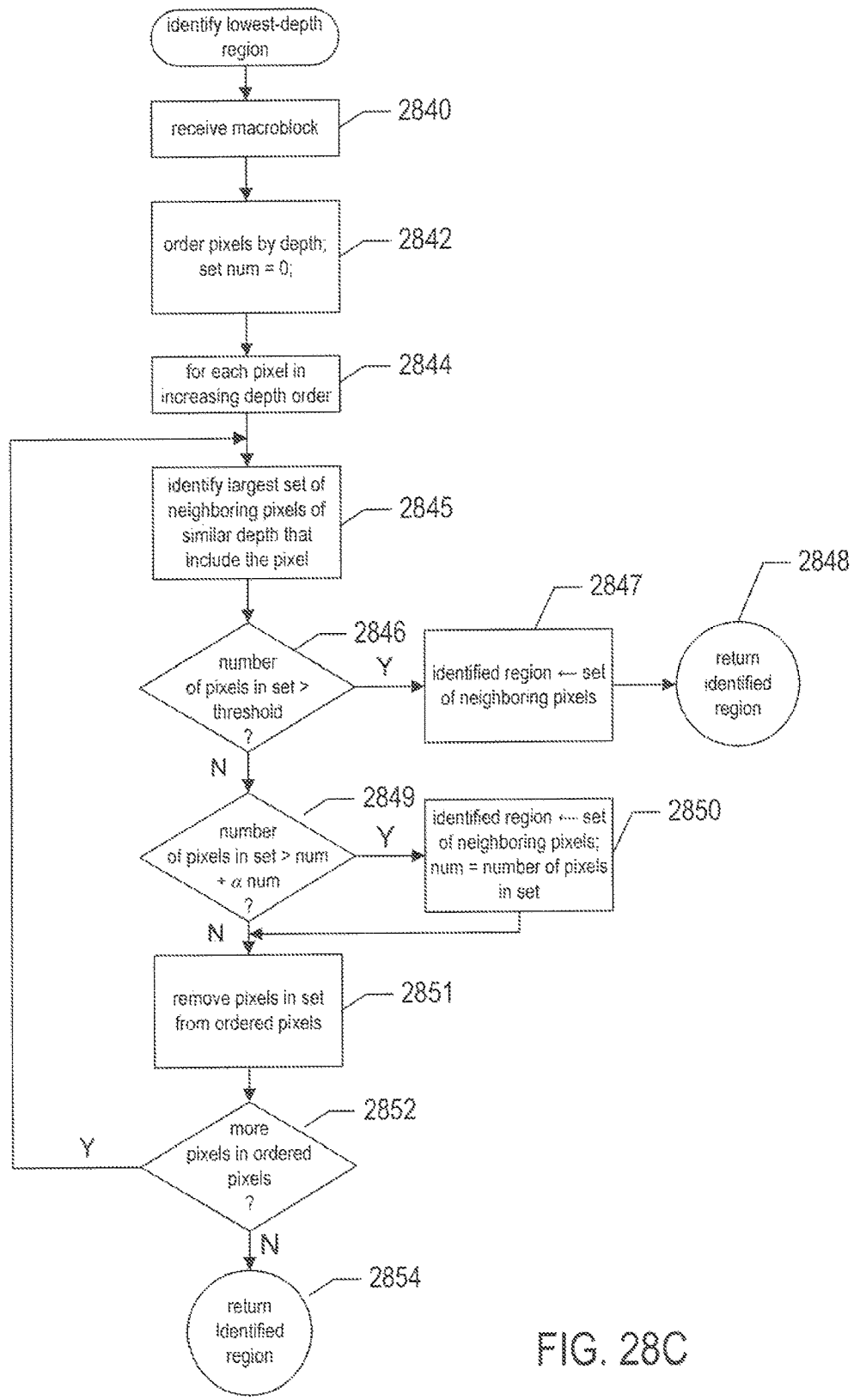
FIG. 28C provides a control-flow diagram for step 2822 of FIG. 28B, in which a lowest-depth region is identified within a currently considered macroblock.

FIG. 28C provides a control-flow diagram for step 2822 of FIG. 28B, in which a lowest-depth region is identified within a currently considered macroblock. In step 2842, the pixels of the macroblock are sorted in increasing-depth order, using an associated depth map, and a local integer variable num is set to 0. Next, in the for-loop of steps 2844-2852, each pixel is considered in increasing-depth order. In step 2845, a larger set of neighboring pixels of similar depth is identified by searching the neighborhood of the currently considered pixel. When the number of pixels in this larger set of neighboring pixels is greater than a threshold value, as determined in step 2846, then the set of neighboring pixels and the currently considered pixel are together identified as the lowest-depth region, in step 2847, and returned in step 2848. Otherwise, when the number of pixels in this larger set of neighboring pixels is greater than the current value stored in variable num added to a constant $\alpha$ times the current value stored in variable num, as determined in step 2849, the set of pixels identified in step 2845 is noted to be the best lowest-depth region found so far, in step 2850, and the local variable is set to the number of pixels in the set. The currently considered set of pixels is removed from the set of ordered pixels, in step 2851, and the next iteration of the for-loop of steps 2844-2852 is carried out when there remain additional pixels in the ordered set of pixels, as determined in step 2852.

Figure 28D:
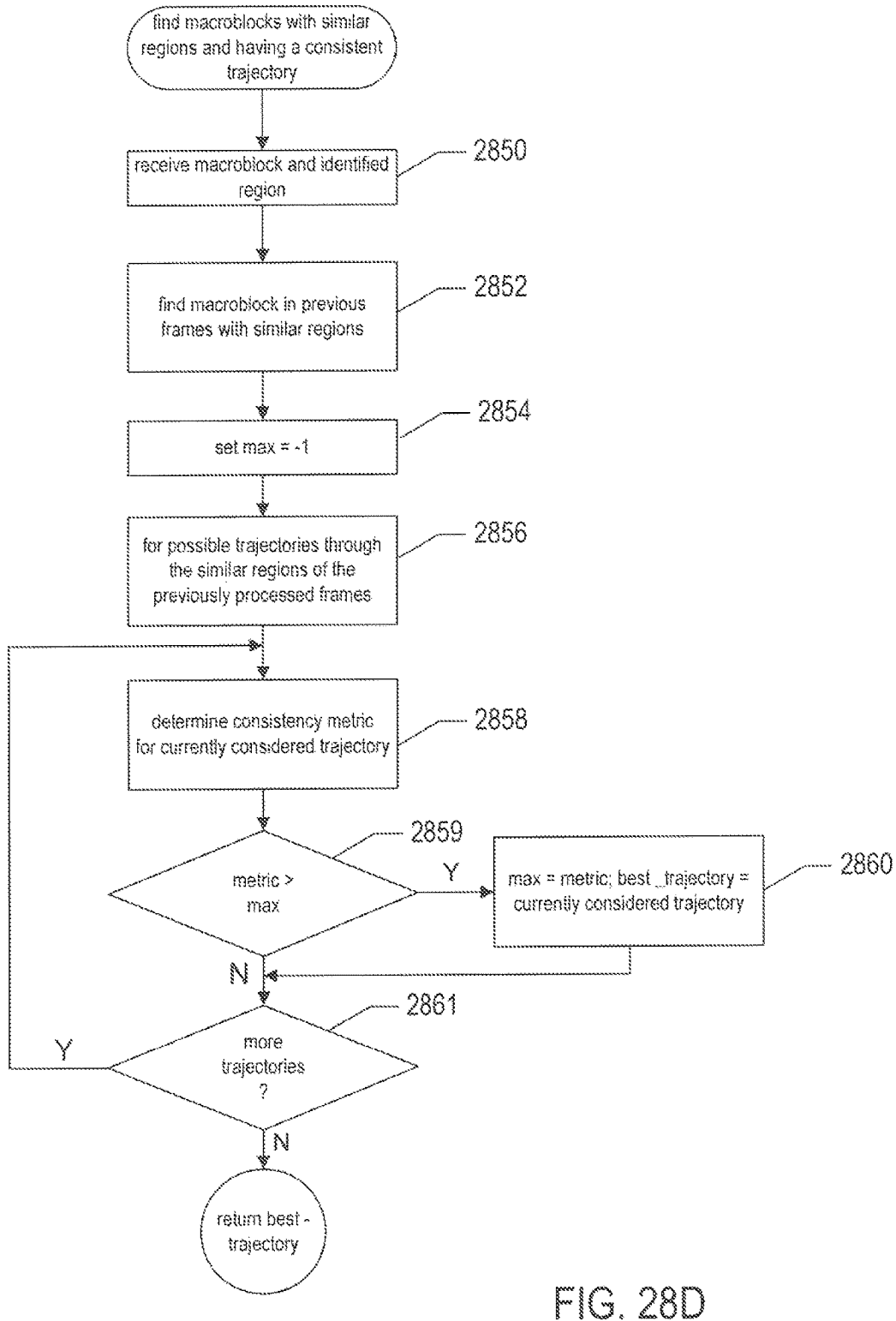
FIG. 28D provides a control-flow diagram that implements step 2826 in FIG. 28B.

FIG. 28D provides a control-flow diagram that implements step 2824 in FIG. 28B. In step 2850, indications of the currently considered macroblock and the lowest-depth region identified in the currently considered macroblock, in step 2822 of FIG. 28B, are received. In step 2852, macroblocks in previously processed frames with regions similar to the identified region are found. The similarity may be based on region size, location, depth, intensity, color, and any other available information. The local variable max is set to a low value, in step 2854. Then, in the for-loop of steps 2856-2861, possible trajectories through previously processed frames that include the macroblocks identified in step 2852 are considered. In step 2858, a consistency metric is determined for a currently considered trajectory and an associated set of macroblocks. When this metric is greater than the value stored in the local variable max, as determined in step 2859, then max is set to the currently determined consistency metric and a local variable best_trajectory is set to the currently considered trajectory in step 5860. When there are more trajectories to consider, as determined in step 2861, another iteration of the for-loop of steps 2856-2861 ensues. Otherwise, the trajectory referred to by the local variable best_trajectory is returned after completion of the for-loop of steps 2856-2861.

It should be noted that the above-described segmented-block motion-vector encoding approach is but one of many different possible implementations of segmented-block motion-vector encoding. In certain cases, segmented-block motion-vector encoding may be attempted prior to conventional interblock encoding, when it is clear that the currently considered macroblock is likely to include a portion of a rapidly moving foreground object. Less constrained types of searches for segmentation macroblocks and for macroblocks including segments of the currently considered macroblock may be undertaken. In certain implementations, the search for segmentation macroblocks may be carried out concurrently with conventional interblock-encoding searching so that, should an acceptable conventional interblock-encoding motion vector not be found, candidate segmentation macroblocks will have already been generated. The implementation discussed above relies principally on depth-map information for identifying segmentation macroblocks, but in other implementations, intensity-and-color values, segmentation maps for previously processed frames, and other information may be employed to identify candidate segment macroblocks.

Figure 29:
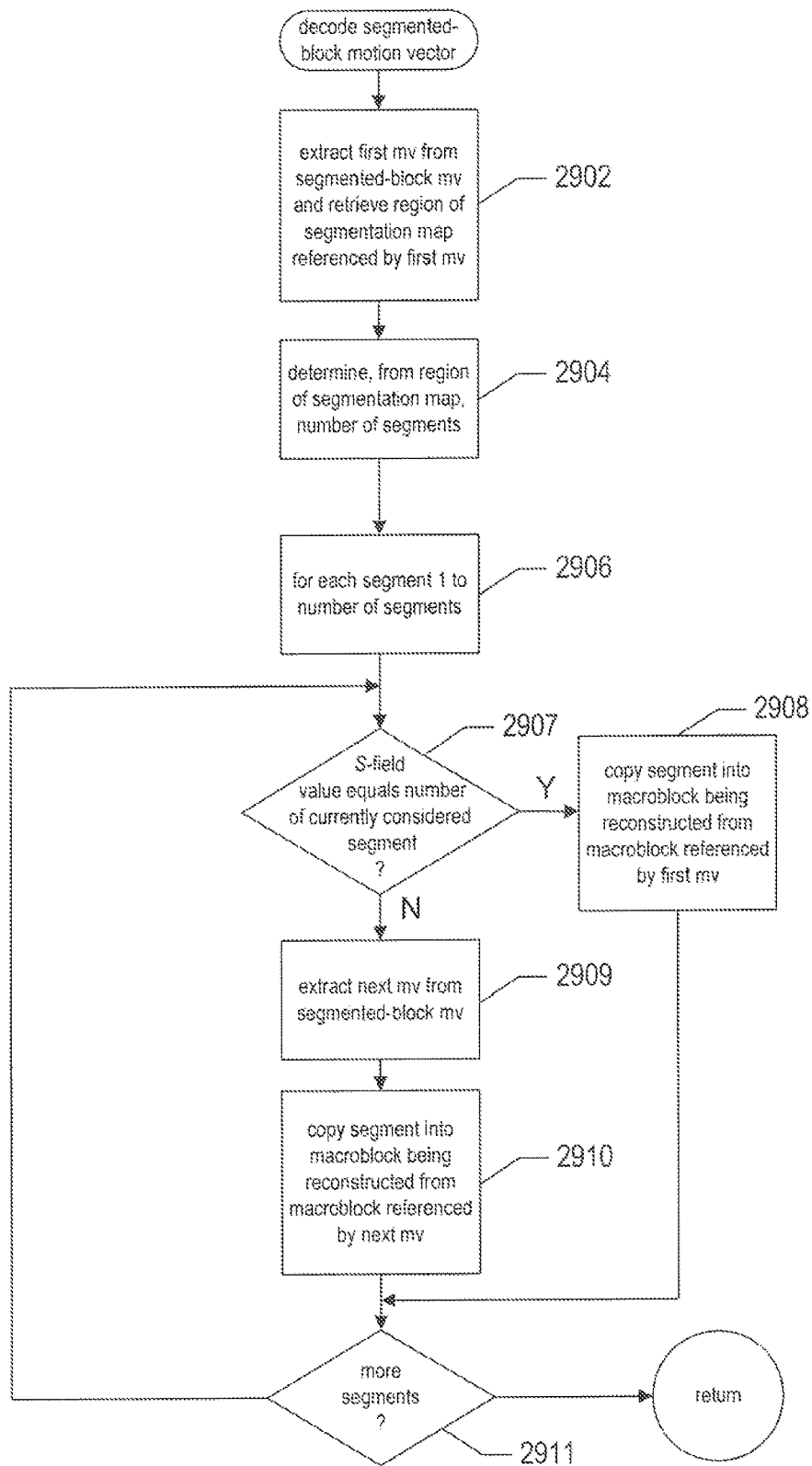
FIG. 29 illustrates decoding of a segmented-block motion vector to reconstruct a macroblock.

FIG. 29 illustrates decoding of a segmented-block motion vector to reconstruct a macroblock. This implementation assumes a general segmented-block motion vector shown as encoding 2516 in FIG. 25. In step 2902, the first motion vector is extracted from the segmented-block motion vector and used to retrieve a macroblock-sized region of a segmentation map referenced by the first motion vector. This macroblock-sized region defines segmentation of a macroblock to be reconstructed from the segmented-block motion vector being decoded. In step 2904, the number of segments indicated by the segmentation macroblock referenced by the extracted motion vector is determined, as discussed above with reference to FIG. 24. Then, in the for-loop of steps 2906-2911, each segment of the macroblock being reconstructed is copied from a macroblock referenced by a motion vector extracted from the segmented-block motion vector. When the currently considered segment is identified by the S field of the segmented-block motion vector, as determined in step 2907, then the intensity-and-color information is copied from a macroblock-sized region corresponding to the segmentation macroblock of the frame associated with the segmentation macroblock, in step 2908. Otherwise, a next motion vector is extracted from the segmented-block motion vector to use as a reference to another macroblock from which the intensity-and-color information is copied into the currently considered segment of the macroblock being reconstructed.

In the above-discussed segmented-block motion-vector encoding, only segment interblock encoding is considered. In alternative implementations, indications can be included in a segmented-block motion vector to indicate that intra-block encoding should be used for a particular segment. For example, a motion vector with offset 0 may indicate that intrablock encoding should be used, and a particular inter-block mode may be indicated by a value stored in a field that replaces the fields that would normally encode the x and y coordinates of a motion vector. Other types of encodings are possible.

The availability of depth information, such as the above-described depth maps, included in a video stream provides useful information for further types of encoding and refinements in video encoding and decoding. As can be seen in FIG. 21A, there is significant overlap in the information contained in depth maps, segmentation maps, and intensity-and-color maps. The information contained in one of these maps can be used to refine or sharpen boundaries in other of the maps, and vice versa. For example, a sharp color boundary in the intensity-and-color map can be used to sharpen an edge in the depth map, and a sharp edge in the depth map can be used to sharpen an edge in an edge map generated from the intensity-and-color map. In addition, motion information for a current frame and previous frame can be used, as can be the motion information in a motion-field map, to generate a transformation that expresses translational motion of regions of an image. This transformation can be used as a new type of encoding for encoding macroblocks or entire video frames. As one example, the transformation may identify a region, such as the darkly colored disk-shaped region of the example of FIGS. 20A-B, and, using the motion field and depth maps of the current frame and previous frames, as well as a three-dimensional trajectory for this region allowing a current frame or macroblock to be encoded by an encoding of the transformation itself. During decoding, the encoded transformation is decoded and applied to one or more previous frames to reconstruct the transform-encoded frame.

Figure 30:
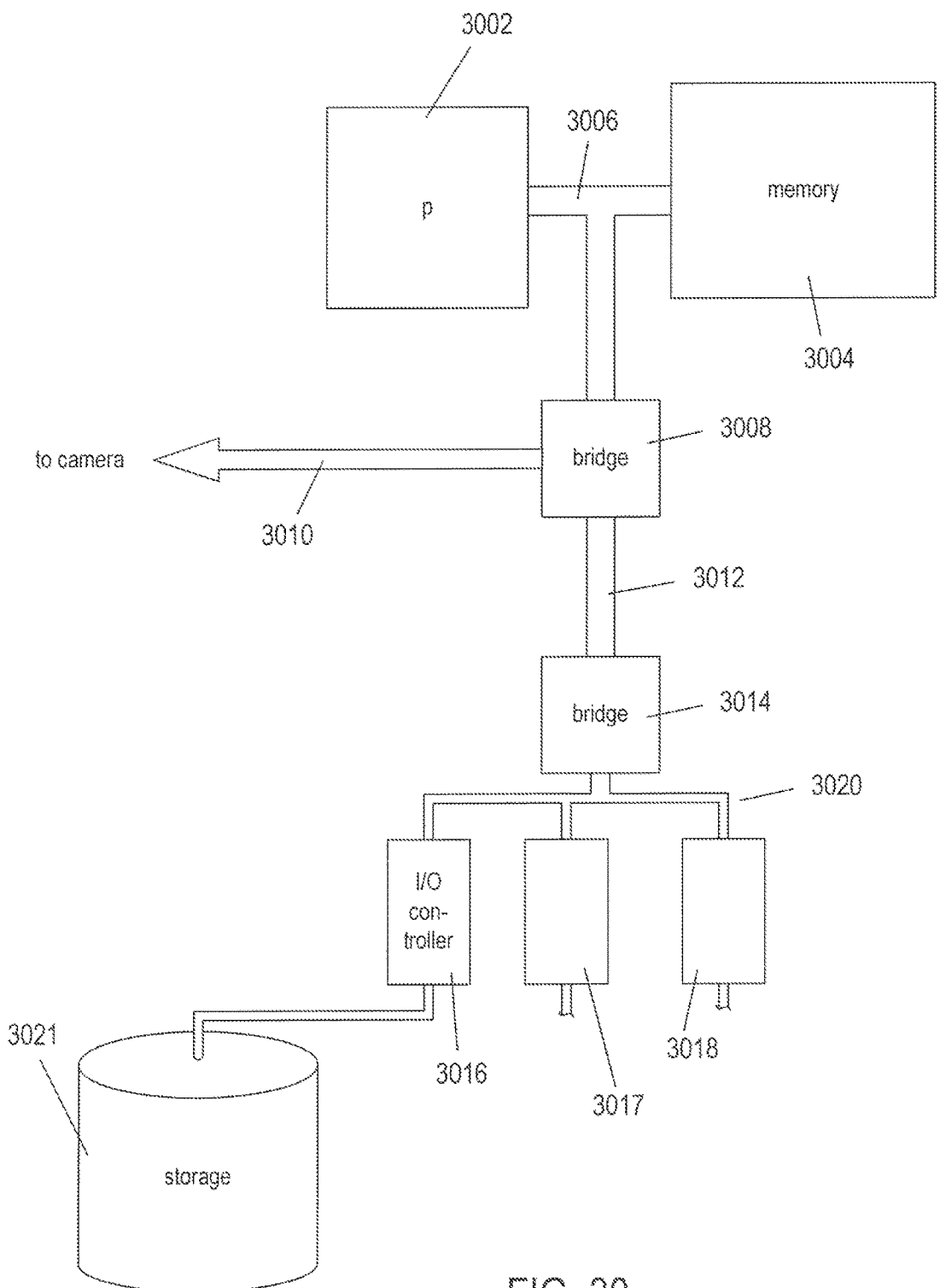
FIG. 30 provides a block diagram of a generalized computer system that encodes and decodes uncompressed and compressed video data.

FIG. 30 provides a block diagram of a generalized computer system that encodes and decodes uncompressed and compressed video data. The computer includes a processor 3002, memory 3004, a memory/processor bus 3006 that interconnects the processor, memory, and a bridge 3008. The bridge interconnects the processor/memory bus 3006 with a high-speed data-input bus 3010 and an internal bus 3012 that connects the first bridge 3008 with a second bridge 3014. The second bridge is, in turn, connected to various devices 3016-3018 via high-speed communications media 3020. One of these devices is an I/O controller 3016 that controls data exchange with a mass-storage device 3021. A software program that implements a video codec may be executed by the computer system to control video coding by the computer system. In this example, the software program is stored on the mass-storage device 3020 and paged, on an as-needed basis, into memory 3004. Instructions of the software program are fetched, by the processor 3002, from memory for execution.

Figure 31:
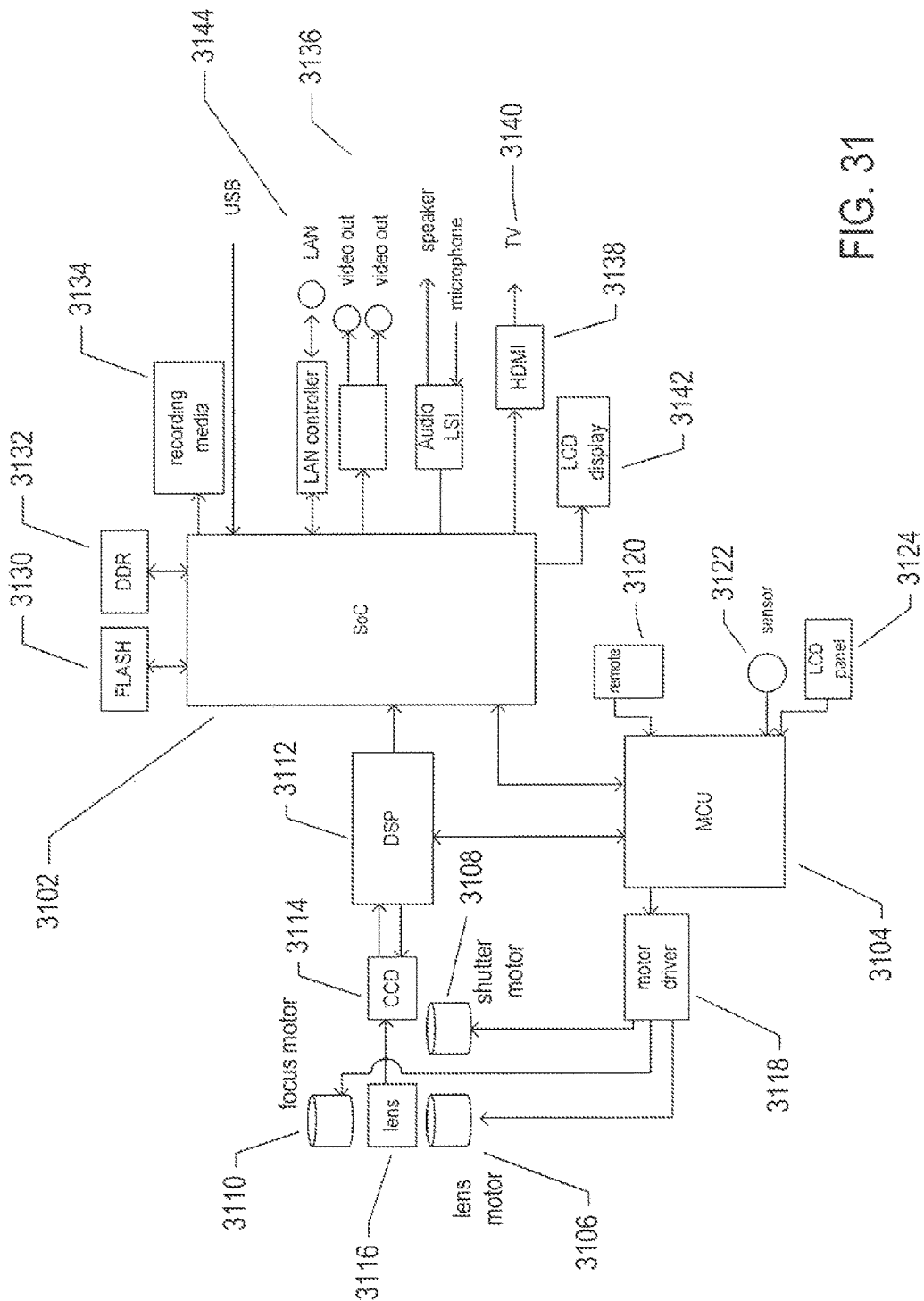
FIG. 31 provides a block diagram for a video camcorder.

FIG. 31 provides a block diagram for a video camcorder. The video camcorder includes a system on a chip 3102 which includes one or more microprocessors and other circuitry that control operation of the camcorder. In addition, a microprocessor-controlled motor control unit ("MCU") 3104 provides control of motors that operate the lens 3106, shutter 3108, and focus system 3110 of the camera, and a digital-signal processor 3112 that processes input from a charge-coupled-device ("CCD") image-acquisition system 3114. Light is focused by a lens system 3116 onto the CCD-based system 3114. The MCU issues commands to a motor driver 3118 that translates the commands into electronic control signals issued to the various control motors within components 3106, 3108, and 3110. The MCU receives control instructions from the system on a chip 3102, from a remote device 3120, from embedded sensors 3122, and from a liquid-crystal display ("LCD") control panel 3124. The system on a chip can access non-volatile flash memory 3130 as well as dynamic random access memory ("RAM") electronic memory 3132 for data-storage purposes. A video signal generated from images received through the lens system 3116 is encoded by video-encoding methods carried out by the system on a chip or by a separate codec for storage in various types of recording media 3134. Streaming encoded media may also be output to video-output jacks 3136 or output through a high-definition multimedia interface ("HDMI") module 3138 to a high-definition television 3140 or to an LCD display 3142 within the camera. In addition, the digital camcorder can be interconnected to a local area network 3144.

The computer system shown in FIG. 30 and the digital camcorder shown in FIG. 31 are but two examples of many different types of electronic devices that can carry out video encoding, video decoding, or both video encoding and video decoding. It should be emphasized that video coding produces electronically encoded data that is stored on tangible, physical data-storage media and devices, including mass-storage and memory devices of computer systems, 3021 and 3004 in FIG. 30, as well as various types of recording media 3134; including electromagnetic disks and optical disks. Encoded video data can also be transmitted to various types of display devices for display to users, including LCD displays 3142, televisions 3140, and other such display devices. It should also be emphasized that video coding is a very computation-intensive process that can only be carried out by processor-controlled automated systems. Segmented-block motion-vector coding is intended to be implemented within any of many different types of physical devices that encode video, decode encoded video, or both encode video and decode encoded video.

Although the present invention has been described in terms of particular embodiments, it is not intended that the invention be limited to these embodiments. Modifications within the spirit of the invention will be apparent to those skilled in the art. For example, segmented-block motion-vector encoding can be incorporated into any of various different video encoding and corresponding video decoding methods carried out with a variety of different types of electronic computer systems, from large systems used to encode video streams for electronic provision over the Internet or through other communications media to a wide variety of different video recording and video display devices. Segmentation-motion-vector encoding can be implemented in computer instructions generated from any number of different types of compilers for any of many different types of computer languages, and the implementations may use a variety of different modular organizations, data structures, control structures, in-memory and mass-storage data formatting. Alternatively, all or a portion of segmented-block motion-vector encoding can be implemented in hardware circuitry, firmware, or a combination of firmware, hardware, and software. It should be appreciated that segmented-block motion-vector encoding is carried out by suitably controlled electronic, processor-controlled devices and is used to generate tangible, physical, encoded video streams; and decoded video in electronic memories, mass-storage devices, and other physical, tangible, storage media. A macroblock may have different sizes in different implementation and in different video-coding standards, and segmented-block motion vectors can be used to encode arbitrarily sized macroblocks. Furthermore, in alternative, implementations, regions of segmentation maps and video frames referenced by motion vectors within segmented-block motion vectors may be scaled and transformed in other ways, the scaling or other transformation encoded in additional fields of motion vectors, so that other than macroblock-sized regions of segmentation maps and video frames may be used for segmentation definitions and for providing intensity-and-color information during reconstruction of an encoded macroblock.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A video-processing device comprising:
a processor;
a memory device; and
computer instructions stored within the memory device that control the processor to:
determine a motion vector for a macroblock of a frame of video based on a function of the macroblock and reference macroblocks of the frame;
determine, based on information available to an encoder of the video and a decoder of the video, a segmentation map that partitions the macroblock into a plurality of segments along one or more q-pel resolution boundaries of the segments, wherein each of the segments represents an object in the frame of video;
determine a plurality of segmented-block motion vectors for the macroblock based on the segmentation map; and
encode the macroblock using the segmented-block motion vectors.

2. The video-processing device of claim 1, wherein the function comprises a mean squared difference between the macroblock and the reference macroblocks.

3. The video-processing device of claim 1, the segmentation map comprising macroblock regions having a consistent trajectory, the consistent trajectory being consistent with a trajectory of the macroblock.

4. The video-processing device of claim 3, wherein the segmented-block motion vectors are determined by instructions that control the processor to:
identify a lowest depth region of the frame, the lowest depth region comprising neighboring pixels of a similar depth;
identify macroblocks of the macroblock regions that have possible trajectories consistent with the consistent trajectory;
identify a segmentation macroblock of the identified macroblocks; and
generate the segmented-block motion vectors to comprise a plurality of motion vectors for the segmentation macroblock.

5. The video-processing device of claim 4, wherein the segmented-block motion vectors are determined by instructions that control the processor to generate the segmented-block motion vectors to comprise a motion vector for a suitable macroblock of each of the segments.

6. The video-processing device of claim 1, wherein the instructions control the processor to:
determine a storage size of the macroblock encoded based on the segmented-block motion vectors; and
determine the storage size of the macroblock encoded based on the motion vector.

7. The video-processing device of claim 6, wherein the instructions control the processor to encode the macroblock using the motion vector if the storage size of the macroblock encoded based on the segmented-block motion vectors is greater than the storage size of the macroblock encoded based on the motion vector.

8. A method for encoding a macroblock of a frame of video, the method comprising:
- determining a motion vector for a macroblock of the frame of video based on a function of the macroblock and reference macroblocks of the frame, wherein the function comprises a mean squared difference between the macroblock and the reference macroblocks;
- determining, based on information available to an encoder of the video and a decoder of the video, a segmentation map that partitions the macroblock into a plurality of segments along one or more q-pel resolution boundaries of the segments, wherein each of the segments represents an object in the frame of video;
- determining a plurality of segmented-block motion vectors for the macroblock based on the segmentation map; and
- encoding the macroblock using the segmented-block motion vectors.

9. The method of claim 8, the segmentation map comprising macroblock regions having a consistent trajectory, the consistent trajectory being consistent with a trajectory of the macroblock.

10. The method of claim 9, wherein the segmented-block motion vectors are determined by:
- identifying a lowest depth region of the frame, the lowest depth region comprising neighboring pixels of a similar depth;
- identifying macroblocks of the macroblock regions that have possible trajectories consistent with the consistent trajectory;
- identifying a segmentation macroblock of the identified macroblocks; and
- generating the segmented-block motion vectors to comprise a motion vector for the segmentation macroblock.

11. The method of claim 10, wherein the segmented-block motion vectors are determined by generating the segmented-block motion vectors to comprise a motion vector for a suitable macroblock of each of the segments.

12. The method of claim 8, comprising generating a segmentation map of the frame, the segmentation map comprising segmented macroblock regions.

13. The method of claim 8, comprising:
- determining a storage size of the macroblock encoded based on the segmented-block motion vectors; and
- determining a storage size of the macroblock encoded based on the motion vector.

14. The method of claim 13, comprising encoding the macroblock using the motion vector if the storage size of the macroblock encoded based on the segmented-block motion vector is greater than the storage size of the macroblock encoded based on the motion vector.

15. A computer-readable storage memory device for storing computer-readable instructions, the computer-readable instructions providing a macroblock encoding system when executed by one or more processing devices, the computer-readable instructions comprising code configured to:
- determine a motion vector for a macroblock of a frame of video based on a function of the macroblock and reference macroblocks of the frame, wherein the function comprises a mean squared difference between the macroblock and the reference macroblocks;
- determine, based on information available to an encoder of the video and a decoder of the video, a segmentation map that partitions the macroblock into a plurality of segments along one or more q-pel resolution boundaries of the segments, wherein each of the segments represents an object in the frame of video;
- determine a plurality of segmented-block motion vectors for the macroblock based on the segmentation map; and
- encode the macroblock using the segmented-block motion vectors.

16. The computer-readable storage memory device of claim 15, comprising instructions to determine the segmented-block motion vectors by:
- identifying a lowest depth region of the frame, the lowest depth region comprising neighboring pixels of a similar depth;
- identifying macroblocks of the segmented macroblock regions that have possible trajectories consistent with the consistent trajectory;
- identifying a segmentation macroblock of the identified macroblocks; and
- generating the segmented-block motion vectors to comprise a motion vector for the segmentation macroblock.

17. The computer-readable storage memory device of claim 16, wherein the segmented-block motion vectors are determined by generating the segmented-block motion vectors to comprise a motion vector for a suitable macroblock of each of the segments.

18. The computer-readable storage memory device of claim 17, comprising instructions to:
- determine a storage size of the macroblock encoded based on the segmented-block motion vector; and
- determine a storage size of the macroblock encoded based on the motion vector.

19. The computer-readable storage memory device of claim 18, comprising instructions to encode the macroblock using the motion vector if the storage size of the macroblock encoded based on the segmented-block motion vector is greater than the storage size of the macroblock encoded based on the motion vector.

20. The computer-readable storage memory device of claim 18, comprising instructions to include an indicator in the segmented-block motion vector to indicate that intra-block encoding is used for a specific segment.

* * * * *